US010190793B2

(12) United States Patent
Drees et al.

(10) Patent No.: US 10,190,793 B2
(45) Date of Patent: Jan. 29, 2019

(54) BUILDING MANAGEMENT SYSTEM WITH ELECTRICAL ENERGY STORAGE OPTIMIZATION BASED ON STATISTICAL ESTIMATES OF IBDR EVENT PROBABILITIES

(71) Applicant: Johnson Controls Technology Company, Plymouth, MI (US)

(72) Inventors: Kirk H. Drees, Cedarburg, WI (US); Michael J. Wenzel, Oak Creek, WI (US); Robert D. Turney, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 52 days.

(21) Appl. No.: 15/247,875

(22) Filed: Aug. 25, 2016

(65) Prior Publication Data

US 2017/0102162 A1 Apr. 13, 2017

Related U.S. Application Data

(60) Provisional application No. 62/239,249, filed on Oct. 8, 2015, provisional application No. 62/239,131, filed
(Continued)

(51) Int. Cl.
*F24F 11/65* (2018.01)
*G05B 15/02* (2006.01)
(Continued)

(52) U.S. Cl.
CPC .............. *F24F 11/65* (2018.01); *F24F 11/30* (2018.01); *G05B 13/0205* (2013.01);
(Continued)

(58) Field of Classification Search
CPC ........ F24F 11/0086; F24F 11/65; F24F 11/30; G05B 13/0205; G05B 19/0428;
(Continued)

(56) References Cited

U.S. PATENT DOCUMENTS

| 4,349,869 A | 9/1982 | Prett et al. |
| 4,616,308 A | 10/1986 | Morshedi et al. |

(Continued)

FOREIGN PATENT DOCUMENTS

| CN | 102566435 B | 10/2013 |
| CN | 102891495 | 1/2016 |

(Continued)

OTHER PUBLICATIONS

U.S. Appl. No. 13/802,154, filed Mar. 13, 2013, Johnson Controls Technology Company.
(Continued)

*Primary Examiner* — Robert A Cassity
(74) *Attorney, Agent, or Firm* — Foley & Lardner LLP

(57) ABSTRACT

A central plant that generates and provides resources to a building. The central plant includes an electrical energy storage subplant configured to store electrical energy purchased from a utility and to discharge the stored electrical energy. The central plant includes a plurality of generator subplants that consume one or more input resources. The central plant includes a controller configured to determine, for each time step within a time horizon, an optimal allocation of the input resources and the output resources for each of the subplants in order to optimize a total monetary value of operating the central plant over the time horizon. The total monetary value includes revenue from participating in incentive-based demand response programs as well as costs associated with resource consumption, equipment degradation, and losses in battery capacity.

20 Claims, 21 Drawing Sheets

Related U.S. Application Data on Oct. 8, 2015, provisional application No. 62/239,231, filed on Oct. 8, 2015, provisional application No. 62/239,246, filed on Oct. 8, 2015, provisional application No. 62/239,233, filed on Oct. 8, 2015, provisional application No. 62/239,245, filed on Oct. 8, 2015.

(51) Int. Cl.

| | | |
|---|---|---|
| *H02J 3/14* | (2006.01) | |
| *H02J 3/28* | (2006.01) | |
| *H02J 15/00* | (2006.01) | |
| *F24F 11/30* | (2018.01) | |
| *G05B 13/02* | (2006.01) | |
| *G05B 19/042* | (2006.01) | |
| *H02J 3/38* | (2006.01) | |
| *H02J 7/00* | (2006.01) | |
| *G05B 13/04* | (2006.01) | |
| *H02J 3/00* | (2006.01) | |
| *H02J 3/32* | (2006.01) | |
| *H02J 7/35* | (2006.01) | |
| *H02J 13/00* | (2006.01) | |

(52) U.S. Cl.
CPC ........... *G05B 13/048* (2013.01); *G05B 15/02* (2013.01); *G05B 19/0428* (2013.01); *H02J 3/00* (2013.01); *H02J 3/008* (2013.01); *H02J 3/14* (2013.01); *H02J 3/28* (2013.01); *H02J 3/32* (2013.01); *H02J 3/383* (2013.01); *H02J 7/007* (2013.01); *H02J 7/35* (2013.01); *H02J 13/0086* (2013.01); *H02J 15/00* (2013.01); *G05B 2219/2614* (2013.01); *G05B 2219/2642* (2013.01); *G05B 2219/39361* (2013.01); *H02J 2003/003* (2013.01); *H02J 2003/007* (2013.01); *H02J 2003/146* (2013.01); *Y02B 10/14* (2013.01); *Y02B 70/3225* (2013.01); *Y02B 90/222* (2013.01); *Y02E 10/563* (2013.01); *Y02E 10/566* (2013.01); *Y02E 40/72* (2013.01); *Y02E 70/30* (2013.01); *Y04S 10/123* (2013.01); *Y04S 20/12* (2013.01); *Y04S 20/222* (2013.01); *Y04S 20/224* (2013.01)

(58) Field of Classification Search
CPC ... G05B 2219/39361; G05B 2219/2614; H02J 3/383; H02J 7/007; H02J 2003/007
See application file for complete search history.

(56) References Cited

U.S. PATENT DOCUMENTS

| | | | |
|---|---|---|---|
| 5,301,101 | A | 4/1994 | MacArthur et al. |
| 5,347,446 | A | 9/1994 | Iino et al. |
| 5,351,184 | A | 9/1994 | Lu et al. |
| 5,408,406 | A | 4/1995 | Mathur et al. |
| 5,442,544 | A | 8/1995 | Jelinek |
| 5,519,605 | A | 5/1996 | Cawlfield |
| 5,572,420 | A | 11/1996 | Lu |
| 5,867,384 | A | 2/1999 | Drees et al. |
| 6,055,483 | A | 4/2000 | Lu |
| 6,122,555 | A | 9/2000 | Lu |
| 6,278,899 | B1 | 8/2001 | Piche et al. |
| 6,347,254 | B1 | 2/2002 | Lu |
| 6,459,939 | B1 | 10/2002 | Hugo |
| 6,757,591 | B2 | 6/2004 | Kramer |
| 6,807,510 | B1 | 10/2004 | Backstrom et al. |
| 6,900,556 | B2 | 5/2005 | Provanzana et al. |
| 7,050,863 | B2 | 5/2006 | Mehta et al. |
| 7,050,866 | B2 | 5/2006 | Martin et al. |
| 7,113,890 | B2 | 9/2006 | Frerichs et al. |
| 7,152,023 | B2 | 12/2006 | Das |
| 7,165,399 | B2 | 1/2007 | Stewart |
| 7,188,779 | B2 | 3/2007 | Alles |
| 7,197,485 | B2 | 3/2007 | Fuller |
| 7,203,554 | B2 | 4/2007 | Fuller |
| 7,266,416 | B2 | 9/2007 | Gallestey et al. |
| 7,272,454 | B2 | 9/2007 | Wojsznis et al. |
| 7,275,374 | B2 | 10/2007 | Stewart et al. |
| 7,328,074 | B2 | 2/2008 | Das et al. |
| 7,328,577 | B2 | 2/2008 | Stewart et al. |
| 7,376,471 | B2 | 5/2008 | Das et al. |
| 7,376,472 | B2 | 5/2008 | Wojsznis et al. |
| 7,389,773 | B2 | 6/2008 | Stewart et al. |
| 7,400,933 | B2 | 7/2008 | Rawlings et al. |
| 7,418,372 | B2 | 8/2008 | Nishira et al. |
| 7,454,253 | B2 | 11/2008 | Fan |
| 7,496,413 | B2 | 2/2009 | Fan et al. |
| 7,577,483 | B2 | 8/2009 | Fan et al. |
| 7,591,135 | B2 | 9/2009 | Stewart |
| 7,610,108 | B2 | 10/2009 | Boe et al. |
| 7,650,195 | B2 | 1/2010 | Fan et al. |
| 7,664,573 | B2 | 2/2010 | Ahmed |
| 7,676,283 | B2 | 3/2010 | Liepold et al. |
| 7,826,909 | B2 | 11/2010 | Attarwala |
| 7,827,813 | B2 | 11/2010 | Seem |
| 7,839,027 | B2 | 11/2010 | Shelton et al. |
| 7,844,352 | B2 | 11/2010 | Vouzis et al. |
| 7,856,281 | B2 | 12/2010 | Thiele et al. |
| 7,878,178 | B2 | 2/2011 | Stewart et al. |
| 7,894,943 | B2 | 2/2011 | Sloup et al. |
| 7,930,045 | B2 | 4/2011 | Cheng |
| 7,945,352 | B2 | 5/2011 | Koc |
| 7,949,416 | B2 | 5/2011 | Fuller |
| 7,987,005 | B2 | 7/2011 | Rund |
| 7,987,145 | B2 | 7/2011 | Baramov |
| 7,996,140 | B2 | 8/2011 | Stewart et al. |
| 8,005,575 | B2 | 8/2011 | Kirchhof |
| 8,032,235 | B2 | 10/2011 | Sayyar-Rodsari |
| 8,036,758 | B2 | 10/2011 | Lu et al. |
| 8,046,089 | B2 | 10/2011 | Renfro et al. |
| 8,060,258 | B2 | 11/2011 | Butoyi |
| 8,060,290 | B2 | 11/2011 | Stewart et al. |
| 8,073,659 | B2 | 12/2011 | Gugaliya et al. |
| 8,078,291 | B2 | 12/2011 | Pekar et al. |
| 8,096,140 | B2 | 1/2012 | Seem |
| 8,105,029 | B2 | 1/2012 | Egedal et al. |
| 8,109,255 | B2 | 2/2012 | Stewart et al. |
| 8,121,818 | B2 | 2/2012 | Gorinevsky |
| 8,126,575 | B2 | 2/2012 | Attarwala |
| 8,145,329 | B2 | 3/2012 | Pekar et al. |
| 8,180,493 | B1 | 5/2012 | Laskow |
| 8,185,217 | B2 | 5/2012 | Thiele |
| 8,200,346 | B2 | 6/2012 | Thiele |
| 8,295,989 | B2 | 10/2012 | Rettger et al. |
| 8,489,666 | B1 | 7/2013 | Nikitin |
| 8,492,926 | B2 | 7/2013 | Collins et al. |
| 8,495,888 | B2 | 7/2013 | Seem |
| 8,583,520 | B1 | 11/2013 | Forbes, Jr. |
| 8,600,561 | B1 | 12/2013 | Modi et al. |
| 8,600,571 | B2 | 12/2013 | Dillon et al. |
| 8,843,238 | B2 | 9/2014 | Wenzel et al. |
| 8,901,411 | B2 | 12/2014 | Liu et al. |
| 8,914,158 | B2 | 12/2014 | Geinzer et al. |
| 8,922,056 | B2 | 12/2014 | Thisted |
| 9,002,532 | B2 | 4/2015 | Asmus |
| 9,002,761 | B2 | 4/2015 | Montalvo |
| 9,061,599 | B2 | 6/2015 | Sisk |
| 9,235,657 | B1 | 1/2016 | Wenzel et al. |
| 2004/0095237 | A1 | 5/2004 | Chen et al. |
| 2005/0062289 | A1 | 3/2005 | Cho et al. |
| 2007/0080675 | A1 | 4/2007 | Gray et al. |
| 2007/0087756 | A1 | 4/2007 | Hoffberg |
| 2009/0094173 | A1* | 4/2009 | Smith .............. G01R 21/1335 705/412 |
| 2009/0254396 | A1 | 10/2009 | Metcalfe |
| 2009/0313083 | A1 | 12/2009 | Dillon et al. |
| 2009/0319090 | A1 | 12/2009 | Dillon et al. |
| 2010/0087933 | A1 | 4/2010 | Cheng |
| 2010/0198420 | A1 | 8/2010 | Rettger et al. |
| 2010/0198421 | A1 | 8/2010 | Fahimi et al. |

(56) References Cited

U.S. PATENT DOCUMENTS

| | | |
|---|---|---|
| 2010/0235004 A1 | 9/2010 | Thind |
| 2010/0269854 A1 | 10/2010 | Barbieri et al. |
| 2011/0022193 A1 | 1/2011 | Panaitescu |
| 2011/0060424 A1 | 3/2011 | Havlena |
| 2011/0060475 A1 | 3/2011 | Baldwin et al. |
| 2011/0066258 A1 | 3/2011 | Torzhkov et al. |
| 2011/0088000 A1 | 4/2011 | MacKay |
| 2011/0125293 A1 | 5/2011 | Havlena |
| 2011/0184565 A1* | 7/2011 | Peterson ............ G05D 23/1923 700/278 |
| 2011/0190958 A1 | 8/2011 | Hirst |
| 2011/0221276 A1 | 9/2011 | Geinzer et al. |
| 2011/0257789 A1 | 10/2011 | Stewart et al. |
| 2011/0264289 A1 | 10/2011 | Sawyer et al. |
| 2011/0276269 A1 | 11/2011 | Hummel |
| 2011/0301723 A1 | 12/2011 | Pekar et al. |
| 2012/0010757 A1 | 1/2012 | Francino et al. |
| 2012/0059351 A1 | 3/2012 | Nordh |
| 2012/0060505 A1 | 3/2012 | Fuller et al. |
| 2012/0083930 A1 | 4/2012 | Ilic et al. |
| 2012/0109620 A1 | 5/2012 | Gaikwad et al. |
| 2012/0116546 A1 | 5/2012 | Sayyar-Rodsari |
| 2012/0130555 A1 | 5/2012 | Jelinek |
| 2012/0143385 A1 | 6/2012 | Goldsmith |
| 2012/0215362 A1 | 8/2012 | Stagner |
| 2012/0232701 A1 | 9/2012 | Carty et al. |
| 2012/0261990 A1 | 10/2012 | Collins et al. |
| 2012/0323396 A1 | 12/2012 | Shelton et al. |
| 2012/0326511 A1 | 12/2012 | Johnson |
| 2013/0099565 A1 | 4/2013 | Sachs et al. |
| 2013/0138285 A1 | 5/2013 | Bozchalui et al. |
| 2013/0154583 A1 | 6/2013 | Shi et al. |
| 2013/0184884 A1 | 7/2013 | More et al. |
| 2013/0204443 A1 | 8/2013 | Steven et al. |
| 2013/0212410 A1 | 8/2013 | Li et al. |
| 2013/0300194 A1 | 11/2013 | Palmer et al. |
| 2013/0345880 A1 | 12/2013 | Asmus |
| 2014/0037909 A1 | 2/2014 | Hawwa et al. |
| 2014/0039709 A1* | 2/2014 | Steven .................. G06Q 10/06 700/291 |
| 2014/0049109 A1 | 2/2014 | Kearns et al. |
| 2014/0052308 A1 | 2/2014 | Hanafusa |
| 2014/0089692 A1 | 3/2014 | Hanafusa |
| 2014/0100810 A1 | 4/2014 | Nielsen |
| 2014/0152009 A1 | 6/2014 | Meisner et al. |
| 2014/0159491 A1 | 6/2014 | Kusunose |
| 2014/0239722 A1 | 8/2014 | Arai et al. |
| 2014/0279361 A1* | 9/2014 | Streeter .................. G06Q 40/04 705/37 |
| 2014/0336840 A1 | 11/2014 | Geinzer et al. |
| 2014/0354239 A1 | 12/2014 | Miyazaki et al. |
| 2014/0358316 A1 | 12/2014 | Shichiri |
| 2015/0002105 A1 | 1/2015 | Kelly |
| 2015/0008884 A1 | 1/2015 | Waki et al. |
| 2015/0019034 A1 | 1/2015 | Gonatas |
| 2015/0021991 A1 | 1/2015 | Wood et al. |
| 2015/0045962 A1 | 2/2015 | Wenzel et al. |
| 2015/0046221 A1 | 2/2015 | Narayan et al. |
| 2015/0084339 A1 | 3/2015 | McDaniel et al. |
| 2015/0088315 A1 | 3/2015 | Behrangrad |
| 2015/0094870 A1 | 4/2015 | Fornage et al. |
| 2015/0094968 A1 | 4/2015 | Jia et al. |
| 2015/0127425 A1 | 5/2015 | Greene et al. |
| 2015/0277467 A1 | 10/2015 | Steven et al. |
| 2015/0283912 A1 | 10/2015 | Shimizu et al. |
| 2016/0028234 A1 | 1/2016 | Watanabe et al. |
| 2016/0047862 A1 | 2/2016 | Shimizu et al. |
| 2016/0190810 A1 | 6/2016 | Bhavaraju et al. |
| 2016/0241042 A1* | 8/2016 | Mammoli ............... H02S 40/38 |
| 2016/0254671 A1 | 9/2016 | Cutright et al. |
| 2016/0261116 A1 | 9/2016 | Barooah |
| 2016/0315475 A1 | 10/2016 | Carlson et al. |
| 2017/0060113 A1 | 3/2017 | Kaucic et al. |
| 2017/0090440 A1 | 3/2017 | Eck et al. |
| 2017/0104345 A1 | 4/2017 | Wenzel et al. |

FOREIGN PATENT DOCUMENTS

| | | |
|---|---|---|
| EP | 2506380 | 10/2012 |
| EP | 2549617 | 1/2013 |
| EP | 2660943 | 11/2013 |
| EP | 2773008 | 9/2014 |
| EP | 2871742 | 5/2015 |
| JP | 2014-233096 | 12/2014 |
| WO | WO 02/15365 | 2/2002 |
| WO | WO-2010/042550 | 4/2010 |
| WO | WO-2010/057250 | 5/2010 |
| WO | WO-2010/094012 | 8/2010 |
| WO | WO-2011/080548 | 7/2011 |
| WO | WO-2012/122234 | 9/2012 |
| WO | WO 2013/063581 | 5/2013 |
| WO | WO-2014/016727 | 1/2014 |
| WO | WO 2015/019541 | 2/2015 |
| WO | WO 2015/139061 | 9/2015 |

OTHER PUBLICATIONS

U.S. Appl. No. 13/802,279, filed Mar. 13, 2013, Johnson Controls Technology Company.

Extended European Search Report for EP Application No. 6154938.1, dated Jun. 23, 2016, 8 pages.

Extended European Search Report for EP Application No. 6154940.7, dated Jun. 30, 2016, 7 pages.

Hoke et al., Active Power Control of Photovoltaic Power Systems, 2013 1st IEEE Conference on Technologies for Sustainability (SusTech), Aug. 1-2, 2013, 8 pages.

Lopez-Martinez et al., Vision-Based System for the Safe Operation of a Solar Power Tower Plant, In Advances in Artificial Intelligence—IBERAMIA 2002, 8th Ibero-American Conference on Artificial Intelligence, Nov. 2002, Springer Berlin Heidelberg, 10 pages.

Sasikala et al., Coordinated Control and Strategy of Solar Photovoltaic Generators with MPPT and Battery Storage in Micro Grids, International Journal of Scientific Engineering and Technology Research, vol. 3, No. 46, Dec. 2014, 7 pages.

SMA Solar Technology AG, PV and Storage: Solutions with Potential-Energy on demand with the Sunny Central Storage, Brochure, Nov. 30, 2002, 8 pages.

Search Report for International Application No. PCT/US2016/056178, dated Jan. 25, 2017, 3 pages.

Search Report and Written Opinion for International Application No. PCT/US2016/056165, dated Jan. 3, 2017, 13 pages.

Search Report and Written Opinion for International Application No. PCT/US2016/056167, dated Jan. 3, 2017, 12 pages.

Search Report and Written Opinion for International Application No. PCT/US2016/056169, dated Jan. 3, 2017, 12 pages.

Search Report and Written Opinion for International Application No. PCT/US2016/056170, dated Jan. 18, 2017, 12 pages.

Search Report and Written Opinion for International Application No. PCT/US2016/056179, dated Jan. 19, 2017, 10 pages.

Search Report and Written Opinion for International Application No. PCT/US2016/056182, dated Jan. 4, 2017, 13 pages.

Search Report and Written Opinion for International Application No. PCT/US2016/056183, dated Dec. 20, 2016, 13 pages.

Search Report and Written Opinion for International Application No. PCT/US2016/056184, dated Dec. 20, 2016, 13 pages.

Search Report and Written Opinion for International Application No. PCT/US2016/056186, dated Jan. 16, 2017, 10 pages.

Search Report and Written Opinion for International Application No. PCT/US2016/056187, dated Dec. 9, 2016, 12 pages.

Search Report and Written Opinion for International Application No. PCT/US2016/056189, dated Dec. 21, 2016, 11 pages.

Search Report and Written Opinion for International Application No. PCT/US2016/056190, dated Jan. 18, 2017, 10 pages.

Search Report and Written Opinion for International Application No. PCT/US2016/056192, dated Jan. 16, 2017, 11 pages.

Search Report for International Application No. PCT/US2016/056181, dated Jan. 26, 2017, 10 pages.

U.S. Office Action on U.S. Appl. No. 15/247,793 dated May 10, 2018. 9 pages.

(56) References Cited

OTHER PUBLICATIONS

U.S. Office Action on U.S. Appl. No. 15/247,880 dated May 11, 2018. 12 pages.
U.S. Office Action on U.S. Appl. No. 15/247,777 dated Feb. 9, 2018. 25 pages.
U.S. Office Action on U.S. Appl. No. 15/247,784 dated Apr. 19, 2018. 7 pages.
U.S. Office Action on U.S. Appl. No. 15/247,788 dated May 7, 2018. 19 pages.
U.S. Office Action on U.S. Appl. No. 15/247,881 dated Mar. 8, 2018. 25 pages.
U.S. Office Action on U.S. Appl. No. 15/247,883 dated Mar. 21, 2018. 36 pages.
U.S. Office Action on U.S. Appl. No. 15/247,885 dated Apr. 16, 2018. 33 pages.
U.S. Office Action on U.S. Appl. No. 15/247,886 dated Feb. 9, 2018. 7 pages.
Final Office Action U.S. Appl. No. 15/247,788 dated Dec. 11, 2018. 22 pages.
Non-Final Office Action on U.S. Appl. No. 15/247,879 dated Nov. 1, 2018. 22 pages.
Non-Final Office Action on U.S. Appl. No. 15/247,885 dated Nov. 28, 2018. 41 pages.
Non-Final Office Action on U.S. Appl. No. 15/247,873 dated Sep. 19, 2018. 7 pages.

\* cited by examiner

BUILDING MANAGEMENT SYSTEM WITH ELECTRICAL ENERGY STORAGE OPTIMIZATION BASED ON STATISTICAL ESTIMATES OF IBDR EVENT PROBABILITIES

CROSS-REFERENCE TO RELATED PATENT APPLICATIONS

This application claims the benefit of and priority to U.S. Provisional Patent Application No. 62/239,131, U.S. Provisional Patent Application No. 62/239,231, U.S. Provisional Patent Application No. 62/239,233, U.S. Provisional Patent Application No. 62/239,245, U.S. Provisional Patent Application No. 62/239,246, and U.S. Provisional Patent Application No. 62/239,249, each of which has a filing date of Oct. 8, 2015. The entire disclosure of each of these patent applications is incorporated by reference herein.

BACKGROUND

The present disclosure relates generally to the operation of a central plant for serving building thermal energy loads.

A central plant may include various types of equipment configured to serve the thermal energy loads of a building or campus. For example, a central plant may include heaters, chillers, heat recovery chillers, cooling towers, or other types of equipment configured to provide heating or cooling for the building. A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling to the air. The working fluid then returns to the central plant to receive further heating or cooling and the cycle continues.

High efficiency equipment can help reduce the amount of energy consumed by a central plant; however, the effectiveness of such equipment is highly dependent on the control technology that is used to distribute the load across the multiple subplants. For example, it may be more cost efficient to run heat pump chillers instead of conventional chillers and a water heater when energy prices are high. It is difficult and challenging to determine when and to what extent each of the multiple subplants should be used to minimize energy cost. If electrical demand charges are considered, the optimization is even more complicated.

SUMMARY

One implementation of the present disclosure is a central plant that generates and provides resources to a building. The central plant includes an electrical energy storage subplant configured to store electrical energy purchased from a utility and to discharge the stored electrical energy. The central plant includes a plurality of generator subplants that consume one or more input resources comprising the discharged electrical energy and generate one or more output resources to satisfy a resource demand of the building. The central plant includes a controller configured to determine, for each time step within a time horizon, an optimal allocation of the input resources and the output resources for each of the subplants in order to optimize a total monetary value of operating the central plant over the time horizon.

In some embodiments, the optimal allocation of the resources includes an allocation of the stored electrical energy to the generator subplants for at least some of the time steps and an allocation of the stored electrical energy to an incentive-based demand response (IBDR) program for at least some of the time steps.

In some embodiments, determining the optimal allocation of resources includes determining an amount of the electrical energy stored or discharged by the electrical energy storage subplant for each of the time steps.

In some embodiments, the controller determines an optimal amount of the electrical energy to allocate to an IBDR program at each time step based on statistical estimates of IBDR event probabilities. In some embodiments, the controller uses at least one of past clearing prices and past mileage ratios of previous IBDR events to generate the statistical estimates of the IBDR event probabilities. In some embodiments, the controller determines an expected revenue from participating in the IBDR program and determines the optimal amount of electrical energy to allocate to the IBDR program based on the expected revenue.

In some embodiments, the controller determines the optimal resource allocation by optimizing a value function including expected revenue from participating in an IBDR program and an expected cost of the resources purchased from the utility.

In some embodiments, the value function further includes a monetized cost of capacity loss for the electrical energy storage resulting from a potential allocation of the resources. The controller may predict the monetized cost of capacity loss prior to allocating the resources and use the predicted cost of capacity loss to optimize the resource allocation.

In some embodiments, the value function further includes a penalty cost of equipment degradation resulting from a potential allocation of the resources. The controller may predict the penalty cost of equipment degradation prior to allocating the resources and uses the predicted penalty cost to optimize the resource allocation.

In some embodiments, the controller is configured to perform a first optimization that optimizes the total monetary value of operating the central plant over the time horizon and a second optimization that optimizes a total value of purchasing equipment of the central plant as well as the total monetary value of operating the central plant over the time horizon.

Another implementation of the present disclosure is a building management system (BMS). The BMS includes building equipment that consume electrical energy and generate thermal energy for use in satisfying a thermal energy load of a building. The BMS includes thermal energy storage configured to store at least a portion of the thermal energy generated by the building equipment and to discharge the stored thermal energy. The BMS includes electrical energy storage configured to store electrical energy purchased from a utility and to discharge the stored electrical energy. The BMS includes a controller configured to determine, for each time step within a time horizon, an optimal amount of thermal energy generated by the building equipment, an optimal amount of thermal energy stored or discharged by the thermal energy storage, and an optimal amount of electrical energy stored or discharged by the electrical energy storage in order to optimize a total monetary value of operating the building management system over the time horizon.

In some embodiments, the electrical energy discharged from the electrical energy storage is consumed by the building equipment. In some embodiments, the electrical energy discharged from the electrical energy storage is sold to an outside entity as part of an incentive-based demand response (IBDR) program in exchange for revenue that contributes to the total monetary value of operating the building management system over the time horizon.

In some embodiments, the controller determines an optimal amount of electrical energy to allocate to an IBDR program at each time step based on statistical estimates of IBDR event probabilities. In some embodiments, the controller uses at least one of past clearing prices and past mileage ratios of previous IBDR events to generate the statistical estimates of the IBDR event probabilities. In some embodiments, the controller determines an expected revenue from participating in the IBDR program and determines the optimal amount of electrical energy to allocate to the IBDR program based on the expected revenue.

In some embodiments, the total monetary value of operating the building management system over the time horizon is defined by a value function including a cost of the electrical energy consumed by the building equipment and revenue of the electrical energy sold as part of an IBDR program. In some embodiments, the value function further includes a monetized cost of capacity loss for the electrical energy storage. In some embodiments, the value function further includes a penalty cost of control actions associated with the building equipment.

In some embodiments, the controller is configured to perform a first optimization that optimizes the total monetary value of operating the building management system over the time horizon and a second optimization that optimizes a total value of purchasing the building equipment, the thermal energy storage, and the electrical energy storage as well as the total monetary value of operating the building management system over the time horizon Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
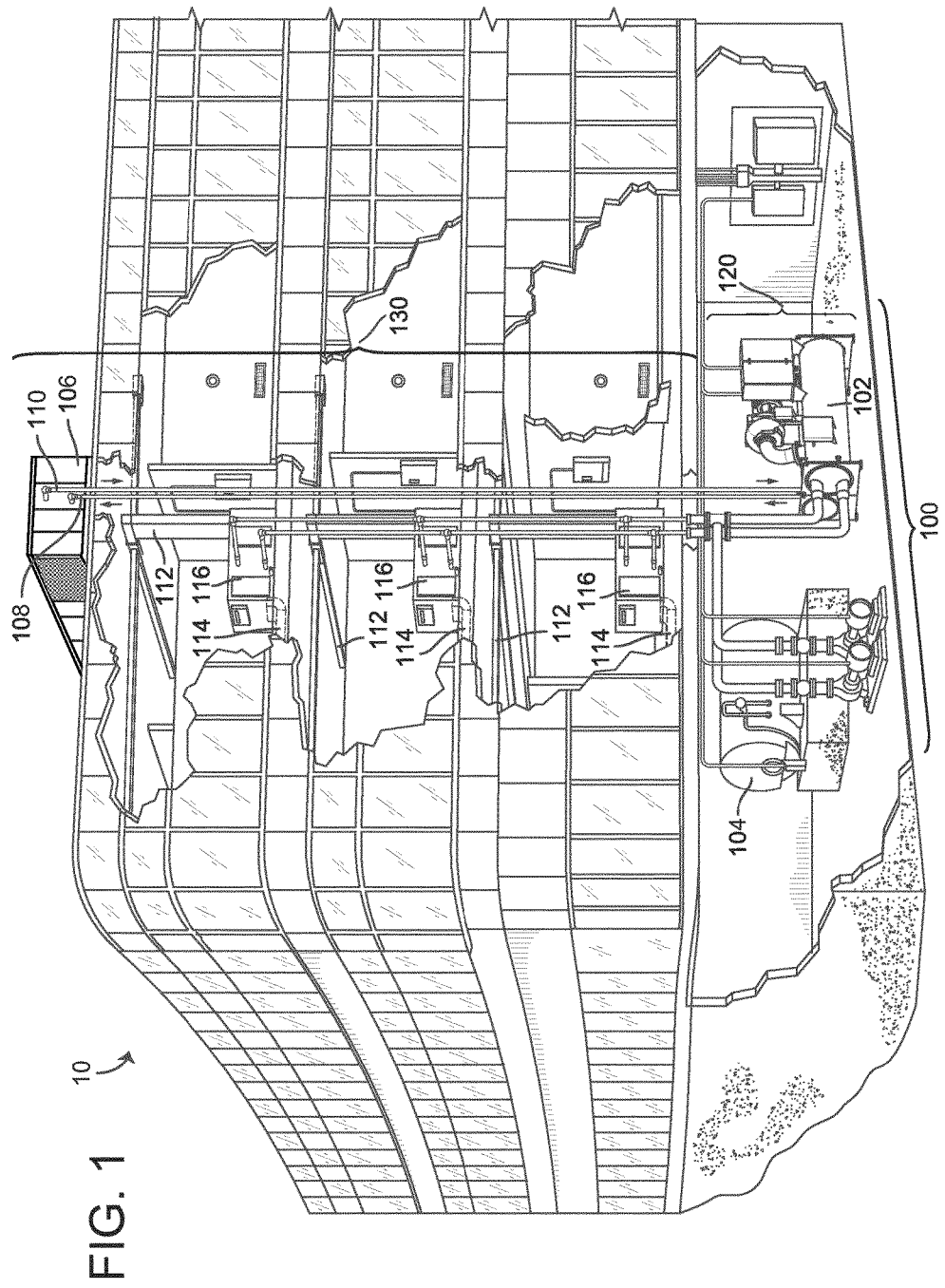
FIG. 1 is a drawing of a building equipped with a building management system (BMS) and a HVAC system

Referring generally to the FIGURES, a central plant and building management system with price-based and incentive-based demand response optimization are shown, according to various exemplary embodiments. The systems and methods described herein may be used to control the distribution, production, storage, and usage of resources in a central plant. In some embodiments, a central plant controller performs an optimization process determine an optimal allocation of resources (e.g., thermal energy resources, water, electricity, etc.) for each time step within an optimization period. The optimal allocation of resources may include, for example, an optimal amount of each resource to purchase from utilities, an optimal amount of each resource to produce or convert using generator subplants, an optimal amount of each resource to store or remove from storage subplants, an optimal amount of each resource to sell to energy purchasers, and/or an optimal amount of each resource to provide to a building or campus.

The central plant controller may be configured to maximize the economic value of operating the central plant over the duration of the optimization period. The economic value may be defined by a value function that expresses economic value as a function of the control decisions made by the controller. The value function may account for the cost of resources purchased from utilities, revenue generated by selling resources to energy purchasers, and the cost of operating the central plant. In some embodiments, the cost of operating the central plant includes a cost for losses in battery capacity as a result of the charging and discharging electrical energy storage. The cost of operating the central plant may also include a cost of equipment degradation during the optimization period.

In some embodiments, the controller maximizes the life cycle economic value of the central plant equipment while participating in price-based demand response (PBDR) programs, incentive-based demand response (IBDR) programs, or simultaneously in both PBDR and IBDR programs. For IBDR programs, the controller may use statistical estimates of past clearing prices, mileage ratios, and event probabilities to determine the revenue generation potential of selling stored energy to energy purchasers. For PBDR programs, the controller may use predictions of ambient conditions, facility thermal loads, and thermodynamic models of installed equipment to estimate the resource consumption of the building and/or the subplants. The controller may use predictions of the resource consumption to monetize the costs of running the central plant equipment.

The controller may automatically determine (e.g., without human intervention) a combination of PBDR and/or IBDR programs in which to participate over the optimization period in order to maximize economic value. For example, the controller may consider the revenue generation potential of IBDR programs, the cost reduction potential of PBDR programs, and the equipment maintenance/replacement costs that would result from participating in various combinations of the IBDR programs and PBDR programs. The controller may weigh the benefits of participation against the costs of participation to determine an optimal combination of programs in which to participate. Advantageously, this allows the controller to determine an optimal set of control decisions (e.g., an optimal resource allocation) that maximizes the overall value of operating the central plant over the optimization period.

In some instances, the controller may determine that it would be beneficial to participate in an IBDR program when the revenue generation potential is high and/or the costs of participating are low. For example, the controller may receive notice of a synchronous reserve event from an IBDR program which requires the central plant to shed a predetermined amount of power. The controller may determine that it is optimal to participate in the IBDR program if a cold thermal energy storage subplant has enough capacity to provide cooling for the building while the load on a chiller subplant is reduced in order to shed the predetermined amount of power.

In other instances, the controller may determine that it would not be beneficial to participate in an IBDR program when the resources required to participate are better allocated elsewhere. For example, if the building is close to setting a new peak demand that would greatly increase the PBDR costs, the controller may determine that only a small portion of the electrical energy stored in the electrical energy storage will be sold to energy purchasers in order to participate in a frequency response market. The controller may determine that the remainder of the electrical energy will be used to power the chiller subplant to prevent a new peak demand from being set. These and other features of the central plant and/or building management system are described in greater detail below.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG.

1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
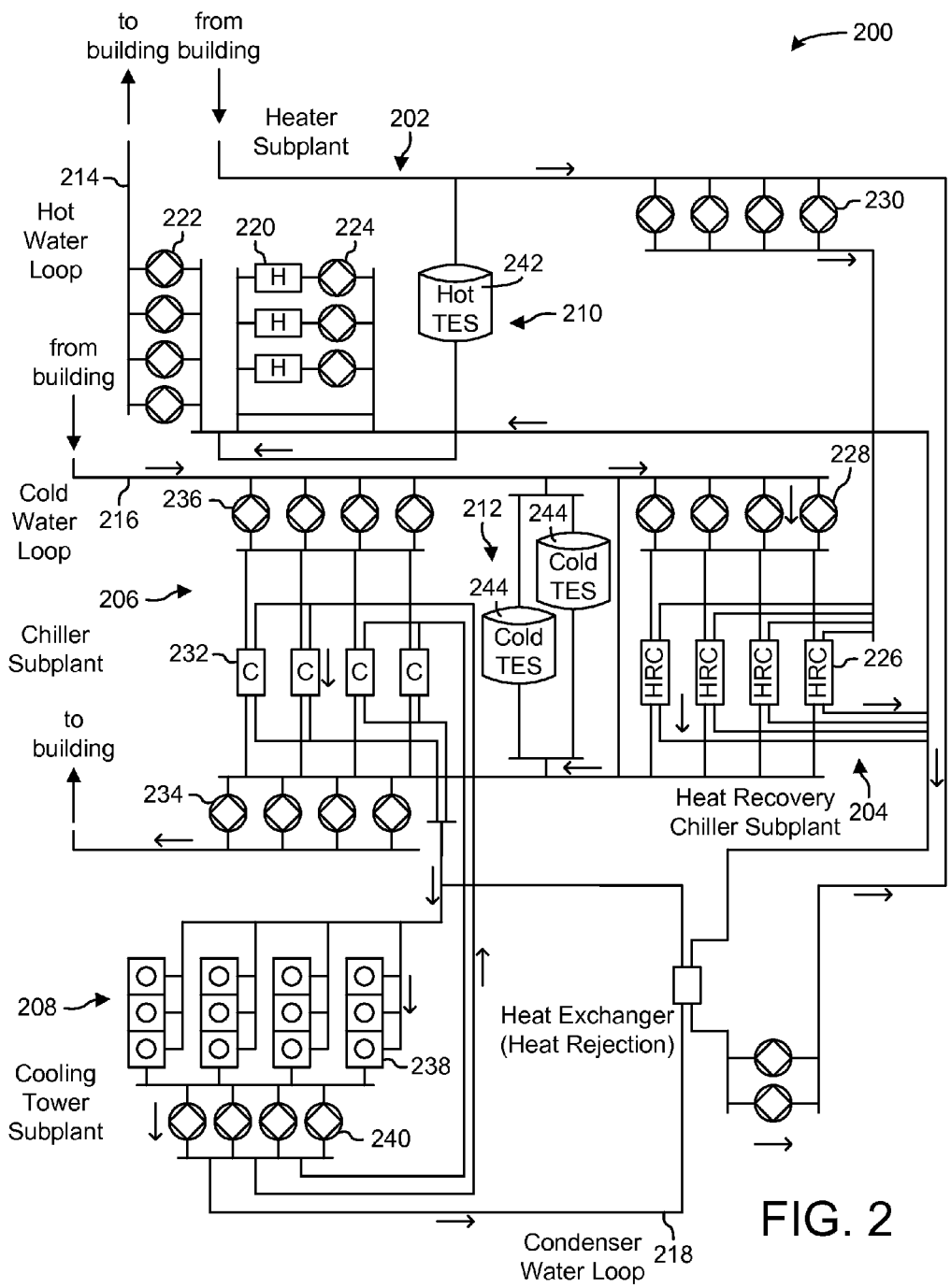
FIG. 2 is a schematic diagram of a waterside system, shown as a central plant, which may be used to provide resources to the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

Waterside system 200 is shown in FIG. 2 as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
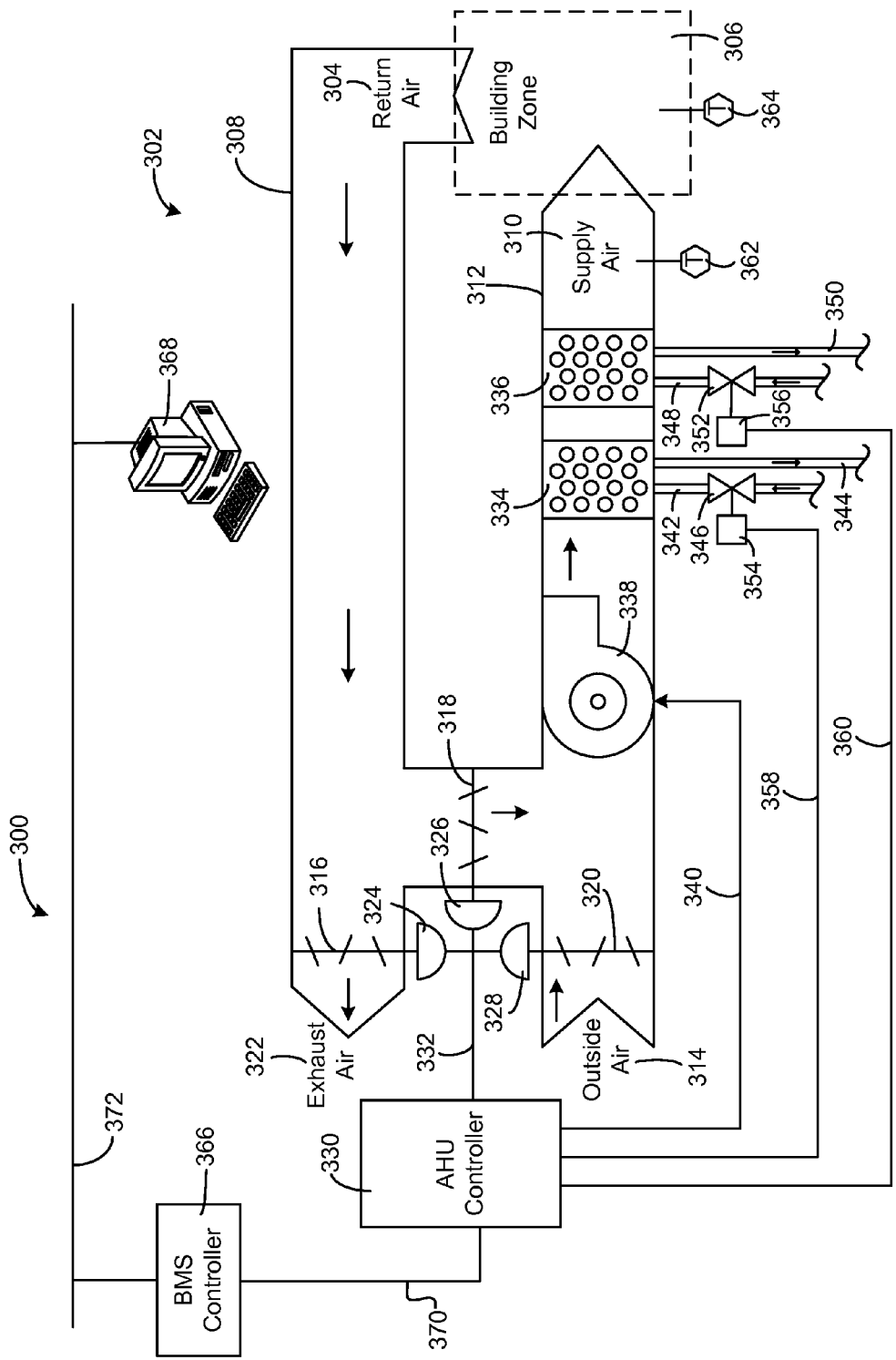
FIG. 3 is a schematic diagram of an airside system which may be used to provide resources to the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

Airside system 300 is shown in FIG. 3 as an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
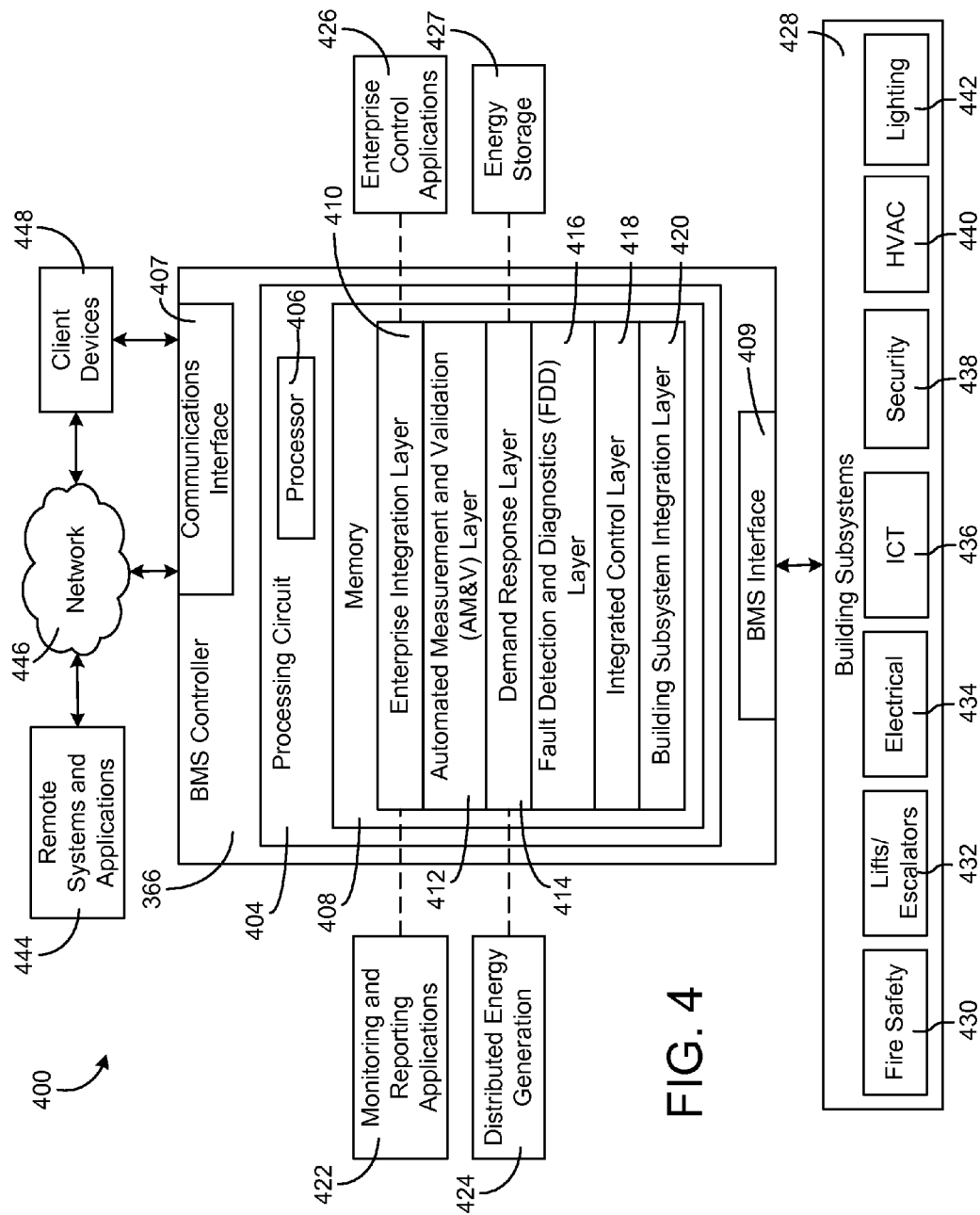
FIG. 4 is a block diagram illustrating the BMS of FIG. 1 in greater detail, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, waterside system 200, and/or airside system 300, as described with reference to FIGS. 1-3. For example, HVAC subsystem 440 may include one or more chillers, boilers, heat exchangers, air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, energy storage 427 (e.g., hot TES 242, cold TES 244, electrical energy storage, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Central Plant System with Thermal and Electrical Energy Storage

Figure 5:
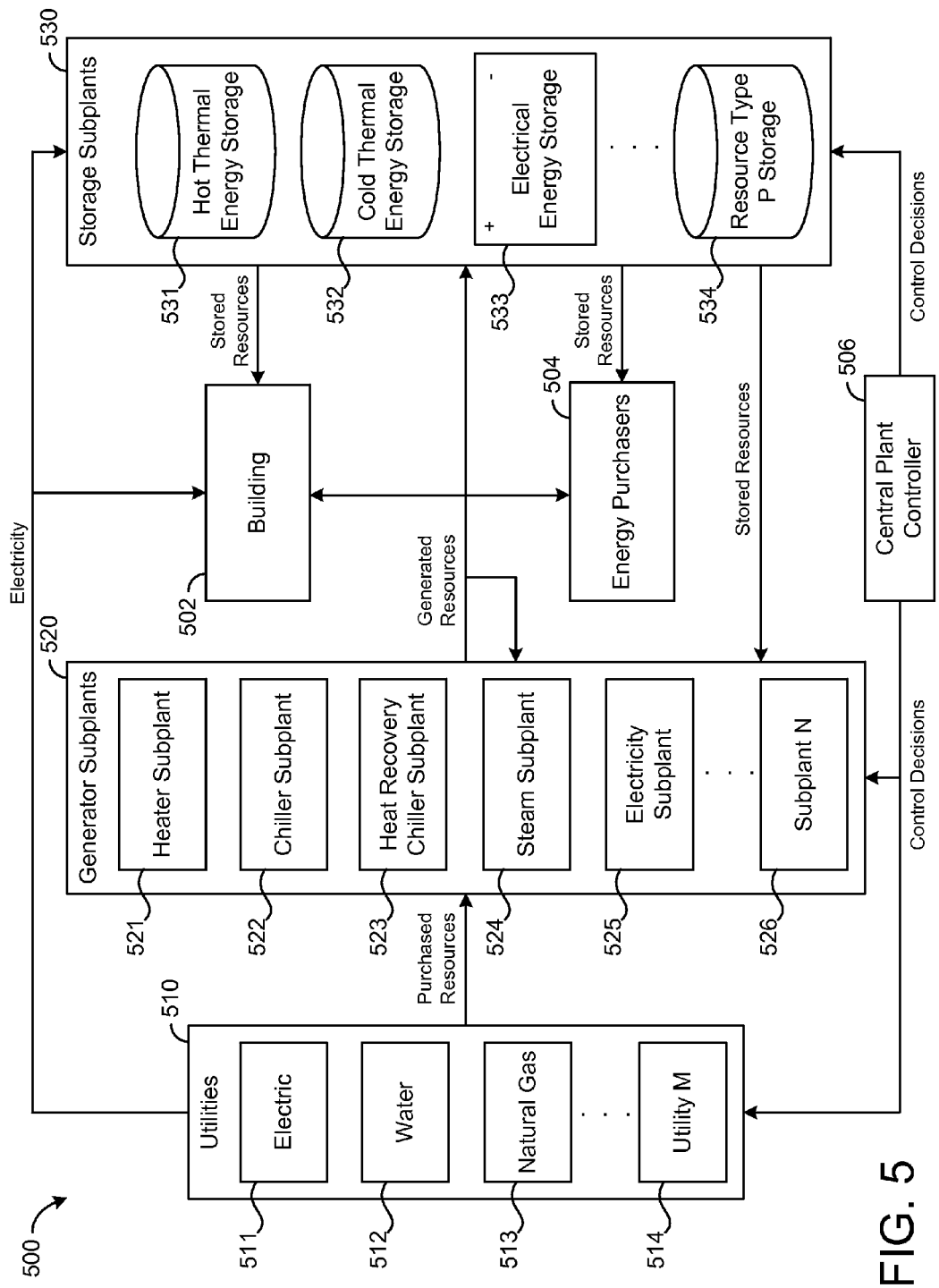
FIG. 5 is a block diagram illustrating a central plant system including a central plant controller that may be used to control the central plant of FIG. 2, according to an exemplary embodiment.

Referring now to FIG. 5, a block diagram of a central plant system 500 is shown, according to an exemplary embodiment. Central plant system 500 is shown to include a building 502. Building 502 may be the same or similar to building 10, as described with reference to FIG. 1. For example, building 502 may be equipped with a HVAC system and/or a building management system (e.g., BMS 400) that operates to control conditions within building 502. In some embodiments, building 502 includes multiple buildings (i.e., a campus) served by central plant system 500. Building 502 may demand various resources including, for example, hot thermal energy (e.g., hot water), cold thermal energy (e.g., cold water), and/or electrical energy. The resources may be demanded by equipment or subsystems within building 502 (e.g., building subsystems 428) or by external systems that provide services for building 502 (e.g., heating, cooling, air circulation, lighting, electricity, etc.). Central plant system 500 operates to satisfy the resource demand associated with building 502.

Central plant system 500 is shown to include a plurality of utilities 510. Utilities 510 may provide central plant system 500 with resources such as electricity, water, natural gas, or any other resource that can be used by central plant system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Central plant system 500 is shown to include a plurality of generator subplants 520. In some embodiments, generator subplants 520 include one or more of the subplants described with reference to FIG. 2. For example, generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Central plant system 500 is shown to include storage subplants 530. Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by central plant system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows central plant system 500 to smooth the resource demand of building 502 and reduces the maximum required capacity of generator subplants 520. Smoothing the demand also allows central plant system 500 to reduce the peak electricity consumption, which results in a lower demand charge.

In some embodiments, storage subplants 530 are used by central plant system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5, central plant system 500 is shown to include a central plant controller 506. Central plant controller 506 may be configured to control the distribution, production, storage, and usage of resources in central plant system 500. In some embodiments, central plant controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating central plant system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating central plant system 500. In some embodiments, the cost of operating central plant system 500 includes a cost for losses in battery capacity as a result of the charging and discharging electrical energy storage 533. The cost of operating central plant system 500 may also include a cost of excessive equipment start/stops during the optimization period.

Each of subplants 520-530 may include equipment that can be controlled by central plant controller 506 to optimize the performance of central plant system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from central plant controller 506.

In some embodiments, one or more of subplants 520-530 includes a subplant level controller configured to control the equipment of the corresponding subplant. For example, central plant controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of central plant system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating central plant system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires central plant system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

Central Plant Controller

Figure 6:
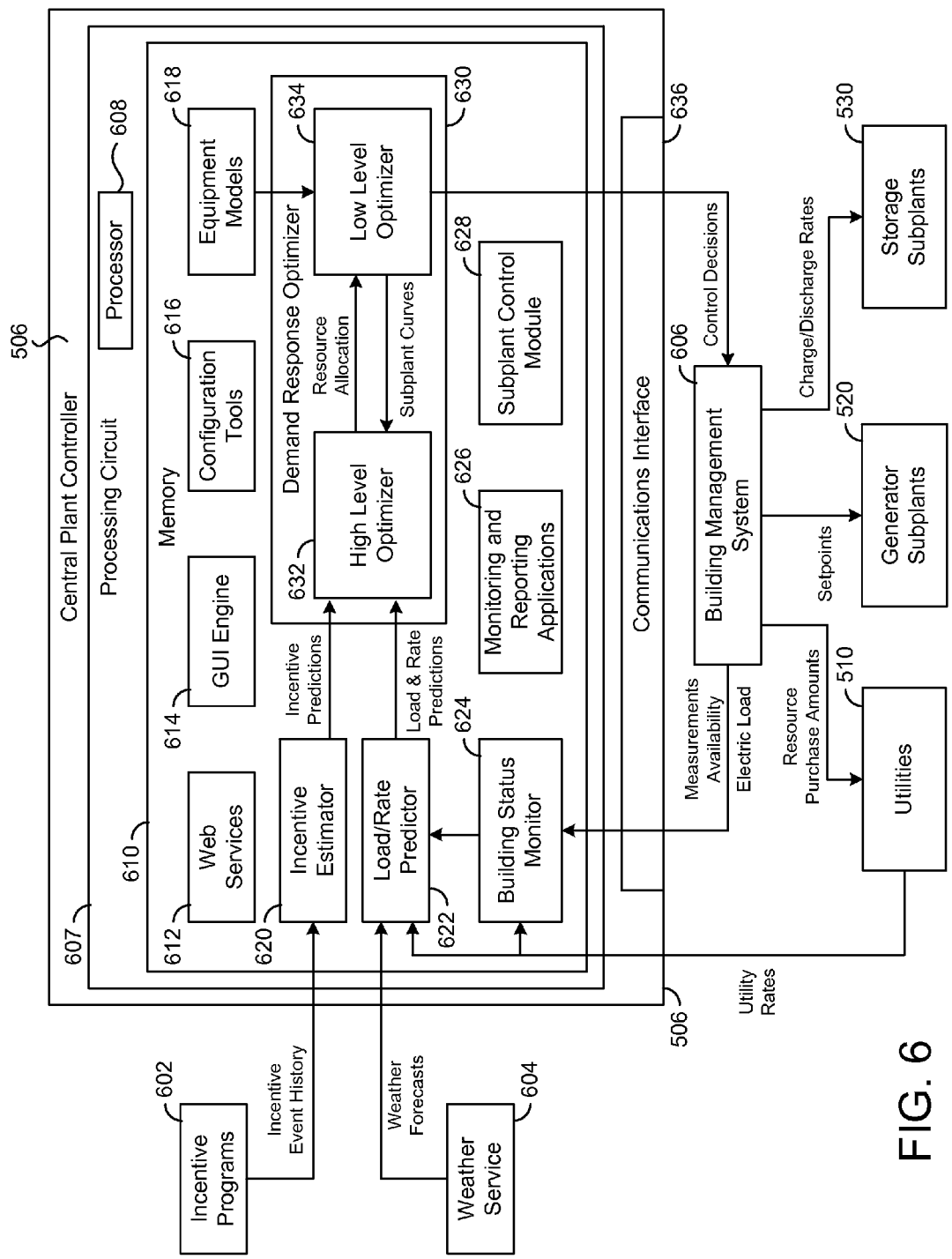
FIG. 6 is block diagram illustrating the central plant controller of FIG. 5 in greater detail, according to an exemplary embodiment.

Referring now to FIG. 6, a block diagram illustrating a central plant controller 506 in greater detail is shown, according to an exemplary embodiment. Central plant controller 506 is shown providing control decisions to a building management system (BMS) 606. In some embodiments, BMS 606 is the same or similar to BMS 400, as described with reference to FIG. 4. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to central plant controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from central plant controller 506 specifying on/off states, charge/discharge rates, and/or setpoints for the subplant equipment. BMS 606 may control the equipment (e.g., via actuators, power relays, etc.) in accordance with the control signals provided by central plant controller 506. For example, BMS 606 may operate the equipment using closed loop control to achieve the setpoints specified by central plant controller 506. In various embodiments, BMS 606 may be combined with central plant controller 506 or may be part of a separate building management system. According to an exemplary embodiment, BMS 606 is a METASYS® brand building management system, as sold by Johnson Controls, Inc.

Central plant controller 506 may monitor the status of the controlled building using information received from BMS 606. Central plant controller 506 may be configured to predict the thermal energy loads (e.g., heating loads, cooling loads, etc.) of the building for plurality of time steps in an optimization period (e.g., using weather forecasts from a weather service 604). Central plant controller 506 may also predict the revenue generation potential of IBDR programs using an incentive event history (e.g., past clearing prices, mileage ratios, event probabilities, etc.) from incentive programs 602. Central plant controller 506 may generate control decisions that optimize the economic value of operating central plant system 500 over the duration of the optimization period subject to constraints on the optimization process (e.g., energy balance constraints, load satisfaction constraints, etc.). The optimization process performed by central plant controller 506 is described in greater detail below.

According to an exemplary embodiment, central plant controller 506 is integrated within a single computer (e.g., one server, one housing, etc.). In various other exemplary embodiments, central plant controller 506 can be distributed across multiple servers or computers (e.g., that can exist in distributed locations). In another exemplary embodiment, central plant controller 506 may integrated with a smart building manager that manages multiple building systems and/or combined with BMS 606.

Central plant controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between central plant controller 506 and various external systems or devices (e.g., BMS 606, subplants 520-530, utilities 510, etc.). For example, central plant controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Central plant controller 506 may receive data regarding the overall building or building space to be heated or cooled by the central plant via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Central plant controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6, memory 610 is shown to include a load/rate predictor 622. Load/rate predictor 622 may be configured to predict the thermal energy loads ($\hat{l}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{l}_k$ as a function of the weather forecasts. In some embodiments, load/rate predictor 622 uses feedback from BMS 606 to predict loads $\hat{l}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 622 uses a deterministic plus stochastic model trained from historical load data to predict loads $\hat{l}_k$. Load/rate predictor 622 may use any of a variety of prediction methods to predict loads $\hat{l}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{l}_{Hot,k}$ and a cold water load $\hat{l}_{Cold,k}$ for each time step k within the prediction window. In some embodiments, load/rate predictor 622 makes load/rate predictions using the techniques described in U.S. patent application Ser. No. 14/717,593, titled "Building Management System for Forecasting Time Series Values of Building Variables" and filed May 20, 2015, the entire disclosure of which is incorporated by reference herein.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{l}_k$ and the utility rates in memory 610 and/or provide the predicted loads $\hat{l}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{l}_k$ and utility rates from load/rate predictor 622 to determine an optimal set of control decisions for each time step within the optimization period.

Still referring to FIG. 6, memory 610 is shown to include an demand response optimizer 630. Demand response optimizer 630 may perform a cascaded optimization process to optimize the performance of central plant system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating central plant system 500. Control decisions made by high level optimizer may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that central plant system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process is described in greater detail with reference to FIG. 7.

Still referring to FIG. 6, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of central plant controller 506 may be accessed by (or pushed to) monitoring and reporting applications 626. Monitoring and reporting applications 626 may be configured to generate real time "system health" dashboards that can be viewed and navigated by a user (e.g., a central plant engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 6, central plant controller 506 may include one or more GUI servers, web services 612, or GUI engines 614 to support monitoring and reporting applications 626. In various embodiments, applications 626, web services 612, and GUI engine 614 may be provided as separate components outside of central plant controller 506 (e.g., as part of a smart building manager). Central plant controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 506 may be configured to provide the results of any such processing to other databases, tables, XML files, or other data structures for further querying, calculation, or access by, for example, external monitoring and reporting applications.

Central plant controller 506 is shown to include configuration tools 616. Configuration tools 616 can allow a user to define (e.g., via graphical user interfaces, via prompt-driven "wizards," etc.) how central plant controller 506 should react to changing conditions in the central plant subsystems. In an exemplary embodiment, configuration tools 616 allow a user to build and store condition-response scenarios that can cross multiple central plant devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Cascaded Central Plant Optimization

Figure 7:
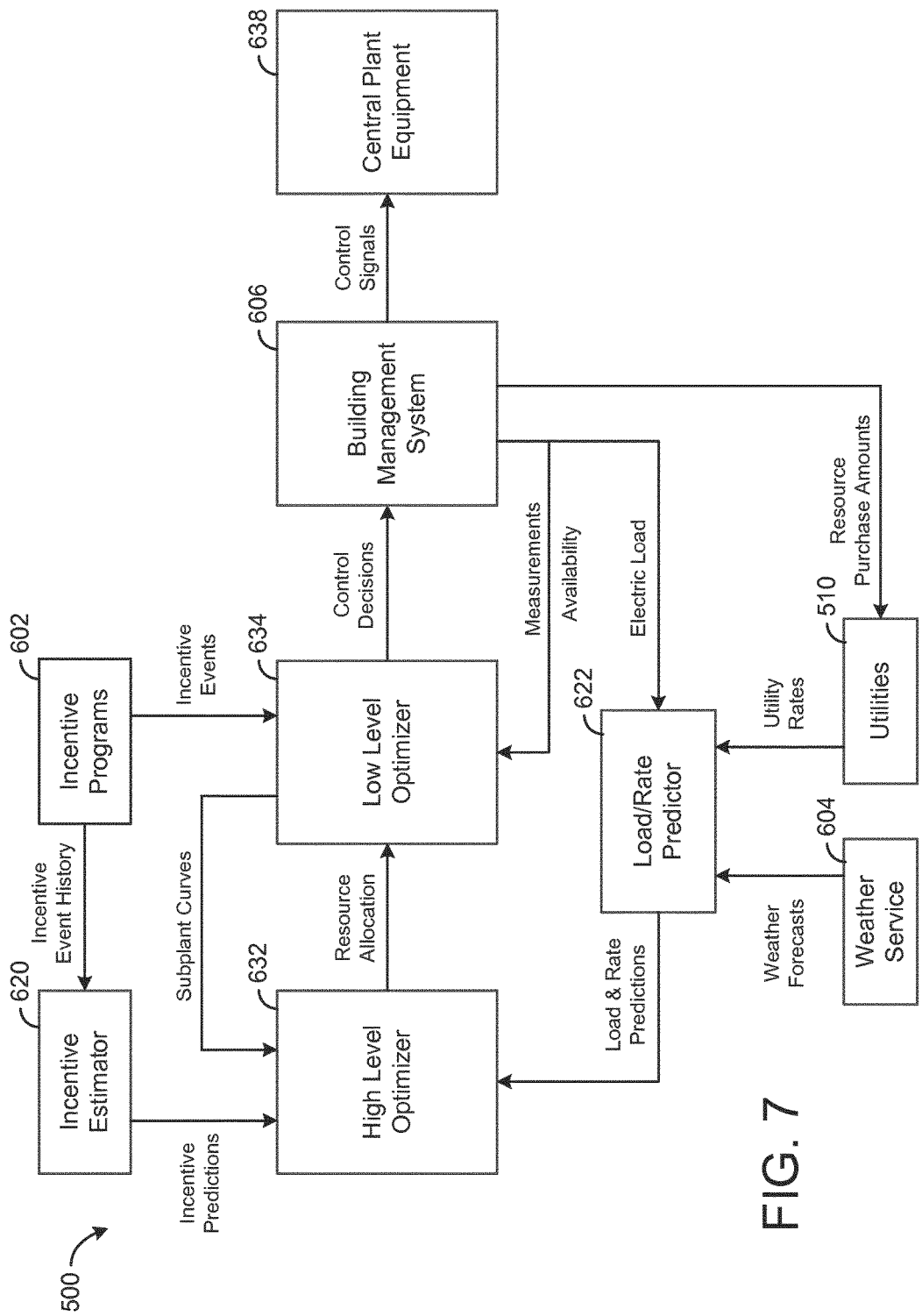
FIG. 7, a block diagram illustrating a portion of the central plant system of FIG. 5 in greater detail, according to an exemplary embodiment.

Referring now to FIG. 7, a block diagram illustrating a portion of central plant system 500 in greater detail is shown, according to an exemplary embodiment. FIG. 7 illustrates the cascaded optimization process performed by demand response optimizer 630 to optimize the performance of central plant system 500. In the cascaded optimization process, high level optimizer 632 performs a subplant level optimization that determines an optimal allocation of resources for each time step in the optimization period in order to optimize the value of operating central plant system 500. Low level optimizer 634 performs an equipment level optimization that determines how to best run each subplant based on the resource allocations determined by high level optimizer 632. For example, low level optimizer 634 may determine on/off states and/or operating setpoints for various devices of the subplant equipment in order to optimize the energy consumption of each subplant while meeting the thermal energy load setpoint for the subplant.

One advantage of the cascaded optimization process performed by demand response optimizer 630 is the optimal use of computational time. For example, the subplant level optimization performed by high level optimizer 632 may use a relatively long time horizon due to the operation of the thermal energy storage. However, the equipment level optimization performed by low level optimizer 634 may use a much shorter time horizon or no time horizon at all since the low level system dynamics are relatively fast (compared to the dynamics of the thermal energy storage) and the low level control of the subplant equipment may be handled by BMS 606. Such an optimal use of computational time makes it possible for demand response optimizer 630 to perform the central plant optimization in a short amount of time, allowing for real-time predictive control. For example, the short computational time enables demand response optimizer 630 to be implemented in a real-time planning tool with interactive feedback.

Another advantage of the cascaded optimization performed by demand response optimizer 630 is that the central plant optimization problem can be split into two cascaded subproblems. The cascaded configuration provides a layer of abstraction that allows high level optimizer 632 to distribute and allocate resources without requiring high level optimizer 632 to know or use any details regarding the particular equipment configuration within each subplant. The interconnections between the subplant equipment within each subplant may be hidden from high level optimizer 632 and handled by low level optimizer 634. For purposes of the subplant level optimization performed by high level optimizer 632, each subplant may be completely defined by one or more subplant curves.

Still referring to FIG. 7, low level optimizer 634 may generate and provide subplant curves to high level optimizer 632. Subplant curves may indicate the rate of resource consumption by each of subplants 520-530 (e.g., electricity use measured in kW, water use measured in L/s, etc.) as a function of the subplant's resource production (i.e., the subplant load). Exemplary subplant curves are shown and described in greater detail with reference to FIGS. 9A-12. In some embodiments, low level optimizer 634 generates subplant curves based on equipment models 618 (e.g., by combining equipment models 618 for individual devices into an aggregate curve for the subplant). Low level optimizer 634 may generate subplant curves by running the low level optimization process for several different loads and weather conditions to generate multiple data points. Low level optimizer 634 may fit a curve to the data points to generate a subplant curves. In other embodiments, low level optimizer 634 provides the data points to high level optimizer 632 and high level optimizer 632 generates the subplant curves using the data points.

High level optimizer 632 may receive the load and rate predictions from load/rate predictor 622, the incentive predictions from incentive estimator 620, and the subplant curves from low level optimizer 634. The load predictions may be based on weather forecasts from weather service 604 and/or information from BMS 606 (e.g., a current electric load of the building, measurements from the building, a history of previous loads, a setpoint trajectory, etc.). The utility rate predictions may be based on utility rates received from utilities 510 and/or utility prices from another data source. The incentive predictions may be estimates of IBDR event probabilities and their potential for revenue generation and may be based on a history IBDR events received from incentive programs 602.

High level optimizer 632 may determine an optimal resource allocation for subplants 520-530 (e.g., a subplant load for each subplant) for each time step the optimization period and may provide the allocation of resources as setpoints to low level optimizer 634. Resource allocations may include an amount of each input resource and each output resource consumed or produced by each of generator subplants 520 at each time step. Resource allocations may also include an amount of each resource charged or discharged from storage subplants 530, an amount of each resource purchased from utilities 510, and an amount of each resource sold to energy purchasers 504 for each time step in the optimization period. In some embodiments, high level optimizer 632 determines the resource allocation by maximizing the total operating value of central plant system 500 over the optimization period. For example, high level optimizer 632 may determine a set of control decisions that maximizes a value function. The value function may include IBDR revenue, resource purchase costs, and costs of equipment degradation resulting from the control decisions.

In some instances, the optimal resource allocation may include using storage subplants 530 to store resources during a first time step for use during a later time step. Resource storage may advantageously allow energy and other types of resources to be produced and stored during a first time period when energy prices are relatively low and subsequently retrieved and used during a second time period when energy proves are relatively high. The high level optimization may be different from the low level optimization in that the high level optimization has a longer time constant due to the storage provided by subplants 530.

The high level optimization may be described by the following equation:

$$\theta_{HL}^* = \operatorname*{argmax}_{\theta_{HL}} J_{HL}(\theta_{HL})$$

where $\theta_{HL}^*$ contains the optimal high level decisions (e.g., the optimal resource allocation) for the entire optimization period and $J_{HL}$ is the high level value function. To find the optimal high level decisions $\theta_{HL}^*$, high level optimizer 632 may maximize the high level cost function $J_{HL}$. The high level cost function $J_{HL}$ may include the revenue generated by participating in IBDR programs, the cost of resources purchased from utilities 510, and the cost of equipment degradation over the duration of the optimization period. In some embodiments, the high level cost function $J_{HL}$ is described using the following equation:

$$J_{HL} = \int_t^{t+h} (\$IBDR - \$PBDR - \$BL - \$Penalties)dt$$

where \$JBDR is the revenue generated from participating in IBDR programs, \$PBDR is the cost of resources purchased from utilities 510, \$BL is the cost of losses in battery capacity, and \$Penalties is the cost of operating the subplant equipment (e.g., equipment degradation due to start/stop commands). Each of these terms is described in greater detail with reference to FIG. 8.

The decision vector $\theta_{HL}$ may be subject to several constraints. For example, the constraints may require that each of generator subplants 520 not operate at more than its total capacity and that the input resources and output resources of each generator subplant 520 are related as defined by the subplant curves. The constraints may require that storage subplants 530 not charge or discharge too quickly and may constrain the amount of a resource stored in each of subplants 530 between zero and the maximum storage capacity of the subplant. The constraints may also require that resource demand for the building or campus is met. These restrictions lead to both equality and inequality constraints on the high level optimization problem, as described in greater detail with reference to FIG. 8.

Still referring to FIG. 7, low level optimizer 634 may use the resource allocations determined by high level optimizer 632 to determine optimal low level decisions $\theta_{LL}^*$ (e.g. binary on/off decisions, flow setpoints, temperature setpoints, etc.) for the subplant equipment. The low level optimization process may be performed for each of subplants 520-530. Low level optimizer 634 may be responsible for determining which devices of each subplant to use and/or the operating setpoints for such devices that will achieve the resource allocation setpoint while minimizing energy consumption.

The low level optimization may be described using the following equation:

$$\theta_{LL}^* = \operatorname*{argmin}_{\theta_{LL}} J_{LL}(\theta_{LL})$$

where $\theta_{LL}^*$ contains the optimal low level decisions and $J_{LL}$ is the low level cost function. To find the optimal low level decisions $\theta_{LL}^*$, low level optimizer 634 may minimize the low level cost function $J_{LL}$. The low level cost function $J_{LL}$ may represent the total energy consumption for all of the equipment in the applicable subplant. The low level cost function $J_{LL}$ may be described using the following equation:

$$J_{LL}(\theta_{LL}) = \sum_{j=1}^{N} t_s \cdot b_j \cdot \mu_j(\theta_{LL})$$

where N is the number of devices in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 634 may minimize the low level cost function $J_{LL}$ subject to inequality constraints based on the capacities of subplant equipment and equality constraints based on energy and mass balances. In some embodiments, the optimal low level decisions $\theta_{LL}^*$ are constrained by switching constraints defining a short horizon for maintaining a device in an on or off state after a binary on/off switch. The switching constraints may prevent devices from being rapidly cycled on and off. In some embodiments, low level optimizer 634 performs the equipment level optimization without considering system dynamics. The optimization process may be slow enough to safely assume that the equipment control has reached its steady-state. Thus, low level optimizer 634 may determine the optimal low level decisions $\theta_{LL}^*$ at an instance of time rather than over a long horizon.

Low level optimizer 634 may determine optimum operating statuses (e.g., on or off) for a plurality of devices of the subplant equipment. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 634 may also determine optimum operating setpoints for equipment using nonlinear optimization. Nonlinear optimization may identify operating setpoints that further minimize the low level cost function $J_{LL}$. Low level optimizer 634 may provide the on/off decisions and setpoints to building management system 606 for use in controlling the central plant equipment.

In some embodiments, the low level optimization performed by low level optimizer 634 is the same or similar to the low level optimization process described in U.S. patent application Ser. No. 14/634,615 titled "Low Level Central Plant Optimization" and filed Feb. 27, 2015. The entire disclosure of U.S. patent application Ser. No. 14/634,615 is incorporated by reference herein.

High Level Optimization

Figure 8:
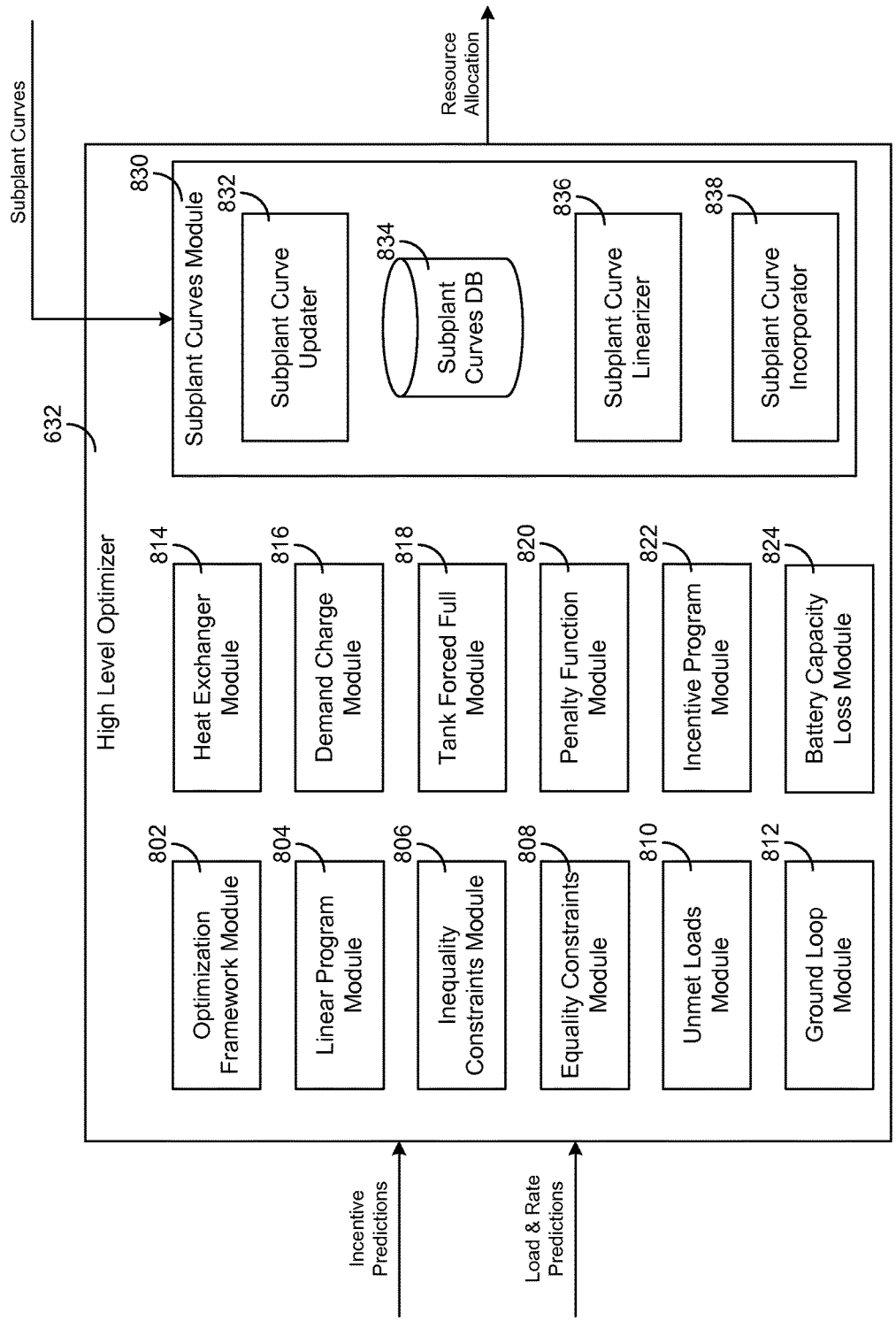
FIG. 8 is a block diagram illustrating a high level optimizer of the central plant controller of FIG. 5 in greater detail, according to an exemplary embodiment.

Referring now to FIG. 8, a block diagram illustrating high level optimizer 632 in greater detail is shown, according to an exemplary embodiment. High level optimizer 632 may receive load and rate predictions from load/rate predictor 622, incentive predictions from incentive estimator 620, and subplant curves from low level optimizer 634. High level optimizer 632 may determine an optimal resource allocation across central plant system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating central plant system 500 while satisfying the predicted loads for the building or campus. High level optimizer 632 may output the optimal resource allocation to low level optimizer 634.

Optimization Framework

High level optimizer 632 is shown to include an optimization framework module 802. Optimization framework module 802 may be configured to select and/or establish an optimization framework for use in determining the optimal resource allocation. In some embodiments, optimization framework module 802 uses linear programming as the optimization framework. A linear programming problem has the following form:

$$\underset{x}{\operatorname{argmin}} c^T x; \text{ subject to } Ax \le b, Hx = g$$

where c is a cost vector, x is a decision matrix, A and b are a matrix and vector (respectively) which describe inequality constraints on the optimization problem, and H and g are a matrix and vector (respectively) which describe equality constraints on the optimization problem. Revenue generated by IBDR programs may be expressed as negative costs in the cost vector c.

The following paragraphs describe an exemplary linear optimization framework that may be used by high level optimizer 632 to determine the optimal resource allocation. Advantageously, the linear programming framework described herein allows high level optimizer 632 to determine the resource allocation for a long optimization period in a very short timeframe complete with IBDR incentives, PBDR costs, and equipment degradation costs/penalties. However, the linear optimization framework is merely one example of an optimization framework that can be used by high level optimizer 632 and should not be regarded as limiting. It should be understood that in other embodiments, high level optimizer 632 may use any of a variety of other optimization frameworks and/or optimization techniques (e.g., quadratic programming, linear-fractional programming, nonlinear programming, combinatorial algorithms, etc.) to calculate the optimal resource allocation.

Linear Program

Still referring to FIG. 8, high level optimizer 632 is shown to include a linear program module 804. Linear program module 804 may be configured to formulate and solve a linear optimization problem to calculate the optimal resource allocation. For example, linear program module 804 may determine and set values for the cost vector c, the A matrix and the b vector which describe the inequality constraints, and the H matrix and the g vector which describe the equality constraints. Linear program module 804 may determine an optimal decision matrix x* that minimizes the cost function $c^T x$. The optimal decision matrix x* may correspond to the optimal decisions $\theta_{HL}^*$ (for each time step k within an optimization period) that maximize the high level cost function $J_{HL}$, as described with reference to FIG. 7.

Linear program module 804 may be configured to generate decision variables (i.e. variables in the decision matrix x) for each of the plant assets across which resources are allocated. For a central plant that includes chillers, heat recovery chillers, hot water generators, thermal energy storage, and electrical energy storage, the plant assets across which the resources are to be allocated may include a chiller subplant 522, a heat recovery chiller subplant 523, a heater subplant 521 a hot thermal energy storage subplant 531, a cold thermal energy storage subplant 532, and an electrical energy storage subplant 533. For other central plants, the plant assets across which the resources are to be allocated may include fewer or additional subplants, depending on the particular configuration and components of the central plant.

For each subplant across which resources are allocated, linear program module 804 may generate decision variables representing an amount of each input resource to the subplant and each output resource from the subplant for each time step k in the optimization period. For example, a chiller subplant may consume two different types of input resources (e.g., electricity and water) and may produce one output resource (e.g., chilled water). For a generator subplant with two input resources and one output resource, linear program module 804 may add the following variables to the decision matrix x:

$$x = [\ldots, x_{sp_n, in_1, 1} \ldots_h, x_{sp_n, in_2, 1} \ldots_h, x_{sp_n, out_1, 1} \ldots_h \ldots ]^T$$

where $x_{sp_n, in_1, 1 \ldots h}$, $x_{sp_n, in_2, 1 \ldots h}$, and $x_{sp_n, out_1, 1 \ldots h}$ are h-dimensional vectors representing amounts of the first input resource in$_1$, the second input resource in$_2$, and the first output resource out$_1$ allocated to the nth subplant sp$_n$ for each of the h time steps within the optimization period. Linear program module 804 may repeat this process for each of generator subplants 520, adding one or more input resource decision variables and one or more output resource decision variables for each generator subplant. Decision variables representing the input resources and output resources of a subplant may have no direct costs associated with them. Therefore, linear program module 804 may add a zero cost element to the cost vector c for each decision variable representing an input resource or output resource. For example, for a generator subplant with two input resources and one output resource, linear program module 804 may add the following elements to the cost vector c:

$$c = [\ldots 0\ 0\ 0 \ldots]^T$$

For each type of resource allocated, linear program module 804 may generate a decision variable representing an amount of the resource stored or discharged from storage subplants 530 for each time step k in the optimization period. In some embodiments, each storage subplant stores and/or discharges a different type of resource. For example, cold TES subplant 532 may store and discharge cold thermal energy (e.g., cold water), whereas electrical storage subplant 533 may store and discharge electrical energy. In other embodiments, multiple storage subplants 530 may store/discharge the same type of resource. In various embodiments, linear program module 804 may generate a single storage/discharge variable for each type of resource or a storage/discharge variable for each of subplants 530, even if multiple subplants 530 store/discharge the same type of resource.

Linear program module 804 may also generate a decision variable representing an amount of overproduction (if any) and a decision variable representing an amount of underproduction (if any) for each type of resource. Underproduction may occur when the amount of a resource provided to the building or campus is less than the demand for the resource. Conversely, overproduction may occur when the amount of a resource provided to the building or campus exceeds the demand for the resource. For each type of resource, linear program module 804 may add the following variables to the decision matrix x:

$$x = [\ldots x_{resource_p, under, 1 \ldots h}\ x_{resource_p, over, 1 \ldots h}\ x_{resource_p, storage, 1 \ldots h} \ldots]^T$$

where $x_{resource_p, under, 1 \ldots h}$ and $x_{resource_p, over, 1 \ldots h}$ are h-dimensional vectors representing amounts of underproduction and overproduction of the pth resource for each of the h time steps within the optimization period. $x_{resource_p, storage, 1 \ldots h}$ is a h-dimensional vector representing an amount of the pth resource drawn from storage subplants 530 for each of the h time steps. The storage draw may be positive if the resource is being withdrawn from storage subplants 530 or negative if the resource is being stored in storage subplants 530.

Decision variables representing the storage draw from subplants 530 may have no direct costs associated with them. Therefore, linear program module 804 may add a zero cost element to the cost vector c for each decision variable representing a storage draw. However, linear program module 804 may assign a high cost to decision variables representing overproduction and/or underproduction. For example, for a particular resource p, linear program module 804 may add the following elements to the cost vector c:

$$c = [\ldots M\ M\ 0 \ldots]^T$$

where M is the cost assigned to overproduction and underproduction of resource p and 0 is the cost assigned to the storage draw of resource p. Advantageously, assigning a high cost to overproduction and underproduction ensures that high level optimizer 632 does not select a set of decision variables that results in overproduction and/or underproduction unless the central plant is running at full capacity.

For each source from which resources can be purchased (e.g., utilities 510), linear program module 804 may generate a decision variable representing an amount of each resource purchased for each time step k in the optimization period. In some embodiments, each resource source provides a different type of resource. For example, electric utility 511 may provide electricity, whereas natural gas utility 513 may provide natural gas. For each resource source, linear program module 804 may add the following decision variable to the decision matrix x:

$$x = [\ldots x_{resource_p, source_m, 1 \ldots h} \ldots]^T$$

where $x_{resource_p, source_m}$ is the amount of resource p purchased from source m for each of the h time steps in the optimization period. Linear program module 804 may repeat this process for each of resource source, adding a resource purchase variable for each type of resource purchased.

Decision variables representing resource purchases may have a direct cost associated with them. Therefore, linear program module 804 may add a non-zero cost to the cost vector c for each decision variable representing a resource purchase. For example, linear program module 804 may add the following element to the cost vector c:

$$c = [\ldots c_{resource_p, source_m, 1 \ldots h} \ldots]^T$$

where $c_{resource_p, source_m, 1 \ldots h}$ is the cost of purchasing resource p from source m at each of the h time steps in the optimization period.

In some embodiments, linear program module 804 uses the load and rate predictions to formulate the linear program. For example, linear program module 804 may use the load predictions to determine a demand for each type of resource. The demand for each resource may be used to determine the amount of overproduction and/or underproduction. Linear program module 804 may use the rate predictions to determine values for the elements in cost vector c associated with resource purchases.

In some embodiments, linear program module 804 formulates the linear program for the simple case in which only resource purchase costs and over/underproduction are considered. Linear program module 804 may use inputs from inequality constraints module 806, equality constraints module 808, unmet loads module 810, ground loop module 812, heat exchanger module 814, demand charge module 816, tank forced full module 818, penalty function module 820, incentive program module 822, battery capacity loss module 824, and/or subplant curves module 830 to determine and set values for the various matrices and vectors in the linear program. Modules 806-830 may modify the cost vector c, the A matrix, the b vector, the H matrix, and/or the g vector to provide additional enhancements and/or functionality to the linear program. The inputs provided by modules 806-830 are described in greater detail below.

Linear program module 804 may use any of a variety of linear optimization techniques to solve the linear optimization problem. For example, linear program module 804 may use basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve the linear program subject to the optimization constraints. For embodiments in which nonlinear optimization is used, linear program module 804 may use any of a variety of nonlinear optimization techniques to solve the nonlinear optimization problem.

Inequality Constraints

Still referring to FIG. 8, high level optimizer 632 is shown to include an inequality constraints module 806. Inequality constraints module 806 may formulate or define one or more inequality constraints on the optimization problem solved by linear program module 804. In some instances, inequality constraints module 806 defines inequality constraints on the decision variables corresponding to the loads on generator subplants 520 for each time step k within optimization period. For example, each of subplants 520 may have two capacity constraints given by the following equations:

$$x_{sp_n} \leq x_{sp_n,max_1} \quad \forall k \in \text{horizon}$$

$$x_{sp_n} \geq 0 \quad \forall k \in \text{horizon}$$

where $x_{sp_n}$ is the output of the nth subplant during time step k and $x_{sp_n,max_1}$ is the maximum capacity of the nth subplant with respect to a first output resource. The first capacity constraint requires the output $x_{sp_n}$ of the subplant to be less than or equal to the maximum capacity $x_{sp_n,max_1}$ of the subplant for each time step k within the optimization period. The second capacity constraint requires the output $x_{sp_n}$ of the subplant to be greater than or equal to zero for each time step k within the optimization period.

As previously described, the input and output resources for each generator subplant 520 may be defined by the decision variables:

$$x = [\ldots x_{sp_n,in_1,1} \ldots h \, x_{sp_n,in_2,1} \ldots h \, x_{sp_n,out_1,1} \ldots h \cdots ]^T$$

The inequality constraints for each subplant 520 can be placed in the form $Ax \leq b$ by defining the A matrix and the b vector as follows:

$$A = \begin{bmatrix} \ldots & 0 & 0 & I_h & \ldots \\ \ldots & 0 & 0 & -I_h & \ldots \end{bmatrix}, \quad b = \begin{bmatrix} \vdots \\ x_{sp_n,max_1} \\ 0_h \\ \vdots \end{bmatrix}$$

where $I_h$ represents either an h by h identity matrix or an h by 1 ones vector, $0_h$ represents either an h by h zero matrix or an h by 1 zero vector, and $x_{sp_n,max_1}$ is the maximum capacity of subplant n. Inequality constraints module 806 may formulate similar inequality constraints for each of generator subplants 520.

Inequality constraints module 806 may formulate or define inequality constraints on the decision variables representing the draw from storage subplants 530 for each time step k within the optimization period. For example, each of subplants 530 may have two capacity constraints given by the following equations:

$$x_{storage_p} \leq x_{discharge_{p,max}} \quad \forall k \in \text{horizon}$$

$$-x_{storage_p} \leq x_{charge_{p,max}} \quad \forall k \in \text{horizon}$$

where $x_{storage_p}$ is the rate at which the pth storage subplant is being discharged at time step k, $x_{discharge_{p,max}}$ is the maximum discharge rate of the pth storage subplant, and $x_{charge_{p,max}}$ is the maximum charge rate of the pth storage subplant. Positive values for $x_{storage_p}$ indicate that the storage subplant is discharging and negative load values for $x_{storage_p}$ indicate that the storage subplant is charging. The first capacity constraint requires the discharge rate $x_{storage_p}$ for each of storage subplants 530 to be less than or equal to the maximum discharge rate $x_{discharge_{p,max}}$ of the subplant for each time step k within the optimization period. The second capacity constraint requires the negative discharge rate $-x_{storage_p}$ (i.e., the charge rate) for each of subplants 530 to be less than or equal to the maximum charge rate $x_{charge_{p,max}}$ of the subplant for each time step k within the optimization period. Each of storage subplants 530 may also have capacity constraints that require the amount of the stored resource to be no less than zero and no greater than the maximum capacity of the storage.

The inequality constraints for storage subplants 530 can be placed in the form $Ax \leq b$ by defining the A matrix and the b vector as follows:

$$A = \begin{bmatrix} \ldots & 0 & 0 & I_h & \ldots \\ \ldots & 0 & 0 & -I_h & \ldots \\ \ldots & 0 & 0 & T_s\Delta_h & \ldots \\ \ldots & 0 & 0 & -T_s\Delta_h & \ldots \end{bmatrix},$$

$$b = \begin{bmatrix} \vdots \\ x_{discharge_{p,max}} \\ x_{charge_{p,max}} \\ C_{storage_{p,0}} \\ C_{storage_{p,max}} - C_{storage_{p,0}} \\ \vdots \end{bmatrix}$$

where $C_{storage_{p,0}}$ is the current state of charge of storage subplant p (e.g., at time step k=0), $C_{storage_{p,max}}$ is the maximum storage capacity of storage subplant p, $T_s$ is the duration of one time step, and $\Delta_h$ is a lower diagonal matrix of ones. Inequality constraints module 806 may generate similar inequality constraints for each of storage subplants 530.

Inequality constraints module 806 may generate inequality constraints that limit the maximum rate at which resources can be purchased from utilities 510. As previously described, the decision matrix x may include variables representing the amount of each resource purchased from utilities 510:

$$x = [\ldots x_{resource_p,source_m,1} \ldots h \cdots ]^T$$

where $x_{resource_p,source_m}$ is the amount of resource p purchased from source m for each of the h time steps in the optimization period. Inequality constraints module 806 may generate the following inequality constraints to limit the purchase amount of resource p to no greater than the maximum allowable purchase during each time step:

$$A = [\ldots \, I_h \, \ldots ],$$

$$b = \begin{bmatrix} \vdots \\ x_{source_{m,max}} \\ \vdots \end{bmatrix}$$

where $x_{source_{m,max}}$ is the maximum allowable purchase from source m.

Inequality constraints module 806 may implement an electrical demand constraint for the electric power purchased from utilities 510. Inequality constraints module 806 may require that the electric power purchased be less than or equal to a maximum electrical demand $P_{elec,max}$ by defining the A matrix and the b vector as follows:

$$A = [\ldots \ x_{elec}1_h \ \ldots],$$

$$b = \begin{bmatrix} \vdots \\ P_{elec,max}1_h \\ \vdots \end{bmatrix}$$

where $x_{elec}$ represents the electricity purchased from utilities 510 and $P_{elec,max}$ is the maximum electrical demand for the central plant system.

Equality Constraints

Still referring to FIG. 8, high level optimizer 632 is shown to include an equality constraints module 808. Equality constraints module 808 may formulate or define one or more equality constraints on the optimization problem solved by linear program module 804. The equality constraints may ensure that the predicted resource demand of the building or campus are satisfied for each time step k in the optimization period. Equality constraints module 808 may formulate an equality constraint for each type of resource (e.g., hot water, cold water, electricity etc.) to ensure that the demand for the resource is satisfied. The equality constraints may be given by the following equation:

$$\sum_{i=1}^{n_s} x_{p,i,k} = \hat{l}_{p,k} \ \forall k \in \text{horizon}$$

where $x_{p,i,k}$ is the resource output of type p (e.g., hot water, cold water, etc.) by the ith subplant during time step k, $n_s$ is the total number of subplants capable of outputting resource p, and $\hat{l}_{p,k}$ is the predicted demand for resource type p at time step k. The predicted resource demand may be received as load predictions from load/rate predictor 622.

In some embodiments, the predicted resource demands include a predicted hot water thermal energy load $\hat{l}_{Hot,k}$, a predicted cold water thermal energy load $\hat{l}_{Cold,k}$, and a predicted electricity load $\hat{l}_{Elec,k}$ for each time step k. The predicted hot water thermal energy load $\hat{l}_{Hot,k}$ may be satisfied by the combination of heater subplant 521, heat recovery chiller subplant 523, and hot TES subplant 532. The predicted cold water thermal energy load $\hat{l}_{Cold,k}$ may be satisfied by the combination of chiller subplant 522, heat recovery chiller subplant 523, and cold TES subplant 532. The predicted electricity load $\hat{l}_{Elec,k}$ may include the electric demand of the building and may be satisfied by the combination of electricity subplant 525, electric utility 511, and electrical energy storage subplant 533. Electricity sold to energy purchasers 504 and electricity consumed by generator subplants 520 may add to the predicted electricity load $\hat{l}_{Elec,k}$.

The equality constraints can be placed in the form $Hx=g$ by defining the H matrix and the g vector as follows:

$$H = \begin{bmatrix} I_h & -I_h & 0_h & 0_h \\ I_h & -I_h & 0_h & 0_h \\ I_h & -I_h & I_h & -I_h \end{bmatrix}, g = \begin{bmatrix} \hat{l}_{Cold,1\ldots h} \\ \hat{l}_{Hot,1\ldots h} \\ \hat{l}_{Elec,1\ldots h} \end{bmatrix}$$

where $\hat{l}_{Cold,1\ldots h}$, $\hat{l}_{Hot,1\ldots h}$, and $\hat{l}_{Elec,1\ldots h}$ are h-dimensional vectors of predicted cold water loads, predicted hot water loads, and predicted electricity loads for the building or campus at each of the h time steps. The first column of the H matrix applies to any output of the corresponding resource (i.e., resource production) from subplants 520-530. The second column of the H matrix applies to any input of the corresponding resource (i.e., consumption consumption) by subplants 520-530. The third column of the H matrix applies to any purchase of the corresponding resource from utilities 510. The fourth column of the H matrix applies to any sale of the corresponding resource to energy purchasers 504. For central plants that provide one or more additional types of resource, an additional row may be added to the H matrix and the g vector to define the equality constraints for each additional resource provided by the central plant.

In some embodiments, equality constraints module 808 augments the H matrix and the g vector to define relationships between the input resources and output resources of various subplants. The relationships between input and output resources may be defined by subplant curves. For example, the subplant curve for chiller subplant 522 may specify that each unit of cold thermal energy (e.g., kW) produced as an output resource requires 0.15 kW of electricity and 0.5 gal/hr of water as input resources. In this example, equality constraints module 808 may augment the H matrix and the g vector as follows:

$$H = \begin{bmatrix} \ldots & 6.67I_h & 0_h & -I_h \\ \ldots & 0_h & 2I_h & -I_h \end{bmatrix}, g = \begin{bmatrix} 0_h \\ 0_h \end{bmatrix}$$

The first row indicates that the amount of the output resource (e.g., cold water) produced is 6.67 times greater than the amount of the first input resource (e.g., electricity). In other words, 6.67 times the amount of the first input resource equals the output resource (e.g., 0.15*6.67~1.0). The second row indicates that the amount of the output resource (e.g., cold water) produced is 2 times greater than the amount of the second input resource (e.g., water). In other words, 2 times the amount of the second input resource equals the output resource (e.g., 0.5*2~1.0). Equality constraints based on subplant curves are described in greater detail below with reference to subplant curves module 830.

Unmet Load Incorporation

Still referring to FIG. 8, high level optimizer 632 is shown to include an unmet loads module 810. In some instances, the central plant equipment may not have enough capacity or reserve storage to satisfy the predicted resource demand, regardless of how the resources are allocated. In other words, the high level optimization problem may have no solution that satisfies all of the inequality and equality constraints, even if the applicable subplants are operated at maximum capacity. Unmet loads module 810 may be configured to modify the high level optimization problem to account for this possibility and to allow the high level optimization to find the solution that results in the minimal amount of unmet loads.

In some embodiments, unmet loads module 810 modifies the decision variable matrix x by introducing a slack variable for each type of resource. The slack variables represent an unsatisfied (e.g., unmet, deferred, etc.) amount of each type of resource. For example, unmet loads module 810 may modify the decision variable matrix x as follows:

$$x = [\ldots x_{ColdUnmet,1} \ldots h, x_{HotUnmet,1} \ldots h, x_{ElecUnmet,1} \ldots h \cdots]^T$$

where $x_{ColdUnmet,1 \ldots h}$, $x_{HotUnmet,1 \ldots h}$, and $x_{ElecUnmet,1 \ldots h}$ are h-dimensional vectors representing a total deferred cold thermal energy load, a total deferred hot thermal energy load, and a total deferred electrical load respectively, at each time step k within the optimization period. In some embodiments, the decision variables $x_{HotUnmet,1 \ldots h}$, and $x_{ElecUnmet,1 \ldots h}$ represent total deferred loads that have accumulated up to each time step k rather than the incremental deferred load at each time step. The total deferred load may be used because any deferred load is likely to increase the required load during subsequent time steps.

Unmet loads module 810 may modify the equality constraints to account for any deferred thermal energy loads. The modified equality constraints may require that the predicted thermal energy loads are equal to the total loads satisfied by subplants 520-530 plus any unsatisfied thermal energy loads. The modified equality constraints can be placed in the form Hx=g by defining the H matrix and the g vector as follows:

$$H = \begin{bmatrix} I_h & -I_h & 0_h & 0_h & I_h - D_{-1} & 0_h & 0_h \\ I_h & -I_h & 0_h & 0_h & 0_h & I_h - D_{-1} & 0_h \\ I_h & -I_h & I_h & -I_h & 0_h & 0_h & I_h - D_{-1} \end{bmatrix},$$

$$g = \begin{bmatrix} \hat{l}_{Cold,1 \ldots h} \\ \hat{l}_{Hot,1 \ldots h} \\ \hat{l}_{Elec,1 \ldots h} \end{bmatrix}$$

where $D_{-1}$ is a lower diagonal matrix of ones.

Unmet loads module 810 may modify the cost vector c to associate cost values with any unmet loads. In some embodiments, unmet loads module 810 assigns unmet loads a relatively higher cost compared to the costs associated with other types of loads in the decision variable matrix x. Assigning a large cost to unmet loads ensures that the optimal solution to the high level optimization problem uses unmet loads only as a last resort (i.e., when the optimization has no solution without using unmet loads). Accordingly, linear program module 804 may avoid using unmet loads if any feasible combination of equipment is capable of satisfying the predicted thermal energy loads. In some embodiments, unmet loads module 810 assigns a cost value to unmet loads that allows linear program module 804 to use unmet loads in the optimal solution even if the central plant is capable of satisfying the predicted thermal energy loads. For example, unmet loads module 810 may assign a cost value that allows linear program module 804 to use unmet loads if the solution without unmet loads would be prohibitively expensive and/or highly inefficient.

Subplant Curve Incorporation

Still referring to FIG. 8, high level optimizer 632 is shown to include a subplant curves module 830. In the simplest case described with reference to linear program module 804, it was assumed that the resource consumption of each subplant is a linear function of the thermal energy load produced by the subplant. However, this assumption may not be true for some subplant equipment, much less for an entire subplant. Subplant curves module 830 may be configured to modify the high level optimization problem to account for subplants that have a nonlinear relationship between resource consumption and load production.

Subplant curves module 830 is shown to include a subplant curve updater 832, a subplant curves database 834, a subplant curve linearizer 836, and a subplant curves incorporator 838. Subplant curve updater 832 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load. Exemplary subplant curves are shown and described in greater detail with reference to FIGS. 9A-12.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 832 and subplant curve updater 832 generates the subplant curves using the data points. Subplant curve updater 832 may store the subplant curves in subplant curves database 834 for use in the high level optimization process.

Figure 10:
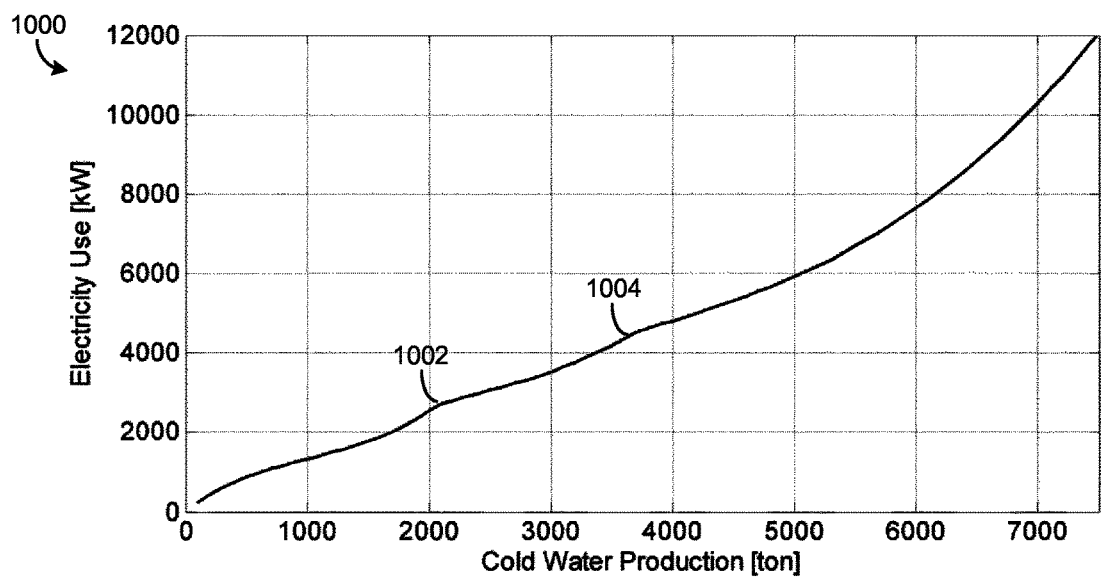
FIG. 10 is a non-convex and nonlinear subplant curve that may be generated from experimental data or by combining equipment curves for individual devices of the central plant, according to an exemplary embodiment.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve as shown in FIG. 10. The waves are caused by a single device loading up before it is more efficient to turn on another device to satisfy the subplant load.

Figure 11:
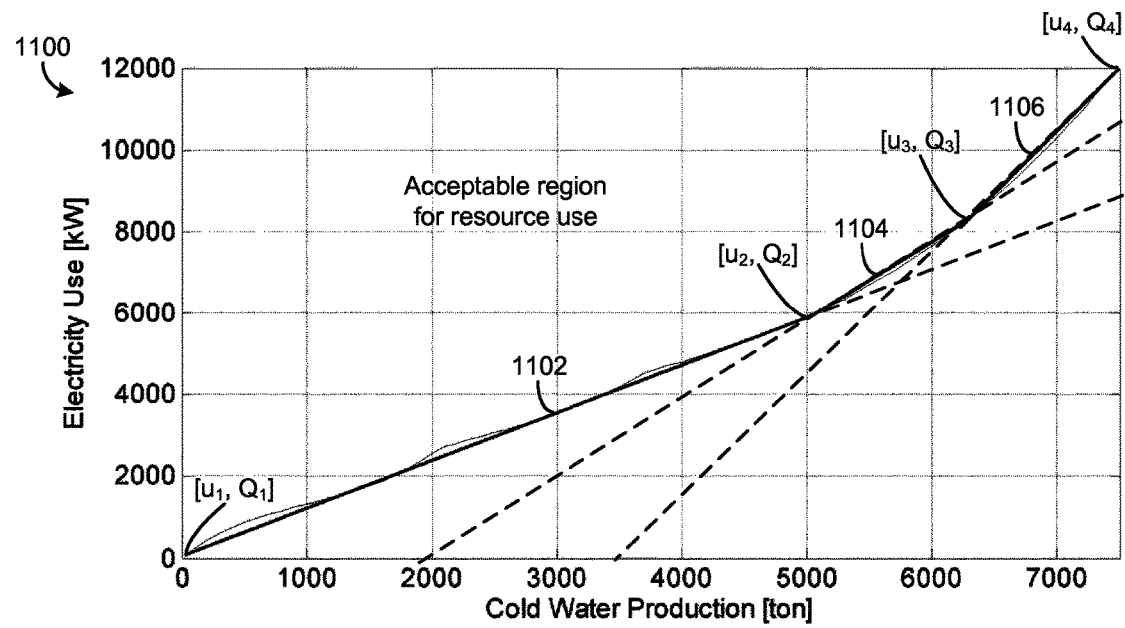
FIG. 11 is a linearized subplant curve that may be generated from the subplant curve of FIG. 10 by converting the non-convex and nonlinear subplant curve into piecewise linear segments, according to an exemplary embodiment.

Subplant curve linearizer 836 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 836 may be configured to break the subplant curves into piecewise linear segments that combine to form a piecewise-defined convex curve. An unmodified subplant curve 1000 and a linearized subplant curve 1100 generated by subplant curve linearizer 836 are shown in FIGS. 10 and 11, respectively. Subplant curve linearizer 836 may store the linearized subplant curves in subplant curves database 834.

Still referring to FIG. 8, subplant curves module 830 is shown to include a subplant curve incorporator 838. Subplant curve incorporator 838 may be configured to modify the high level optimization problem to incorporate the subplant curves into the optimization. In some embodiments, subplant curve incorporator 838 modifies the decision matrix x to include one or more decision vectors representing the resource consumption of each subplant. In other embodiments, the decision matrix x is formulated by linear program module 804 to include the input resources and the output resources of each subplant, as shown in the following equation:

$$x = [\ldots x_{sp_m, in_1, 1} \ldots h \, x_{sp_m, in_2, 1} \ldots h \, x_{sp_m, out_1, 1} \ldots h \cdots]^T$$

Subplant curve incorporator 838 may modify the inequality constraints to ensure that the proper amount of each resource is consumed to serve the predicted thermal energy loads. In some embodiments, subplant curve incorporator 838 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). Such a linearized subplant curve 1100 is shown in FIG. 11. The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 838 may formulate an inequality constraint for each piecewise segment of the subplant curve that constrains the value of the decision variable representing chiller electricity use to be greater than or equal to the amount of electricity use defined by the line segment for the corresponding value of the cold water production. The subplant curve constraints for the electricity use of chiller subplant 522 can be placed in the form $Ax \le b$ by defining the A matrix and the b vector as follows:

$$A = \begin{bmatrix} \ldots & [-(u_2-u_1)]I_n & \ldots & [(Q_2-Q_1)]I_n & 0_n & \ldots \\ \ldots & [-(u_3-u_2)]I_n & \ldots & [(Q_3-Q_2)]I_n & 0_n & \ldots \\ \ldots & [-(u_4-u_3)]I_n & \ldots & [(Q_4-Q_3)]I_n & 0_n & \ldots \end{bmatrix},$$

$$b = \begin{bmatrix} Q_1 u_2 - Q_2 u_1 \\ Q_2 u_3 - Q_3 u_2 \\ Q_3 u_4 - Q_4 u_3 \end{bmatrix}$$

Similar inequality constraints can be formulated for other subplant curves. For example, subplant curve incorporator 838 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$ (as shown in FIG. 9B). The subplant curve constraints for the cold water consumption of chiller subplant 522 can be placed in the form $Ax \le b$ by defining the A matrix and the b vector as follows:

$$A = [\ldots [-(u_6-u_5)]I_n \ldots 0_n [(Q_6-Q_5)]I_n \ldots],$$
$$b = [Q_5 u_6 - Q_6 u_5]$$

Subplant curve incorporator 838 may repeat this process for each subplant curve for chiller subplant 522 and for the other subplants of the central plant to define a set of inequality constraints for each subplant curve.

The inequality constraints generated by subplant curve incorporator 838 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 838 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 838 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 838 may determine that high level optimizer 632 is overusing electricity. In response to a determination that high level optimizer 632 is overusing electricity, subplant curve incorporator 838 may constrain the production of heat recovery chiller subplant 523 at its current value and constrain the electricity use of subplant 523 to the corresponding value on the subplant curve. High level optimizer 632 may then rerun the optimization with the new equality constraints.

Ground Loop and Heat Exchanger Incorporation

Still referring to FIG. 8, high level optimizer 632 is shown to include a ground loop module 812 and a heat exchanger module 814. In some embodiments, the central plant includes a heat exchanger configured to transfer heat between a hot water loop and a condenser water loop. In some embodiments, the central plant includes a ground loop that serves as heat rejection for chiller subplant 522 and/or heat extraction for heat recovery chiller subplant 523. Ground loop module 812 and heat exchanger module 814 may be configured to modify the optimization problem to account for heat transfer resulting from operation of the heat exchanger and/or the ground loop.

Ground loop module 812 may incorporate heat rejection to the ground loop into the optimization problem by changing the amount of electricity and water usage by chiller subplant 522. For example, for loadings up to the heat rejection capacity of the ground loop, chiller subplant 522 may use an additional amount of electricity to run the ground loop pumps. The additional electricity usage may be constant or may vary per unit of flow through the ground loop. The amount of water production of chiller subplant 522 may be constant regardless of whether the ground loop is used.

Ground loop module 812 and heat exchanger module 814 may incorporate heat extraction from the ground loop and heat transfer between the hot water loop and the condenser water loop into the optimization problem in a similar manner. For example, ground loop module 812 and heat exchanger module 814 may use heat extraction from the ground loop and heat transfer between the water loops to modify the load seen by the central plant equipment. Ground loop module 812 may use the ground loop to create what appears as a false building load to the equipment, thereby allowing heat recovery chiller subplant 523 to operate as heat pumps when the building load does not add enough heat to the system. This outcome may be optimal when the ratio between electricity prices and gas prices is low such that it is less expensive to operate the ground loop and the heat exchanger using electricity than it would be to use natural gas to generate heat in heater subplant 521.

Heat exchanger module 814 may use the heat exchanger to create what appears to be a false hot water building load, thereby allowing heat recovery chiller subplant 523 to operate as conventional chillers. The excess heat from heat recovery chiller subplant 523 may be transferred through the heat exchanger to the condenser loop and ultimately into the atmosphere or into the ground. In some embodiments, heat exchanger module 814 operates the heat exchanger to prevent condenser loop from becoming overloaded. For example, heat exchanger module 814 may limit the total heat rejected to the capacity of the condenser loop minus the heat produced by the conventional chillers.

Ground loop module 812 and heat exchanger module 814 may modify the decision matrix x by adding a new decision vector for each type of thermal energy load. The new decision vectors may represent the overproduction of each thermal energy load for each time step k within the optimization period. Ground loop module 812 and heat exchanger module 814 may modify the equality constraints to account for any overproduced thermal energy loads. The overproduced thermal energy loads may be added to the equality constraints as slack variables that operate in the opposite direction of the unmet loads. The modified equality constraints may require that the predicted thermal energy loads plus any overproduction are equal to the total loads satisfied by subplants 520-530 plus any unsatisfied thermal energy loads. Ground loop module 812 and heat exchanger module 814 may modify the cost vector c with the additional cost of the pumping power per unit of overproduction required to run the ground loop and/or the heat exchanger.

Demand Charge Incorporation

Still referring to FIG. 8, high level optimizer 632 is shown to include a demand charge module 816. As discussed above, optimization framework module 802 may formulate the optimization problem as:

$$\operatorname{argmin}_{x} c^T x; \text{ subject to } Ax \leq b, Hx = g$$

However, such a formulation may not account for the demand charge.

The demand charge is an additional charge imposed by some utility providers based on the maximum rate of energy consumption during an applicable demand charge period. For example, the demand charge may be provided in terms of dollars per unit of power (e.g., $/kW) and may be multiplied by the peak power usage (e.g., kW) during a demand charge period to calculate the demand charge. In some instances, the demand charge can account for more than 15% of the electrical bill. Failure to include the demand charge in the optimization scheme can cause all of the equipment to turn on at the same time (e.g., the most efficient or lowest cost time). This would be optimal from a consumption cost standpoint. However, shifting some of the load in time may save thousands of dollars on demand while only costing a few dollars in consumption cost.

Demand charge module 816 may be configured to modify the optimization problem to account for the demand charge. Incorporating the demand charge into the optimization framework may greatly improve the performance of the high level optimization. For example, including the demand charge in the optimization framework may reduce the total operating costs of the central plant by an additional 5% on top of the 8-10% cost reduction provided by other modules of central plant controller 506. In various implementations, the savings provided by demand charge module 816 and/or central plant controller 506 as a whole may be greater than or less than the exemplary amounts defined herein due to differences in plant configuration and/or energy costs.

Demand charge module 816 may account for the demand charge by modifying the cost function used by high level optimizer 632. The modified cost function may be defined as:

$$\operatorname{argmin}_{x}[c^T x + c_{demand} \max(P_{elec,k})]; \text{ subject to } Ax \leq b, Hx = g$$

where $c_{demand}$ is the demand charge (e.g., $/kW) for the applicable demand charge period and $P_{elec,k}$ is the total electrical power purchased from utilities 510 at time step k. The term $\max(P_{elec,k})$ selects the peak electrical power at any time during the demand charge period. The demand charge $c_{demand}$ and the demand charge period may be defined by the utility rate information received from utilities 510 and may be provided to high level optimizer 632 by load/rate predictor 622.

Incorporating the demand charge into the optimization framework complicates the optimization problem in two primary ways. First, the cost function is no longer linear due to the inclusion of the max( ) function. Second, the consumption term $c^T x$ calculates cost over a consumption period defined by a time horizon, whereas the demand charge term $c_{demand} \max(P_{elec,k})$ calculates cost over the demand charge period. For example, the consumption period may be defined as the time period beginning at the current time step k and ending at a future time step k+h, where h represents the time horizon. The demand charge period may be defined by utilities 510 and provided to high level optimizer 632 along with the utility rate information. In some instances, the consumption period and the demand charge period may not be the same. This complicates the optimization problem by obfuscating potential trade-offs between control decisions that reduce the consumption term at the expense of the demand charge term or vice versa.

Demand charge module 816 may modify the optimization problem to incorporate the demand charge term into the linear optimization framework. For example, demand charge module 816 may modify the decision matrix x by adding a new decision variable $x_{peak}$ as follows:

$$x_{new} = [\ldots x_{elec,1 \ldots h} \ldots x_{peak}]^T$$

where $x_{peak}$ is the peak electricity within the demand charge period and $x_{elec,1 \ldots h}$ is the electricity purchase at each of the h time steps. Demand charge module 816 may modify the cost vector c as follows:

$$c_{new} = [\ldots c_{elec,1 \ldots h} \ldots c_{demand}]^T$$

such that the demand charge $c_{demand}$ is multiplied by the peak power consumption $x_{peak}$.

Demand charge module 816 may formulate and/or apply inequality constraints to ensure that the peak power consumption $x_{peak}$ is greater than or equal to the maximum electric demand over the demand charge period. I.e.:

$$x_{peak} \geq \max(x_{elec,k}) \; \forall k \in \text{horizon}$$

This inequality constraint may be represented in the linear optimization framework by defining the A matrix and the b vector as follows:

$$A=[\ldots I_h \ldots -1], b=0$$

During the high level optimization process, high level optimizer 632 may choose a $x_{peak}$ that is equal to the maximum electrical demand over the demand charge period to minimize the cost associated with $x_{peak}$.

Demand charge module 816 may apply an inequality constraint to ensure that the peak power consumption decision variable $x_{peak}$ is greater than or equal to its previous value $x_{peak,previous}$ during the demand charge period. This inequality constraint may be represented in the linear optimization framework by defining the A matrix and the b vector as follows:

$$A=[\ldots -1], b=-x_{peak,previous}$$

Advantageously, the modifications to the decision variable matrix x, the cost vector c, and the inequality constraints provided by demand charge module 816 allow the cost function to be written in a linear form as follows:

$$\operatorname*{argmin}_{x}[c_{new}^T x_{new}] = \operatorname*{argmin}_{x}[c^T x + c_{demand} x_{peak}];$$

subject to $Ax \leq b, Hx = g$

This linear form of the cost function can be used in the linear optimization framework.

The cost function as written in the previous equation has components that are over different time periods. For example, the consumption term $c^T x$ is over the consumption period whereas the demand charge term $c_{demand} x_{peak}$ is over the demand charge period. To properly make the trade-off between increasing the demand charge versus increasing the cost of energy consumption, demand charge module 816 may apply a weighting factor to the demand charge term and/or the consumption term. For example, demand charge module 816 may divide the consumption term $c^T x$ by the duration h of the consumption period (i.e., the time period between the current time and the time horizon) and multiply by the amount of time $d_{demand}$ remaining in the current demand charge period so that the entire cost function is over the demand charge period. The new optimization function may be given by:

$$\operatorname*{argmin}_{x}\left[\frac{d_{demand}}{h} c^T x + c_{demand} x_{peak}\right]; \text{ subject to } Ax \leq b, Hx = g$$

which is equivalent to:

$$\operatorname*{argmin}_{x}\left[c^T x + \frac{h}{d_{demand}} c_{demand} x_{peak}\right]; \text{ subject to } Ax \leq b, Hx = g$$

The latter form of the new optimization function has the advantage of adjusting only one term of the function rather than several.

Tank Forced Full Incorporation

Still referring to FIG. 8, high level optimizer 632 is shown to include a tank forced full module 818. Tank forced full module 818 may modify the optimization problem such that the thermal energy storage (TES) tanks are forced to full at the end of the optimization period. This feature provides increased robustness in the event of a subplant failure and/or controller failure by ensuring that the TES tanks have sufficient stored thermal energy to satisfy building loads while the failure is being repaired. For example, plant operators can use the stored thermal energy to meet the building loads while central plant controller 506 is brought back online.

Tank forced full module 818 may force the TES tanks to full by increasing the cost of discharging the TES tanks. In some embodiments, tank forced full module 818 modifies the cost of discharging the TES tanks such that the discharge cost is higher than other costs in the cost function, but less than the cost of unmet loads. This forces high level optimizer 632 to take the benefit (i.e., negative cost) of charging the TES tanks to their maximum values.

Penalty Incorporation

Still referring to FIG. 8, high level optimizer 632 is shown to include a penalty function module 820. In some instances, high level optimizer 632 determines a solution to the optimization problem that includes significantly changing the load on one or more of subplants 520-530 within a relatively short timeframe. For example, the lowest cost solution from a resource consumption standpoint may involve taking a subplant from off to full load and back to off again within only a few time steps. This behavior may result from high level optimizer 632 identifying small fluctuations in the economic cost of resources and operating the central plant accordingly to achieve the minimal economic cost. However, operating the central plant in such a way may be undesirable due to various negative effects of rapidly changing the subplant loads (e.g., increased equipment degradation), especially if the cost saved is relatively minimal (e.g., a few cents or dollars).

Penalty function module 820 may modify the optimization problem to introduce a penalty for excessive equipment start/stops (e.g., in excess of a threshold). The penalty may subtract from the overall value which high level optimizer 632 seeks to optimize and may be represented in the value function as the $Penalty term. In some embodiments, the penalty is defined according to a penalty function. The penalty function may be a function of the control decisions made by high level optimizer. For example, the penalty function may be defined as follows:

$$\$Penalty=f(N_{commands})$$

where $N_{commands}$ is the total number of on/off commands provided to the equipment over the duration of the optimization period. In some embodiments, the value of the penalty is proportional to the number of on/off commands or otherwise dependent upon the number of on/off commands.

In some embodiments, penalty function module 820 modifies the optimization problem to introduce a penalty for rapidly changing the subplant loads. For example, penalty function module 820 may modify the decision matrix x by adding a new decision vector for each subplant. The new decision vectors represent the change in subplant load for each subplant from one time step to the next. For example, penalty function module 820 may modify the decision matrix x as follows:

$$x = [\ldots \delta_{sp_1,1} \ldots h \; \delta_{sp_2,1} \ldots h \ldots \delta_{sp_m,1} \ldots h]^T$$

where $\delta_{sp_1,1\ldots h}$, $\delta_{sp_2,1\ldots h}$, and $\delta_{sp_m,1\ldots h}$ are h-dimensional vectors representing the changes in outputs of each subplant at each time step k relative to the previous time step k−1. For example, the variable $\delta_{sp_1,k}$ may be defined as the difference between the decision variable $x_{sp_1,out_1,k}$ representing the first output $out_1$ from subplant $sp_1$ at time k and the decision variable $x_{sp_1,out_1,k-1}$ representing the first output $out_1$ from subplant $sp_1$ at time k−1.

Penalty function module 820 may modify the cost vector c to add a cost associated with changing the subplant outputs. For example, penalty function module 820 may modify the cost vector c as follows:

$$c = [\ldots c_{sp_1,1} \ldots h \; c_{sp_2,1} \ldots h \ldots c_{sp_m,1} \ldots h]^T$$

where $c_{sp_1,1\ldots h}$, $c_{sp_2,1\ldots h}$, and $c_{sp_m,1\ldots h}$ are costs penalties associated with the changes in subplant outputs.

Penalty function module 820 may add constraints such that each of the variables δ cannot be less than the change in the corresponding subplant load. For example, the added constraints for chiller subplant 522 may have the following form:

$$A = \begin{bmatrix} \ldots & I_h - D_{-1} & \ldots & -I_h & 0_h & 0_h \\ \ldots & D_{-1} - I_h & \ldots & -I_h & 0_h & 0_h \\ \vdots & \vdots & \vdots & \vdots & \vdots \end{bmatrix},$$

$$b = \begin{bmatrix} \begin{bmatrix} x_{sp_1,out_1,k-1} \\ 0_{h-1} \end{bmatrix} \\ \begin{bmatrix} -x_{sp_1,out_1,k-1} \\ 0_{h-1} \end{bmatrix} \\ \vdots \end{bmatrix}$$

where $x_{sp_1,out_1,k-1}$ is the value of the decision variable representing the output of subplant $sp_1$ at time k−1. Similar constraints may be added for each of subplants 520-530.

The constraints added by penalty function module 820 require the change variables δ to be greater than or equal to the magnitude of the difference between the current value of the corresponding subplant output and the previous value of the subplant output. In operation, high level optimizer 632 may select values for the change variables δ that are equal to the magnitude of the difference due to the costs associated with the change variables. In other words, high level optimizer 632 may not choose to make the change variables δ greater than the actual change in the corresponding subplant output because making the change variables δ greater than necessary would be suboptimal.

Incentive Program Incorporation

Still referring to FIG. 8, high level optimizer 632 is shown to include an incentive program module 822. Incentive program module 822 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, central plant system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, central plant system 500 may reduce its demand for resources from a utility as part of a load shedding program. It is contemplated that central plant system 500 may participate in any number and/or type of IBDR programs.

Advantageously, incentive program module 822 may be configured to modify the optimization problem to account for participation in any number of IBDR programs. For example, incentive program module 822 may incorporate IBDR revenue into the value function which high level optimizer 632 seeks to optimize (e.g., the $IBDR term of the value function). Incentive program module 822 may also add a decision variable $x_{resource_p,prog_s,1\ldots h}$ to the decision matrix x for each IBDR program in which central plant system 500 can potentially participate, as shown in the following equation:

$$x = [\ldots x_{resource_p,under,1} \ldots h \; x_{resource_p,over,1} \ldots h \; x_{resource_p,storage,1} \ldots h \; x_{resource_p,prog_s,1} \ldots h]^T$$

where the decision variable $x_{resource_p,prog_s,1\ldots h}$ represents the amount of resource p allocated to IBDR program s at each of the h time steps. Incentive program module 822 may add similar decision variables for each IBDR program.

Incentive program module 822 may modify the cost vector c to include the revenue offered for participating in each IBDR program. For example, incentive program module 822 may modify the cost vector c as shown in the following equation:

$$c = [\ldots M \; M \; 0 \; -r_{resource_p,prog_s,1} \ldots h]^T$$

where the variable $r_{resource_p,prog_s,1\ldots h}$ represents the revenue offered for participating in IBDR program s at each of the h time steps. The revenue variables may be based on statistical estimates of IBDR event characteristics (e.g., event times, revenue potential, reserve capacity required, etc.) as described with reference to incentive estimator 620.

Incentive program module 822 may generate and impose constraints that allow for participation in various IBDR programs. For example, incentive program module 822 may modify the A matrix and the b vector as shown in the following equation:

$$A = \begin{bmatrix} \ldots & 0 & 0 & I_h & p_{charge} \\ \ldots & 0 & 0 & -I_h & p_{discharge} \\ \ldots & 0 & 0 & T_s\Delta_h & p_{cap} \\ \ldots & 0 & 0 & -T_s\Delta_h & p_{cap} \end{bmatrix},$$

$$b = \begin{bmatrix} \vdots \\ x_{discharge_{p,max}} \\ x_{charge_{p,max}} \\ C_{storage_{p,0}} \\ C_{storage_{p,max}} - C_{storage_{p,0}} \end{bmatrix}$$

where $p_{charge}$, $p_{discharge}$, and $p_{cap}$ are the marginal amounts of reserve charging rate, discharging rate, and storage capacity (per unit of participation) that must be maintained in order to participate in the IBDR program. Advantageously, these constraints allow high level optimizer 632 to weigh the benefits of participating in various IBDR programs (e.g., expected revenue) against the costs of participation (e.g., less resources available for satisfying building loads). If the expected revenue for participation outweighs the costs, high level optimizer 632 may allocate resources to the IBDR program. However, if the expected revenue does not outweigh the costs, high level optimizer 632 may allocate the resources to satisfying building loads.

Battery Capacity Loss Incorporation

Still referring to FIG. 8, high level optimizer 632 is shown to include a battery capacity loss module 824. Battery capacity loss module 824 may be configured to adjust the optimization problem to account for a loss in battery capacity (e.g., electrical energy storage 533) as a result of the control decisions made by high level optimizer 632. For example, battery capacity loss module 824 may use a battery capacity loss model to determine an expected loss in battery capacity as a result of the control decisions. The battery capacity loss model may monetize the loss in battery capacity based on the lost revenue of not being able to participate in IBDR programs due to premature battery capacity loss attributed to certain control actions. The monetized loss in battery capacity may be provided as a term in the value function (e.g., the $BL term) which high level optimizer 632 seeks to optimize.

In some embodiments, battery capacity loss module 824 estimates battery capacity loss as a function of the decision variables. For example, the loss in battery capacity may be defined by the following battery capacity loss model:

$$\$BL = f\left(DOD, T, SOC, \sum kW_{batt}, \sum \frac{d\ kW_{batt}}{dt}, \overline{RMCCP}, \overline{RMPCP}, \overline{MR}, i_n, n\right)$$

where $BL is the monetized cost of battery capacity loss, DOD represents the depth of discharge of the battery, SOC represents the state of charge of the battery, $kW_{batt}$ represents the battery power draw, $$\frac{d\ kW_{batt}}{dt}$$

represents the change in battery power draw, $\overline{RMCCP}$ represents the average regulation market capability clearing price (RMCCP), $\overline{RMPCP}$ represents the average regulation market performance clearing price (RMCCP) and $\overline{MR}$ represents the average mileage ratio (MR). The loss in battery capacity may be a function of several inputs which can be modified by high level optimizer 632 such as the state of charge, the depth of discharge, the amount of energy moved (e.g., average power ratio), and the change in power draw (e.g., average effort ratio). For example, high level optimizer 632 can increase or decrease many of these inputs by adjusting the amount of power allocated to the battery (i.e., electrical energy storage subplant 533) at each time step.

In some embodiments, battery capacity loss module 824 determines an expected loss in battery capacity as a function of the control decisions made by high level optimizer 632. Battery capacity loss module 824 may monetize the expected loss in battery capacity and/or provide the expected loss in battery capacity to high level optimizer 632. High level optimizer 632 may use the expected loss in battery capacity over time to determine the consequences of certain control decisions. For example, some control decisions may result in a relatively faster loss in battery capacity than other control decisions. Therefore, some control decisions may limit the ability of central plant system 500 to participate in IBDR programs in the future due to the battery capacity failing to meet IBDR requirements. Advantageously, high level optimizer 632 can predict the expected loss in revenue resulting from certain control decisions and weigh the predicted loss in revenue against the benefits of the control decisions. High level optimizer 632 may select a set of optimal control decisions that maximizes the overall value over the duration of the prediction window, while accounting for the cost of certain control decisions in terms of losses in battery capacity and the lost IBDR revenue associated therewith.

Subplant Curves

Figure 9A:
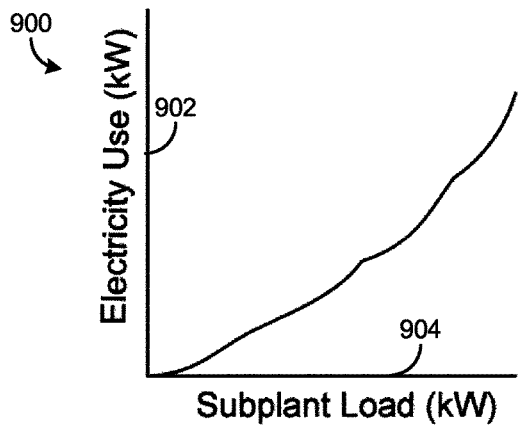
FIGS. 9A-9B are subplant curves illustrating a relationship between the resource consumption of a subplant and the subplant load and which may be used by the high level optimizer of FIG. 8 to optimize the performance of the central plant, according to an exemplary embodiment.
Figure 9B:
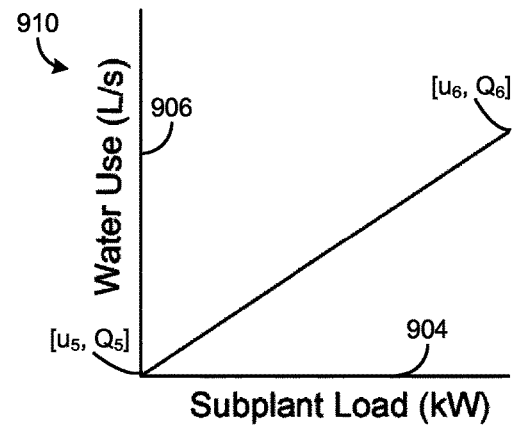

Referring now to FIGS. 9A-B, two subplant curves 900 and 910 are shown, according to an exemplary embodiment. Subplant curves 900 and 910 define the resource usage of a subplant (e.g., one of subplants 520-530) as a function of the subplant load. Each subplant curve may be specific to a particular subplant and a particular type of resource used by the subplant. For example, subplant curve 900 may define the electricity use 902 of chiller subplant 522 as a function of the load 904 on chiller subplant 522, whereas subplant curve 910 may define the water use 906 of chiller subplant 522 as a function of the load 904 on chiller subplant 522. Each of subplants 520-530 may have one or more subplant curves (e.g., one for each type of resource consumed by the subplant).

In some embodiments, low level optimizer 634 generates subplant curves 900 and 910 based on equipment models 618 (e.g., by combining equipment models 618 for individual devices into an aggregate curve for the subplant). Low level optimizer 634 may generate subplant curves 900 and 910 by running the low level optimization process for several different loads and weather conditions to generate multiple data points. Low level optimizer 634 may fit a curve to the data points to generate the subplant curves. In other embodiments, low level optimizer 634 provides the data points to high level optimizer 632 and high level optimizer 632 generates the subplant curves using the data points.

Referring now to FIG. 10, another subplant curve 1000 is shown, according to an exemplary embodiment. Subplant curve 1000 defines the electricity use of chiller subplant 522 as a function of the cold water production of chiller subplant 522. In some embodiments, subplant curve 1000 is generated by combining efficiency curves for individual devices of chiller subplant 522 (e.g., individual chillers, pumps, etc.). For example, each of the chillers in subplant 522 may have a device-specific efficiency curve that defines the amount of electricity use by the chiller as a function of the load on the chiller. Many devices operate less efficiently at higher loads and have device efficiency curves that are U-shaped functions of load. Accordingly, combining multiple device efficiency curves to form subplant curve 1000 may result in subplant curve 1000 having one or more waves 1002, as shown in FIG. 10. Waves 1002 may be caused by a single device loading up before it is more efficient to turn on another device to satisfy the subplant load.

Referring now to FIG. 11, a linearized subplant curve 1100 is shown, according to an exemplary embodiment. Subplant curve 1100 defines the electricity use of chiller subplant 522 as a function of the cold water production of chiller subplant 522. Subplant curve 1100 may be generated by converting subplant curve 1000 into a linearized convex curve. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions.

In some embodiments, subplant curve 1100 is generated by subplant curve linearizer 836, as described with reference to FIG. 8. Subplant curve 1100 may be created by generating a plurality of linear segments (i.e., segments 1102, 1104, and 1106) that approximate subplant curve 1000 and combining the linear segments into a piecewise-defined linearized convex curve 1100. Linearized subplant curve 1100 is shown to include a first linear segment 1102 connecting point $[u_1, Q_1]$ to point $[u_2, Q_2]$, a second linear segment 1104 connecting point $[u_2, Q_2]$ to point $[u_3, Q_3]$, and a third linear segment 1106 connecting point $[u_3, Q_3]$ to point $[u_4, Q_4]$. The endpoints of line segments 1102-1106 may be used to form constraints that force the electricity use of chiller subplant 522 in the epigraph of the linearized subplant curve 1100.

Figure 12:
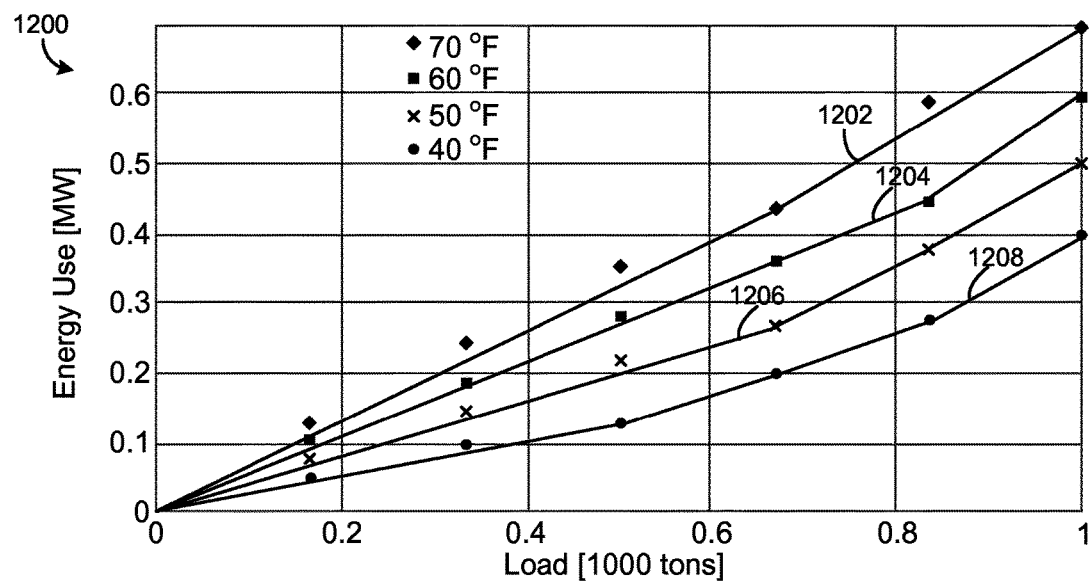
FIG. 12 is a graph illustrating a set of subplant curves that may be generated by the high level optimizer of FIG. 8 based on experimental data from a low level optimizer for multiple different environmental conditions, according to an exemplary embodiment.

Referring now to FIG. 12, another subplant curve 1200 is shown, according to an exemplary embodiment. Subplant curve 1200 defines the energy use of one of subplants 520-530 as a function of the load on the subplant for several different weather conditions. In some embodiments, subplant curve 1200 is generated by subplant curves module 830 using experimental data obtained from the low level optimizer 634. For example, subplant curve updater 832 may request resource usage data from low level optimizer 634 for various combinations of load conditions and environmental conditions. In the embodiment shown in FIG. 12, subplant curve updater 832 requests energy use data for each combination of temperature (e.g., 40° F., 50° F., 60° F., and 70° F.) and load (e.g., 170 tons, 330 tons, 500 tons, 830 tons, and 1000 tons). Low level optimizer 634 may perform the low level optimization process for the requested load and temperature combinations and return an energy use value for each combination.

Subplant curve updater 832 may use the data points provided by low level optimizer 634 to find the best piecewise linear convex function that fits the data. For example, subplant curve updater 832 may fit a first subplant curve 1202 to the data points at 70° F., a second subplant curve 1204 to the data points at 60° F., a third subplant curve 1206 to the data points at 50° F., and a fourth subplant curve 1208 to the data points at 40° F. Subplant curve updater 832 may store the generated subplant curves 1202-1208 in subplant curves database 834 for use in the high level optimization algorithm.

In some implementations, central plant controller 506 uses high level optimizer 632 as part of an operational tool to exercise real-time control over the central plant. In the operational tool, high level optimizer 632 may receive load and rate predictions from load/rate predictor 622 and subplant curves (or data that can be used to generate subplant curves) from low level optimizer 634. When implemented in the operational tool, high level optimizer 632 may determine an optimal load distribution for heater subplant 521, heat recovery chiller subplant 523, chiller subplant 522, hot TES subplant 531, cold TES subplant 532, electrical energy storage subplant 533, and/or energy purchasers 504, as described with reference to FIGS. 5-8. In some embodiments, high level optimizer 632 determines ground loop and heat exchanger transfer rates in addition to the subplant loads. When implemented in the operational tool, high level optimizer 632 may provide the determined resource allocation to low level optimizer 634 for use in determining optimal on/off decisions and/or operating setpoints for the equipment of each subplant.

Planning Tool

Figure 13:
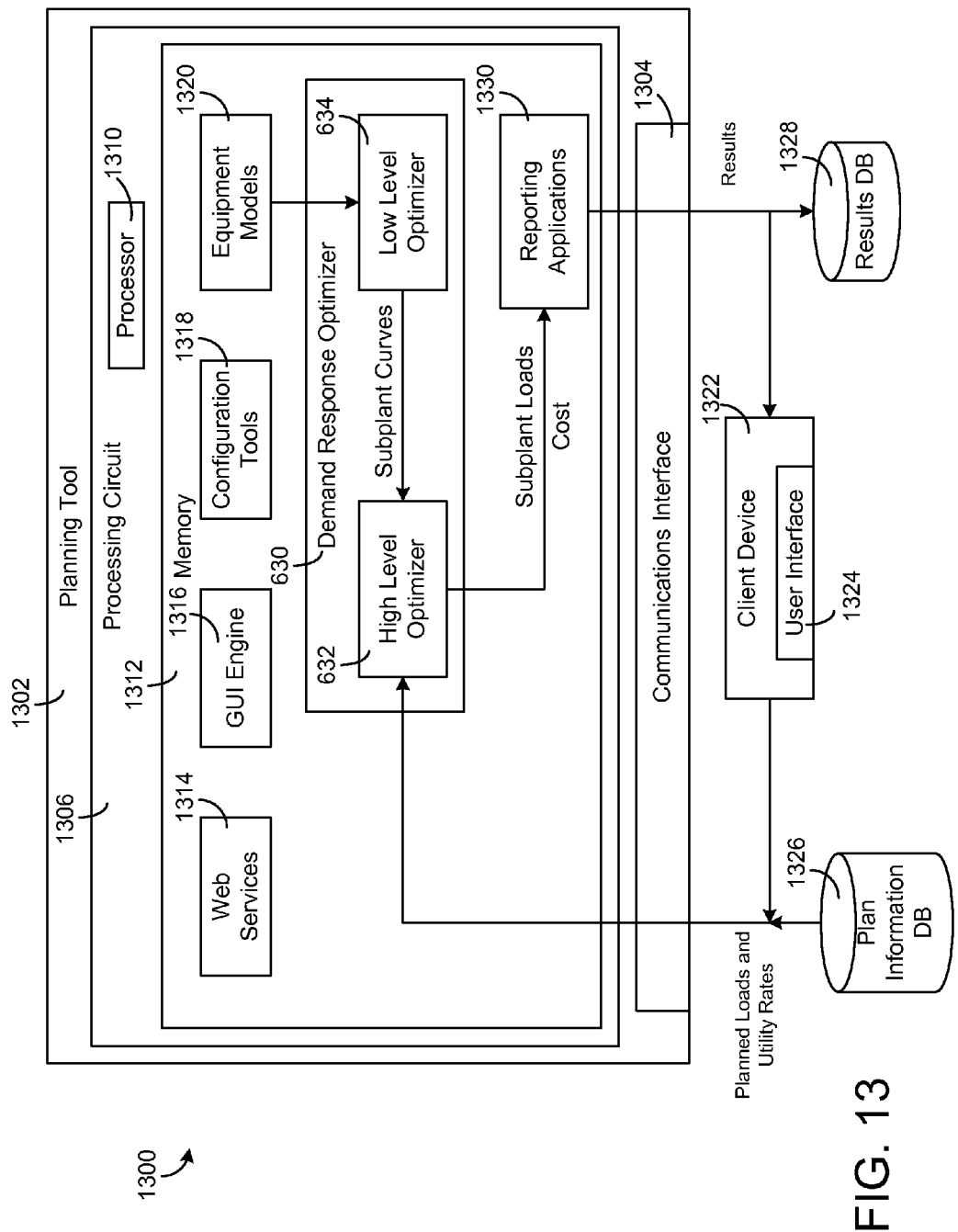
FIG. 13 is a block diagram of a planning system that incorporates the high level optimizer of FIG. 8, according to an exemplary embodiment.

Referring now to FIG. 13, a block diagram of a planning system 1300 is shown, according to an exemplary embodiment. Planning system 1300 may be configured to use demand response optimizer 630 as part of a planning tool 1302 to simulate the operation of a central plant over a predetermined time period (e.g., a day, a month, a week, a year, etc.) for planning, budgeting, and/or design considerations. When implemented in planning tool 1302, demand response optimizer 630 may operate in a similar manner as described with reference to FIGS. 6-8. For example, demand response optimizer 630 may use building loads and utility rates to determine an optimal resource allocation to minimize cost over a simulation period. However, planning tool 1302 may not be responsible for real-time control of a building management system or central plant.

In planning tool 1302, high level optimizer 632 may receive planned loads and utility rates for the entire simulation period. The planned loads and utility rates may be defined by input received from a user via a client device 1322 (e.g., user-defined, user selected, etc.) and/or retrieved from a plan information database 1326. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 13, planning tool 1302 is shown to include a communications interface 1304 and a processing circuit 1306. Communications interface 1304 may include wired or wireless interfaces (e.g., jacks, antennas, transmitters, receivers, transceivers, wire terminals, etc.) for conducting data communications with various systems, devices, or networks. For example, communications interface 1304 may include an Ethernet card and port for sending and receiving data via an Ethernet-based communications network and/or a WiFi transceiver for communicating via a wireless communications network. Communications interface 1304 may be configured to communicate via local area networks or wide area networks (e.g., the Internet, a building WAN, etc.) and may use a variety of communications protocols (e.g., BACnet, IP, LON, etc.).

Communications interface 1304 may be a network interface configured to facilitate electronic data communications between planning tool 1302 and various external systems or devices (e.g., client device 1322, results database 1328, plan information database 1326, etc.). For example, planning tool 1302 may receive planned loads and utility rates from client device 1322 and/or plan information database 1326 via communications interface 1304. Planning tool 1302 may use communications interface 1304 to output results of the simulation to client device 1322 and/or to store the results in results database 1328.

Still referring to FIG. 13, processing circuit 1306 is shown to include a processor 1310 and memory 1312. Processor 1310 may be a general purpose or specific purpose processor, an application specific integrated circuit (ASIC), one or more field programmable gate arrays (FPGAs), a group of processing components, or other suitable processing components. Processor 1310 may be configured to execute computer code or instructions stored in memory 1312 or received from other computer readable media (e.g., CDROM, network storage, a remote server, etc.).

Memory 1312 may include one or more devices (e.g., memory units, memory devices, storage devices, etc.) for storing data and/or computer code for completing and/or facilitating the various processes described in the present disclosure. Memory 1312 may include random access memory (RAM), read-only memory (ROM), hard drive storage, temporary storage, non-volatile memory, flash memory, optical memory, or any other suitable memory for storing software objects and/or computer instructions. Memory 1312 may include database components, object code components, script components, or any other type of information structure for supporting the various activities and information structures described in the present disclosure. Memory 1312 may be communicably connected to processor 1310 via processing circuit 1306 and may include computer code for executing (e.g., by processor 1310) one or more processes described herein.

Still referring to FIG. 13, memory 1312 is shown to include a GUI engine 1316, web services 1314, and configuration tools 1318. In an exemplary embodiment, GUI engine 1316 includes a graphical user interface component configured to provide graphical user interfaces to a user for selecting or defining plan information for the simulation (e.g., planned loads, utility rates, environmental conditions, etc.). Web services 1314 may allow a user to interact with planning tool 1302 via a web portal and/or from a remote system or device (e.g., an enterprise control application).

Configuration tools 1318 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 1318 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 1326) and adapt it or enable it for use in the simulation.

Still referring to FIG. 13, memory 1312 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 1330 for presentation to a client device 1322 (e.g., via user interface 1324) or storage in results database 1328.

Still referring to FIG. 13, memory 1312 is shown to include reporting applications 1330. Reporting applications 1330 may receive the optimized resource allocations from demand response optimizer 630 and, in some embodiments, costs associated with the optimized resource allocations. Reporting applications 1330 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 1330 is shown in FIG. 14.

Figure 14:
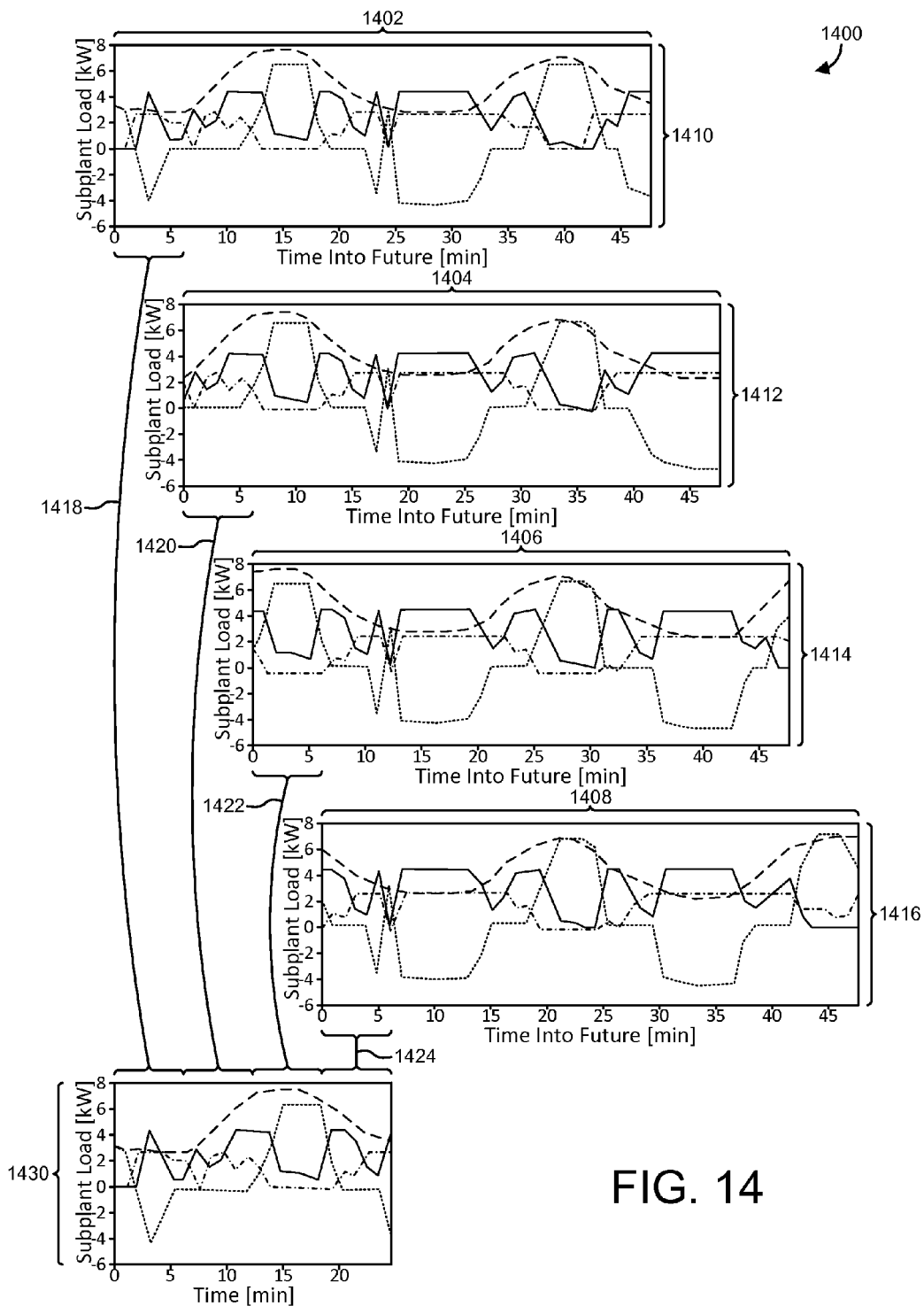
FIG. 14 is a drawing illustrating the operation of the planning system of FIG. 13, according to an exemplary embodiment.

Referring now to FIG. 14, several graphs 1400 illustrating the operation of planning tool 1302 are shown, according to an exemplary embodiment. With each iteration of the optimization process, planning tool 1302 selects an optimization period (i.e., a portion of the simulation period) over which the optimization is performed. For example, planning tool 1302 may select optimization period 1402 for use in the first iteration. Once the optimal resource allocation 1410 has been determined, planning tool 1302 may select a portion 1418 of resource allocation 1410 to send to plant dispatch 1430. Portion 1418 may be the first b time steps of resource allocation 1410. Planning tool 1302 may shift the optimization period 1402 forward in time, resulting in optimization period 1404. The amount by which the prediction window is shifted may correspond to the duration of time steps b.

Planning tool 1302 may repeat the optimization process for optimization period 1404 to determine the optimal resource allocation 1412. Planning tool 1302 may select a portion 1420 of resource allocation 1412 to send to plant dispatch 1430. Portion 1420 may be the first b time steps of resource allocation 1412. Planning tool 1302 may then shift the prediction window forward in time, resulting in optimization period 1406. This process may be repeated for each subsequent optimization period (e.g., optimization periods 1406, 1408, etc.) to generate updated resource allocations (e.g., resource allocations 1414, 1416, etc.) and to select portions of each resource allocation (e.g., portions 1422, 1424) to send to plant dispatch 1430. Plant dispatch 1430 includes the first b time steps 1418-1424 from each of optimization periods 1402-1408. Once the optimal resource allocation is compiled for the entire simulation period, the results may be sent to reporting applications 1330, results database 1328, and/or client device 1322, as described with reference to FIG. 13.

Figure 15:
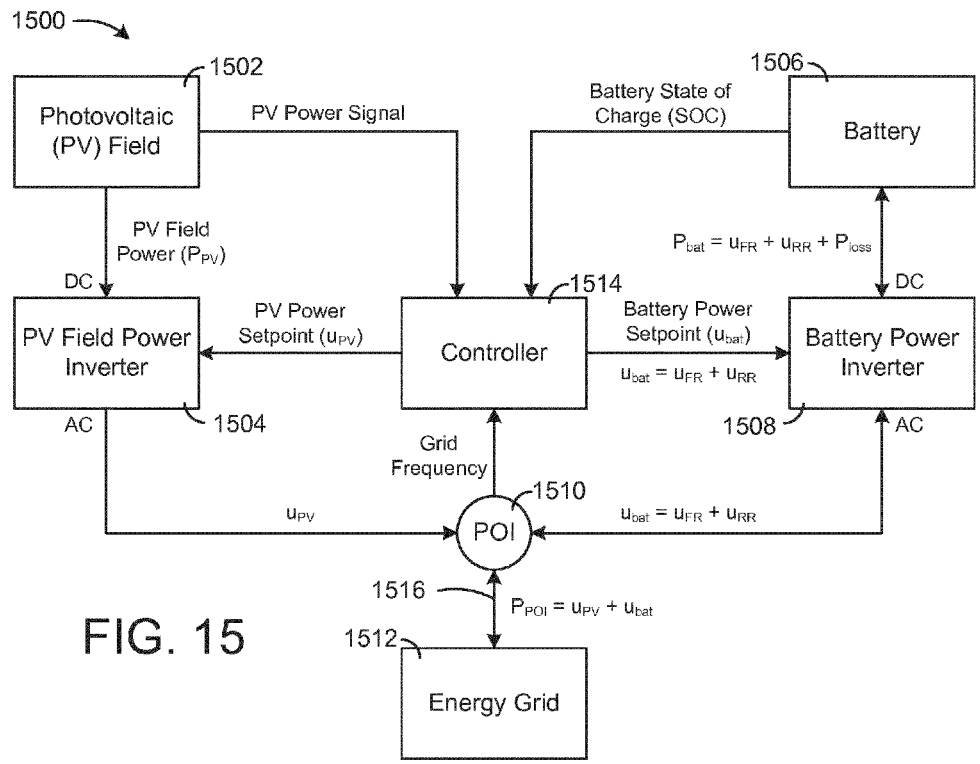
FIG. 15 is a block diagram of an electrical energy storage system that uses battery storage to perform both ramp rate control and frequency regulation, according to an exemplary embodiment.
Figure 16:
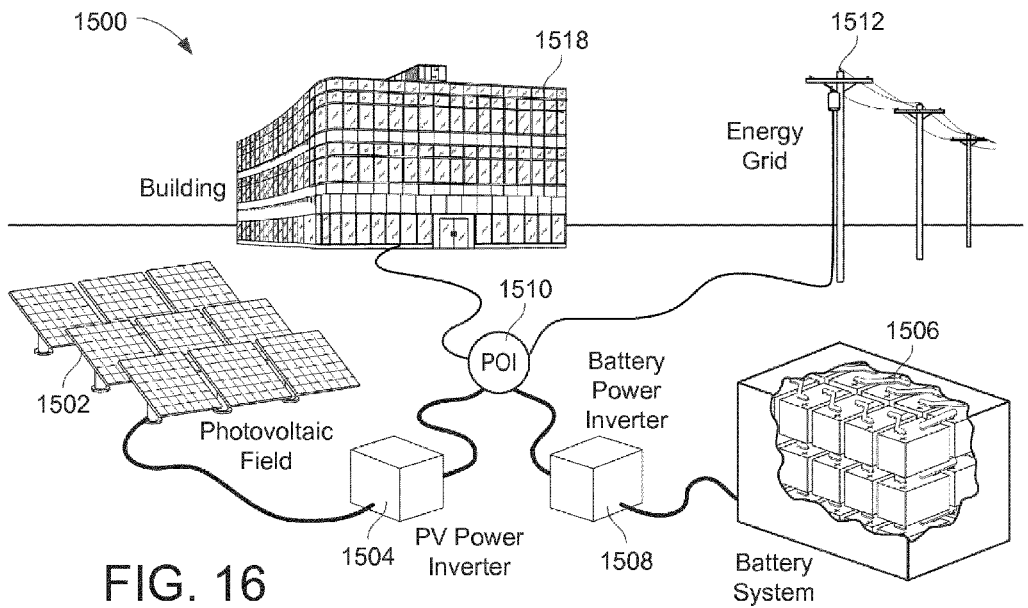
FIG. 16 is a drawing of the electrical energy storage system of FIG. 15, according to an exemplary embodiment.

Electrical Energy Storage System with Frequency Regulation and Ramp Rate Control Referring now to FIGS. 15-16, an electrical energy storage system 1500 is shown, according to an exemplary embodiment. System 1500 can use battery storage to perform both ramp rate control and frequency regulation. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). The grid frequency may remain balanced as long as there is a balance between the demand from the energy grid and the supply to the energy grid. An increase in demand yields a decrease in grid frequency, whereas an increase in supply yields an increase in grid frequency. During a fluctuation of the grid frequency, system 1500 may offset the fluctuation by either drawing more energy from the energy grid (e.g., if the grid frequency is too high) or by providing energy to the energy grid (e.g., if the grid frequency is too low). Advantageously, system 1500 may use battery storage in combination with photovoltaic power to perform frequency regulation while simultaneously complying with ramp rate requirements and maintaining the state-of-charge of the battery storage within a predetermined desirable range.

System 1500 is shown to include a photovoltaic (PV) field 1502, a PV field power inverter 1504, a battery 1506, a battery power inverter 1508, a point of interconnection (POI) 1510, and an energy grid 1512. In some embodiments, system 1500 also includes a controller 1514 (shown in FIG. 15) and/or a building 1518 (shown in FIG. 16). In brief overview, PV field power inverter 1504 can be operated by controller 1514 to control the power output of PV field 1502. Similarly, battery power inverter 1508 can be operated by controller 1514 to control the power input and/or power output of battery 1506. The power outputs of PV field power inverter 1504 and battery power inverter 1508 combine at POI 1510 to form the power provided to energy grid 1512. In some embodiments, building 1518 is also connected to POI 1510. Building 1518 can consume a portion of the combined power at POI 1510 to satisfy the energy requirements of building 1518.

PV field 1502 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 1502 may have any of a variety of sizes and/or locations. In some embodiments, PV field 1502 is part of a large-scale photovoltaic power station (e.g., a solar park or farm) capable of providing an energy supply to a large number of consumers. When implemented as part of a large-scale system, PV field 1502 may cover multiple hectares and may have power outputs of tens or hundreds of megawatts. In other embodiments, PV field 1502 may cover a smaller area and may have a relatively lesser power output (e.g., between one and ten megawatts, less than one megawatt, etc.). For example, PV field 1502 may be part of a rooftop-mounted system capable of providing enough electricity to power a single home or building. It is contemplated that PV field 1502 may have any size, scale, and/or power output, as may be desirable in different implementations.

PV field 1502 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 1502. When PV field 1502 is partially or completely covered by shadow, the power output of PV field 1502 (i.e., PV field power $P_{PV}$) may drop as a result of the decrease in solar intensity.

In some embodiments, PV field 1502 is configured to maximize solar energy collection. For example, PV field 1502 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 1502. In some embodiments, PV field 1502 includes a collection of mirrors, lenses, or solar concentrators configured to direct and/or concentrate sunlight on the solar panels. The energy generated by PV field 1502 may be stored in battery 1506 or provided to energy grid 1512.

Still referring to FIG. 15, system 1500 is shown to include a PV field power inverter 1504. Power inverter 1504 may be configured to convert the DC output of PV field 1502 $P_{PV}$ into an alternating current (AC) output that can be fed into energy grid 1512 or used by a local (e.g., off-grid) electrical network and/or by building 1518. For example, power inverter 1504 may be a solar inverter or grid-tie inverter configured to convert the DC output from PV field 1502 into a sinusoidal AC output synchronized to the grid frequency of energy grid 1512. In some embodiments, power inverter 1504 receives a cumulative DC output from PV field 1502. For example, power inverter 1504 may be a string inverter or a central inverter. In other embodiments, power inverter 1504 may include a collection of micro-inverters connected to each solar panel or solar cell. PV field power inverter 1504 may convert the DC power output $P_{PV}$ into an AC power output $u_{PV}$ and provide the AC power output $u_{PV}$ to POI 1510.

Power inverter 1504 may receive the DC power output $P_{PV}$ from PV field 1502 and convert the DC power output to an AC power output that can be fed into energy grid 1512. Power inverter 1504 may synchronize the frequency of the AC power output with that of energy grid 1512 (e.g., 50 Hz or 60 Hz) using a local oscillator and may limit the voltage of the AC power output to no higher than the grid voltage. In some embodiments, power inverter 1504 is a resonant inverter that includes or uses LC circuits to remove the harmonics from a simple square wave in order to achieve a sine wave matching the frequency of energy grid 1512. In various embodiments, power inverter 1504 may operate using high-frequency transformers, low-frequency transformers, or without transformers. Low-frequency transformers may convert the DC output from PV field 1502 directly to the AC output provided to energy grid 1512. High-frequency transformers may employ a multi-step process that involves converting the DC output to high-frequency AC, then back to DC, and then finally to the AC output provided to energy grid 1512.

Power inverter 1504 may be configured to perform maximum power point tracking and/or anti-islanding. Maximum power point tracking may allow power inverter 1504 to produce the maximum possible AC power from PV field 1502. For example, power inverter 1504 may sample the DC power output from PV field 1502 and apply a variable resistance to find the optimum maximum power point. Anti-islanding is a protection mechanism that immediately shuts down power inverter 1504 (i.e., preventing power inverter 1504 from generating AC power) when the connection to an electricity-consuming load no longer exists. In some embodiments, PV field power inverter 1504 performs ramp rate control by limiting the power generated by PV field 1502.

PV field power inverter 1504 can include any of a variety of circuit components (e.g., resistors, capacitors, indictors, transformers, transistors, switches, diodes, etc.) configured to perform the functions described herein. In some embodiments DC power from PV field 1502 is connected to a transformer of PV field power inverter 1504 through a center tap of a primary winding. A switch can be rapidly switched back and forth to allow current to flow back to PV field 1502 following two alternate paths through one end of the primary winding and then the other. The alternation of the direction of current in the primary winding of the transformer can produce alternating current (AC) in a secondary circuit.

In some embodiments, PV field power inverter 1504 uses an electromechanical switching device to convert DC power from PV field 1502 into AC power. The electromechanical switching device can include two stationary contacts and a spring supported moving contact. The spring can hold the movable contact against one of the stationary contacts, whereas an electromagnet can pull the movable contact to the opposite stationary contact. Electric current in the electromagnet can be interrupted by the action of the switch so that the switch continually switches rapidly back and forth. In some embodiments, PV field power inverter 1504 uses transistors, thyristors (SCRs), and/or various other types of semiconductor switches to convert DC power from PV field 1502 into AC power. SCRs provide large power handling capability in a semiconductor device and can readily be controlled over a variable firing range.

In some embodiments, PV field power inverter 1504 produces a square voltage waveform (e.g., when not coupled to an output transformer). In other embodiments, PV field power inverter 1504 produces a sinusoidal waveform that matches the sinusoidal frequency and voltage of energy grid 1512. For example, PV field power inverter 1504 can use Fourier analysis to produce periodic waveforms as the sum of an infinite series of sine waves. The sine wave that has the same frequency as the original waveform is called the fundamental component. The other sine waves, called harmonics, that are included in the series have frequencies that are integral multiples of the fundamental frequency.

In some embodiments, PV field power inverter 1504 uses inductors and/or capacitors to filter the output voltage waveform. If PV field power inverter 1504 includes a transformer, filtering can be applied to the primary or the secondary side of the transformer or to both sides. Low-pass filters can be applied to allow the fundamental component of the waveform to pass to the output while limiting the passage of the harmonic components. If PV field power inverter 1504 is designed to provide power at a fixed frequency, a resonant filter can be used. If PV field power inverter 1504 is an adjustable frequency inverter, the filter can be tuned to a frequency that is above the maximum fundamental frequency. In some embodiments, PV field power inverter 1504 includes feedback rectifiers or antiparallel diodes connected across semiconductor switches to provide a path for a peak inductive load current when the switch is turned off. The antiparallel diodes can be similar to freewheeling diodes commonly used in AC/DC converter circuits.

Still referring to FIG. 15, system 1500 is shown to include a battery power inverter 1508. Battery power inverter 1508 may be configured to draw a DC power $P_{bat}$ from battery 1506, convert the DC power $P_{bat}$ into an AC power $u_{bat}$, and provide the AC power $u_{bat}$ to POI 1510. Battery power inverter 1508 may also be configured to draw the AC power $u_{bat}$ from POI 1510, convert the AC power $u_{bat}$ into a DC battery power $P_{bat}$, and store the DC battery power $P_{bat}$ in battery 1506. As such, battery power inverter 1508 can function as both a power inverter and a rectifier to convert between DC and AC in either direction. The DC battery power $P_{bat}$ may be positive if battery 1506 is providing power to battery power inverter 1508 (i.e., if battery 1506 is discharging) or negative if battery 1506 is receiving power from battery power inverter 1508 (i.e., if battery 1506 is charging). Similarly, the AC battery power $u_{bat}$ may be positive if battery power inverter 1508 is providing power to POI 1510 or negative if battery power inverter 1508 is receiving power from POI 1510.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 1506 and/or battery power inverter 1508 (i.e., $P_{bat}=u_{FR}+u_{RR}+P_{loss}$). The PV field power $u_{PV}$ and the battery power $u_{bat}$ combine at POI 1510 to form $P_{POI}$ (i.e., $P_{POI}=u_{PV}+u_{bat}$), which represents the amount of power provided to energy grid 1512. $P_{POI}$ may be positive if POI 1510 is providing power to energy grid 1512 or negative if POI 1510 is receiving power from energy grid 1512.

Like PV field power inverter 1504, battery power inverter 1508 can include any of a variety of circuit components (e.g., resistors, capacitors, indictors, transformers, transistors, switches, diodes, etc.) configured to perform the functions described herein. Battery power inverter 1508 can include many of the same components as PV field power inverter 1504 and can operate using similar principles. For example, battery power inverter 1508 can use electromechanical switching devices, transistors, thyristors (SCRs), and/or various other types of semiconductor switches to convert between AC and DC power. Battery power inverter 1508 can operate the circuit components to adjust the amount of power stored in battery 1506 and/or discharged from battery 1506 (i.e., power throughput) based on a power control signal or power setpoint from controller 1514.

Still referring to FIG. 15, system 1500 is shown to include a controller 1514. Controller 1514 may be configured to generate a PV power setpoint $u_{PV}$ for PV field power inverter 1504 and a battery power setpoint $u_{bat}$ for battery power inverter 1508. Throughout this disclosure, the variable $u_{PV}$ is used to refer to both the PV power setpoint generated by controller 1514 and the AC power output of PV field power inverter 1504 since both quantities have the same value. Similarly, the variable $u_{bat}$ is used to refer to both the battery power setpoint generated by controller 1514 and the AC power output/input of battery power inverter 1508 since both quantities have the same value.

PV field power inverter 1504 uses the PV power setpoint $u_{PV}$ to control an amount of the PV field power $P_{PV}$ to provide to POI 1510. The magnitude of $u_{PV}$ may be the same as the magnitude of $P_{PV}$ or less than the magnitude of $P_{PV}$. For example, $u_{PV}$ may be the same as $P_{PV}$ if controller 1514 determines that PV field power inverter 1504 is to provide all of the photovoltaic power $P_{PV}$ to POI 1510. However, $u_{PV}$ may be less than $P_{PV}$ if controller 1514 determines that PV field power inverter 1504 is to provide less than all of the photovoltaic power $P_{PV}$ to POI 1510. For example, controller 1514 may determine that it is desirable for PV field power inverter 1504 to provide less than all of the photovoltaic power $P_{PV}$ to POI 1510 to prevent the ramp rate from being exceeded and/or to prevent the power at POI 1510 from exceeding a power limit.

Battery power inverter 1508 uses the battery power setpoint $u_{bat}$ to control an amount of power charged or discharged by battery 1506. The battery power setpoint $u_{bat}$ may be positive if controller 1514 determines that battery power inverter 1508 is to draw power from battery 1506 or negative if controller 1514 determines that battery power inverter 1508 is to store power in battery 1506. The magnitude of $u_{bat}$ controls the rate at which energy is charged or discharged by battery 1506.

Controller 1514 may generate $u_{PV}$ and $u_{bat}$ based on a variety of different variables including, for example, a power signal from PV field 1502 (e.g., current and previous values for $P_{PV}$), the current state-of-charge (SOC) of battery 1506, a maximum battery power limit, a maximum power limit at POI 1510, the ramp rate limit, the grid frequency of energy grid 1512, and/or other variables that can be used by controller 1514 to perform ramp rate control and/or frequency regulation. Advantageously, controller 1514 generates values for $u_{PV}$ and $u_{bat}$ that maintain the ramp rate of the PV power within the ramp rate compliance limit while participating in the regulation of grid frequency and maintaining the SOC of battery 1506 within a predetermined desirable range. An exemplary controller which can be used as controller 1514 and exemplary processes which may be performed by controller 1514 to generate the PV power setpoint $u_{PV}$ and the battery power setpoint $u_{bat}$ are described in detail in U.S. Provisional Patent Application No. 62/239,245 filed Oct. 8, 2015, the entire disclosure of which is incorporated by reference herein.

Reactive Ramp Rate Control

Controller 1514 may be configured to control a ramp rate of the power output 1516 provided to energy grid 1512. Ramp rate may be defined as the time rate of change of power output 1516. Power output 1516 may vary depending on the magnitude of the DC output provided by PV field 1502. For example, if a cloud passes over PV field 1502, power output 1516 may rapidly and temporarily drop while PV field 1502 is within the cloud's shadow. Controller 1514 may be configured to calculate the ramp rate by sampling power output 1516 and determining a change in power output 1516 over time. For example, controller 1514 may calculate the ramp rate as the derivative or slope of power output 1516 as a function of time, as shown in the following equations:

$$\text{Ramp Rate} = \frac{dP}{dt} \text{ or Ramp Rate} = \frac{\Delta P}{\Delta t}$$

where P represents power output 1516 and t represents time.

In some embodiments, controller 1514 controls the ramp rate to comply with regulatory requirements or contractual requirements imposed by energy grid 1512. For example, system 1500 may be required to maintain the ramp rate within a predetermined range in order to deliver power to energy grid 1512. In some embodiments, system 1500 is required to maintain the absolute value of the ramp rate at less than a threshold value (e.g., less than 10% of the rated power capacity per minute). In other words, system 1500 may be required to prevent power output 1516 from increasing or decreasing too rapidly. If this requirement is not met, system 1500 may be deemed to be in non-compliance and its capacity may be de-rated, which directly impacts the revenue generation potential of system 1500.

Controller 1514 may use battery 1506 to perform ramp rate control. For example, controller 1514 may use energy from battery 1506 to smooth a sudden drop in power output 1516 so that the absolute value of the ramp rate is less than a threshold value. As previously mentioned, a sudden drop in power output 1516 may occur when a solar intensity disturbance occurs, such as a passing cloud blocking the sunlight to PV field 1502. Controller 1514 may use the energy from battery 1506 to make up the difference between the power provided by PV field 1502 (which has suddenly dropped) and the minimum required power output 1516 to maintain the required ramp rate. The energy from battery 1506 allows controller 1514 to gradually decrease power output 1516 so that the absolute value of the ramp rate does not exceed the threshold value.

Once the cloud has passed, the power output from PV field 1502 may suddenly increase as the solar intensity returns to its previous value. Controller 1514 may perform ramp rate control by gradually ramping up power output 1516. Ramping up power output 1516 may not require energy from battery 1506. For example, power inverter 1504 may use only a portion of the energy generated by PV field 1502 (which has suddenly increased) to generate power output 1516 (i.e., limiting the power output) so that the ramp rate of power output 1516 does not exceed the threshold value. The remainder of the energy generated by PV field 1502 (i.e., the excess energy) may be stored in battery 1506 and/or dissipated. Limiting the energy generated by PV field 1502 may include diverting or dissipating a portion of the energy generated by PV field 1502 (e.g., using variable resistors or other circuit elements) so that only a portion of the energy generated by PV field 1502 is provided to energy grid 1512. This allows power inverter 1504 to ramp up power output 1516 gradually without exceeding the ramp rate. The excess energy may be stored in battery 1506, used to power other components of system 1500, or dissipated.

Figure 17:
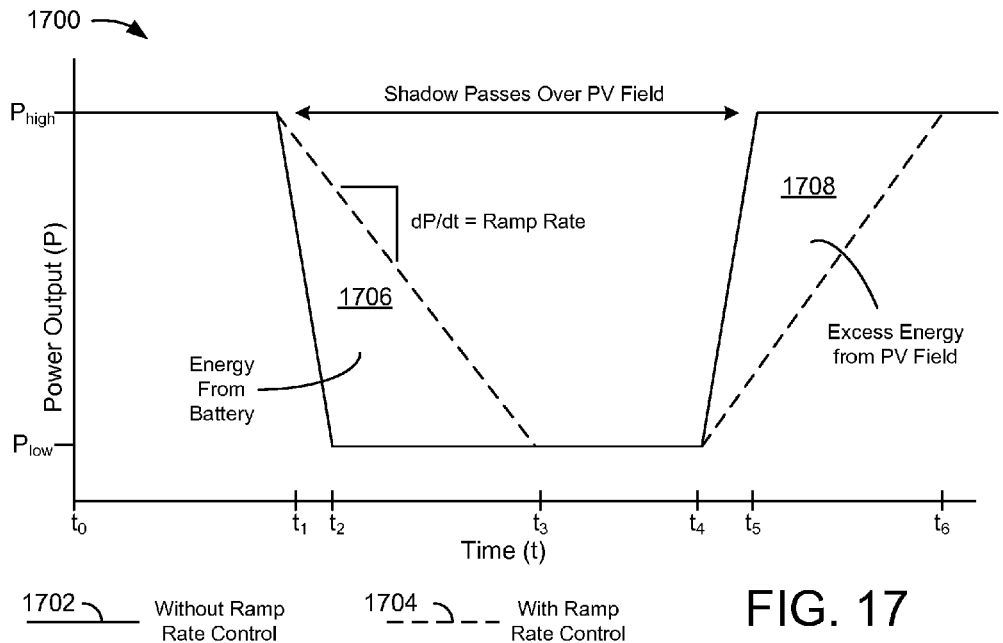
FIG. 17 is a graph illustrating a reactive ramp rate control technique which can be used by the electrical energy storage system of FIG. 15, according to an exemplary embodiment.

Referring now to FIG. 17, a graph 1700 illustrating a reactive ramp rate control technique which can be used by system 1500 is shown, according to an exemplary embodiment. Graph 1700 plots the power output P provided to energy grid 1512 as a function of time t. The solid line 1702 illustrates power output P without any ramp rate control, whereas the broken line 1704 illustrates power output P with ramp rate control.

Between times $t_0$ and $t_1$, power output P is at a high value $P_{high}$. At time $t_1$, a cloud begins to cast its shadow on PV field 1502, causing the power output of PV field 1502 to suddenly decrease, until PV field 1502 is completely in shadow at time $t_2$. Without any ramp rate control, the sudden drop in power output from PV field 1502 causes the power output P to rapidly drop to a low value $P_{low}$ at time $t_2$. However, with ramp rate control, system 1500 uses energy from battery 1506 to gradually decrease power output P to $P_{low}$ at time $t_3$. Triangular region 1706 represents the energy from battery 1506 used to gradually decrease power output P.

Between times $t_2$ and $t_4$, PV field 1502 is completely in shadow. At time $t_4$, the shadow cast by the cloud begins to move off PV field 1502, causing the power output of PV field 1502 to suddenly increase, until PV field 1502 is entirely in sunlight at time $t_5$. Without any ramp rate control, the sudden increase in power output from PV field 1502 causes the power output P to rapidly increase to the high value $P_{high}$ at time $t_5$. However, with ramp rate control, power inverter 1504 limits the energy from PV field 1502 to gradually increase power output P to $P_{high}$ at time $t_6$. Triangular region 1708 represents the energy generated by PV field 1502 in excess of the ramp rate limit. The excess energy may be stored in battery 1506 and/or dissipated in order to gradually increase power output P at a rate no greater than the maximum allowable ramp rate.

Notably, both triangular regions 1706 and 1708 begin after a change in the power output of PV field 1502 occurs. As such, both the decreasing ramp rate control and the increasing ramp rate control provided by system 1500 are reactionary processes triggered by a detected change in the power output. In some embodiments, a feedback control technique is used to perform ramp rate control in system 1500. For example, controller 1514 may monitor power output 1516 and determine the absolute value of the time rate of change of power output 1516 (e.g., dP/dt or $\Delta P/\Delta t$). Controller 1514 may initiate ramp rate control when the absolute value of the time rate of change of power output 1516 exceeds a threshold value.

Preemptive Ramp Rate Control

In some embodiments, controller 1514 is configured to predict when solar intensity disturbances will occur and may cause power inverter 1504 to ramp down the power output 1516 provided to energy grid 1512 preemptively. Instead of reacting to solar intensity disturbances after they occur, controller 1514 can actively predict solar intensity disturbances and preemptively ramp down power output 1516 before the disturbances affect PV field 1502. Advantageously, this allows system controller 1514 to perform both ramp down control and ramp up control by using only a portion of the energy provided by PV field 1502 to generate power output 1516 while the power output of PV field 1502 is still high, rather than relying on energy from a battery. The remainder of the energy generated by PV field 1502 (i.e., the excess energy) may be stored in battery 1506 and/or dissipated.

In some embodiments, controller 1514 predicts solar intensity disturbances using input from one or more cloud detectors. The cloud detectors may include an array of solar intensity sensors. The solar intensity sensors may be positioned outside PV field 1502 or within PV field 1502. Each solar intensity sensor may have a known location. In some embodiments, the locations of the solar intensity sensors are based on the geometry and orientation of PV field 1502. For example, if PV field 1502 is rectangular, more sensors may be placed along its long side than along its short side. A cloud formation moving perpendicular to the long side may cover more area of PV field 1502 per unit time than a cloud formation moving perpendicular to the short side. Therefore, it may be desirable to include more sensors along the long side to more precisely detect cloud movement perpendicular to the long side. As another example, more sensors may be placed along the west side of PV field 1502 than along the east side of PV field 1502 since cloud movement from west to east is more common than cloud movement from east to west. The placement of sensors may be selected to detect approaching cloud formations without requiring unnecessary or redundant sensors.

The solar intensity sensors may be configured to measure solar intensity at various locations outside PV field 1502. When the solar intensity measured by a particular solar intensity sensor drops below a threshold value, controller 1514 may determine that a cloud is currently casting a shadow on the solar intensity sensor. Controller 1514 may use input from multiple solar intensity sensors to determine various attributes of clouds approaching PV field 1502 and/or the shadows produced by such clouds. For example, if a shadow is cast upon two or more of the solar intensity sensors sequentially, controller 1514 may use the known positions of the solar intensity sensors and the time interval between each solar intensity sensor detecting the shadow to determine how fast the cloud/shadow is moving. If two or more of the solar intensity sensors are within the shadow simultaneously, controller 1514 may use the known positions of the solar intensity sensors to determine a position, size, and/or shape of the cloud/shadow.

Although the cloud detectors are described primarily as solar intensity sensors, it is contemplated that the cloud detectors may include any type of device configured to detect the presence of clouds or shadows cast by clouds. For example, the cloud detectors may include one or more cameras that capture visual images of cloud movement. The cameras may be upward-oriented cameras located below the clouds (e.g., attached to a structure on the Earth) or downward-oriented cameras located above the clouds (e.g., satellite cameras). Images from the cameras may be used to determine cloud size, position, velocity, and/or other cloud attributes. In some embodiments, the cloud detectors include radar or other meteorological devices configured to detect the presence of clouds, cloud density, cloud velocity, and/or other cloud attributes. In some embodiments, controller 1514 receives data from a weather service that indicates various cloud attributes.

Advantageously, controller 1514 may use the attributes of the clouds/shadows to determine when a solar intensity disturbance (e.g., a shadow) is approaching PV field 1502. For example, controller 1514 may use the attributes of the clouds/shadows to determine whether any of the clouds are expected to cast a shadow upon PV field 1502. If a cloud is expected to cast a shadow upon PV field 1502, controller 1514 may use the size, position, and/or velocity of the cloud/shadow to determine a portion of PV field 1502 that will be affected. The affected portion of PV field 1502 may include some or all of PV field 1502. Controller 1514 may use the attributes of the clouds/shadows to quantify a magnitude of the expected solar intensity disturbance (e.g., an expected decrease in power output from PV field 1502) and to determine a time at which the disturbance is expected to occur (e.g., a start time, an end time, a duration, etc.).

In some embodiments, controller 1514 predicts a magnitude of the disturbance for each of a plurality of time steps. Controller 1514 may use the predicted magnitudes of the disturbance at each of the time steps to generate a predicted disturbance profile. The predicted disturbance profile may indicate how fast power output 1516 is expected to change as a result of the disturbance. Controller 1514 may compare the expected rate of change to a ramp rate threshold to determine whether ramp rate control is required. For example, if power output 1516 is predicted to decrease at a rate in excess of the maximum compliant ramp rate, controller 1514 may preemptively implement ramp rate control to gradually decrease power output 1516.

In some embodiments, controller 1514 identifies the minimum expected value of power output 1516 and determines when the predicted power output is expected to reach the minimum value. Controller 1514 may subtract the minimum expected power output 1516 from the current power output 1516 to determine an amount by which power output 1516 is expected to decrease. Controller 1514 may apply the maximum allowable ramp rate to the amount by which power output 1516 is expected to decrease to determine a minimum time required to ramp down power output 1516 in order to comply with the maximum allowable ramp rate. For example, controller 1514 may divide the amount by which power output 1516 is expected to decrease (e.g., measured in units of power) by the maximum allowable ramp rate (e.g., measured in units of power per unit time) to identify the minimum time required to ramp down power output 1516. Controller 1514 may subtract the minimum required time from the time at which the predicted power output is expected to reach the minimum value to determine when to start preemptively ramping down power output 1516.

Advantageously, controller 1514 may preemptively act upon predicted disturbances by causing power inverter 1504 to ramp down power output 1516 before the disturbances affect PV field 1502. This allows power inverter 1504 to ramp down power output 1516 by using only a portion of the energy generated by PV field 1502 to generate power output 1516 (i.e., performing the ramp down while the power output is still high), rather than requiring additional energy from a battery (i.e., performing the ramp down after the power output has decreased). The remainder of the energy generated by PV field 1502 (i.e., the excess energy) may be stored in battery 1506 and/or dissipated.

Figure 18:
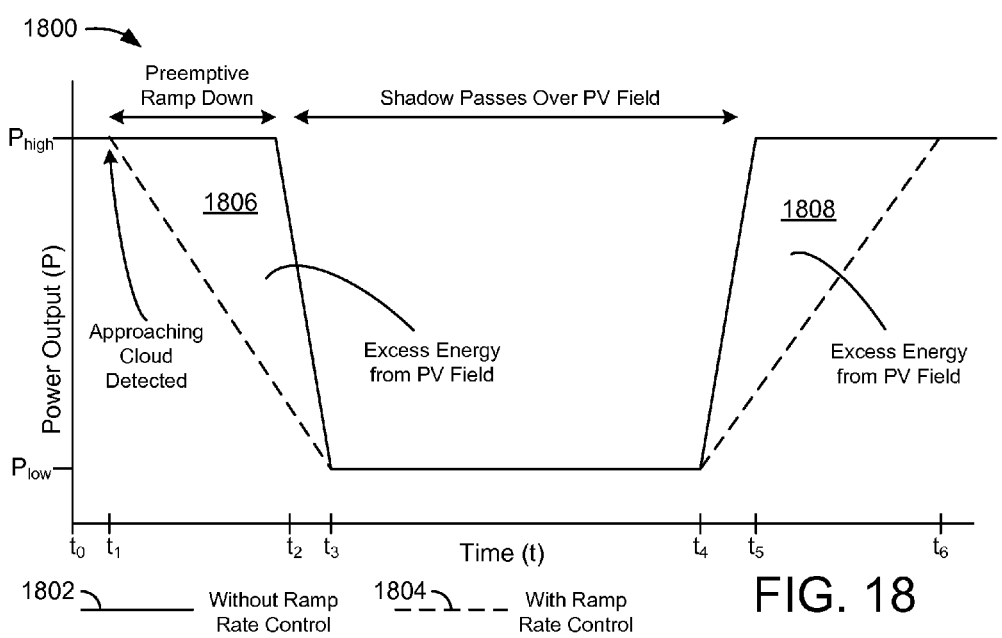
FIG. 18 is a graph illustrating a preemptive ramp rate control technique which can be used by the electrical energy storage system of FIG. 15, according to an exemplary embodiment.

Referring now to FIG. 18, a graph 1800 illustrating a preemptive ramp rate control technique which can be used by controller 1514 is shown, according to an exemplary embodiment. Graph 1800 plots the power output P provided to energy grid 1512 as a function of time t. The solid line 1802 illustrates power output P without any ramp rate control, whereas the broken line 1804 illustrates power output P with preemptive ramp rate control.

Between times $t_0$ and $t_2$, power output P is at a high value $P_{high}$. At time $t_2$, a cloud begins to cast its shadow on PV field 1502, causing the power output of PV field 1502 to suddenly decrease, until PV field 1502 is completely in shadow at time $t_3$. Without any ramp rate control, the sudden drop in power output from PV field 1502 causes the power output P to rapidly drop from $P_{high}$ to a low value $P_{low}$ between times $t_2$ and $t_3$. However, with preemptive ramp rate control, controller 1514 preemptively causes power inverter 1504 to begin ramping down power output P at time $t_1$, prior to the cloud casting a shadow on PV field 1502. The preemptive ramp down occurs between times $t_1$ and $t_3$, resulting in a ramp rate that is relatively more gradual. Triangular region 1806 represents the energy generated by PV field 1502 in excess of the ramp rate limit. The excess energy may be limited by power inverter 1504 and/or stored in battery 1506 to gradually decrease power output P at a rate no greater than the ramp rate limit.

Between times $t_3$ and $t_4$, PV field 1502 is completely in shadow. At time $t_4$, the shadow cast by the cloud begins to move off PV field 1502, causing the power output of PV field 1502 to suddenly increase, until PV field 1502 is entirely in sunlight at time $t_5$. Without any ramp rate control, the sudden increase in power output from PV field 1502 causes the power output P to rapidly increase to the high value $P_{high}$ at time $t_5$. However, with ramp rate control, power inverter 1504 uses only a portion of the energy from PV field 1502 to gradually increase power output P to $P_{high}$ at time $t_6$. Triangular region 1808 represents the energy generated by PV field 1502 in excess of the ramp rate limit. The excess energy may be limited by power inverter 1504 and/or stored in battery 1506 to gradually increase power output P at a rate no greater than the ramp rate limit.

Notably, a significant portion of triangular region 1806 occurs between times $t_1$ and $t_2$, before the disturbance affects PV field 1502. As such, the decreasing ramp rate control provided by system 1500 is a preemptive process triggered by detecting an approaching cloud, prior to the cloud casting a shadow upon PV field 1502. In some embodiments, controller 1514 uses a predictive control technique (e.g., feedforward control, model predictive control, etc.) to perform ramp down control in system 1500. For example, controller 1514 may actively monitor the positions, sizes, velocities, and/or other attributes of clouds/shadows that could potentially cause a solar intensity disturbance affecting PV field 1502. When an approaching cloud is detected at time $t_1$, controller 1514 may preemptively cause power inverter 1504 to begin ramping down power output 1516. This allows power inverter 1504 to ramp down power output 1516 by limiting the energy generated by PV field 1502 while the power output is still high, rather than requiring additional energy from a battery to perform the ramp down once the power output has dropped.

Frequency Regulation and Ramp Rate Controller

Figure 19:
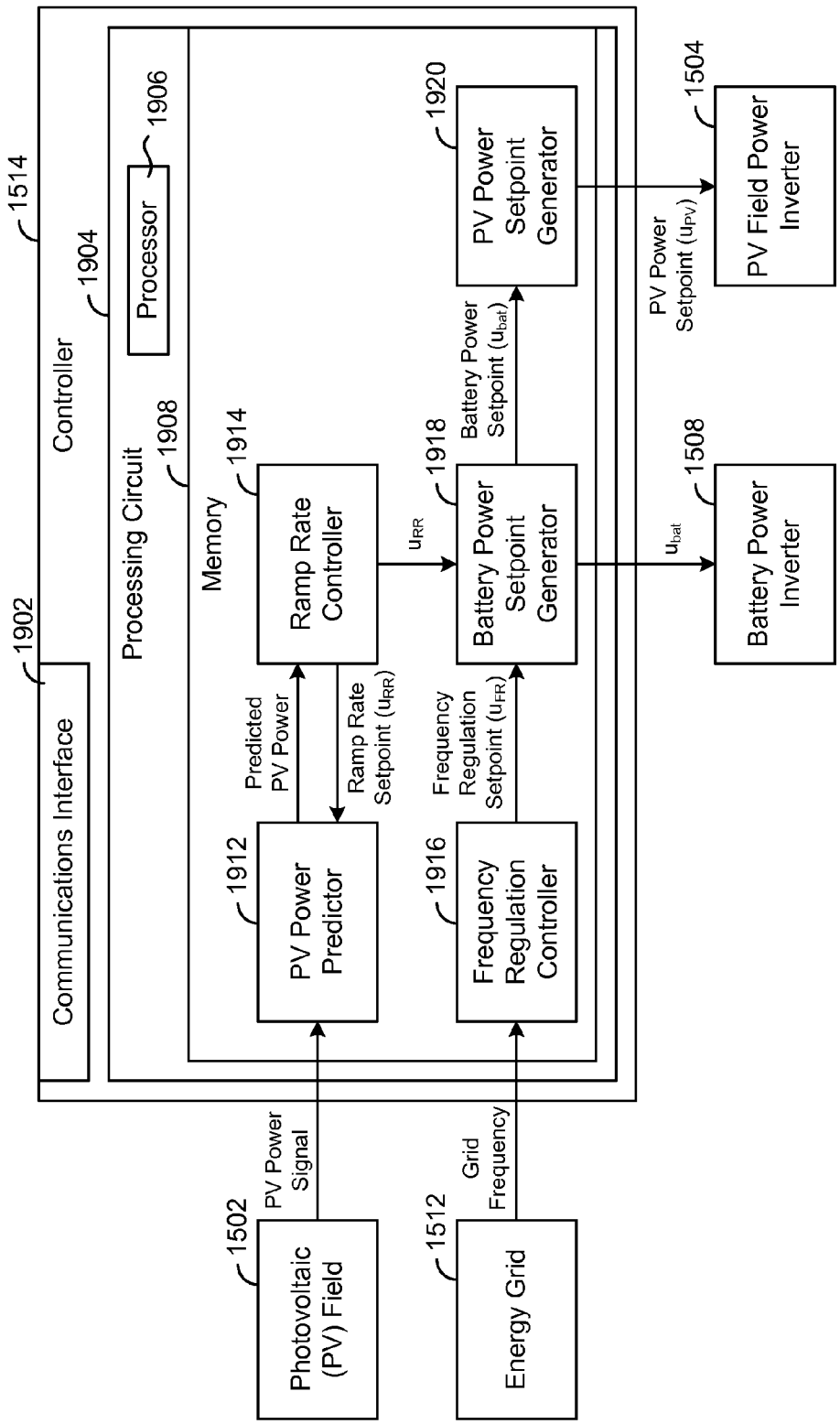
FIG. 19 is a block diagram of a frequency regulation and ramp rate controller which can be used to monitor and control the electrical energy storage system of FIG. 15, according to an exemplary embodiment.

Referring now to FIG. 19, a block diagram illustrating controller 1514 in greater detail is shown, according to an exemplary embodiment. Controller 1514 is shown to include a communications interface 1902 and a processing circuit 1904. Communications interface 1902 may include wired or wireless interfaces (e.g., jacks, antennas, transmitters, receivers, transceivers, wire terminals, etc.) for conducting data communications with various systems, devices, or networks. For example, communications interface 1502 may include an Ethernet card and port for sending and receiving data via an Ethernet-based communications network and/or a WiFi transceiver for communicating via a wireless communications network. Communications interface 1902 may be configured to communicate via local area networks or wide area networks (e.g., the Internet, a building WAN, etc.) and may use a variety of communications protocols (e.g., BACnet, IP, LON, etc.).

Communications interface 1902 may be a network interface configured to facilitate electronic data communications between controller 1514 and various external systems or devices (e.g., PV field 1502, energy grid 1512, PV field power inverter 1504, battery power inverter 1508, etc.). For example, controller 1514 may receive a PV power signal from PV field 1502 indicating the current value of the PV power $P_{PV}$ generated by PV field 1502. Controller 1514 may use the PV power signal to predict one or more future values for the PV power $P_{PV}$ and generate a ramp rate setpoint $u_{RR}$.

Controller 1514 may receive a grid frequency signal from energy grid 1512 indicating the current value of the grid frequency. Controller 1514 may use the grid frequency to generate a frequency regulation setpoint $u_{FR}$. Controller 1514 may use the ramp rate setpoint $u_{RR}$ and the frequency regulation setpoint $u_{FR}$ to generate a battery power setpoint $u_{bat}$ and may provide the battery power setpoint $u_{bat}$ to battery power inverter 1508. Controller 1514 may use the battery power setpoint $u_{bat}$ to generate a PV power setpoint $u_{PV}$ and may provide the PV power setpoint $u_{PV}$ to PV field power inverter 1504.

Still referring to FIG. 19, processing circuit 1904 is shown to include a processor 1906 and memory 1908. Processor 1906 may be a general purpose or specific purpose processor, an application specific integrated circuit (ASIC), one or more field programmable gate arrays (FPGAs), a group of processing components, or other suitable processing components. Processor 1906 may be configured to execute computer code or instructions stored in memory 1908 or received from other computer readable media (e.g., CDROM, network storage, a remote server, etc.).

Memory 1908 may include one or more devices (e.g., memory units, memory devices, storage devices, etc.) for storing data and/or computer code for completing and/or facilitating the various processes described in the present disclosure. Memory 1908 may include random access memory (RAM), read-only memory (ROM), hard drive storage, temporary storage, non-volatile memory, flash memory, optical memory, or any other suitable memory for storing software objects and/or computer instructions. Memory 1908 may include database components, object code components, script components, or any other type of information structure for supporting the various activities and information structures described in the present disclosure. Memory 1908 may be communicably connected to processor 1906 via processing circuit 1904 and may include computer code for executing (e.g., by processor 1906) one or more processes described herein.

Predicting PV Power Output

Still referring to FIG. 19, controller 1514 is shown to include a PV power predictor 1912. PV power predictor 1912 may receive the PV power signal from PV field 1502 and use the PV power signal to make a short term prediction of the photovoltaic power output $P_{PV}$. In some embodiments, PV power predictor 1912 predicts the value of $P_{PV}$ for the next time step (i.e., a one step ahead prediction). For example, at each time step k, PV power predictor 1912 may predict the value of the PV power output $P_{PV}$ for the next time step k+1 (i.e., $\hat{P}_{PV}(k+1)$). Advantageously, predicting the next value for the PV power output $P_{PV}$ allows controller 1514 to predict the ramp rate and perform an appropriate control action to prevent the ramp rate from exceeding the ramp rate compliance limit.

In some embodiments, PV power predictor 1912 performs a time series analysis to predict $\hat{P}_{PV}(k+1)$. A time series may be defined by an ordered sequence of values of a variable at equally spaced intervals. PV power predictor 1912 may model changes between values of $P_{PV}$ over time using an autoregressive moving average (ARMA) model or an autoregressive integrated moving average (ARIMA) model. PV power predictor 1912 may use the model to predict the next value of the PV power output $P_{PV}$ and correct the prediction using a Kalman filter each time a new measurement is acquired. The time series analysis technique is described in greater detail in the following paragraphs.

In some embodiments, PV power predictor 1912 uses a technique in the Box-Jenkins family of techniques to perform the time series analysis. These techniques are statistical tools that use past data (e.g., lags) to predict or correct new data, and other techniques to find the parameters or coefficients of the time series. A general representation of a time series from the Box-Jenkins approach is:

$$X_k - \sum_{r=1}^{p} \varphi_r X_{k-r} = \sum_{s=0}^{q} \theta_s \epsilon_{k-s}$$

which is known as an ARMA process. In this representation, the parameters p and q define the order and number of lags of the time series, $\varphi$ is an autoregressive parameter, and $\theta$ is a moving average parameter. This representation is desirable for a stationary process which has a mean, variance, and autocorrelation structure that does not change over time. However, if the original process $\{Y_k\}$ representing the time series values of $P_{PV}$ is not stationary, $X_k$ can represent the first difference (or higher order difference) of the process $\{Y_k - Y_{k-1}\}$. If the difference is stationary, PV power predictor 1912 may model the process as an ARIMA process.

PV power predictor 1912 may be configured to determine whether to use an ARMA model or an ARIMA model to model the time series of the PV power output $P_{PV}$. Determining whether to use an ARMA model or an ARIMA model may include identifying whether the process is stationary. In some embodiments, the power output $P_{PV}$ is not stationary. However, the first difference $Y_k - Y_{k-1}$ may be stationary. Accordingly, PV power predictor 1912 may select an ARIMA model to represent the time series of $P_{PV}$.

PV power predictor 1912 may find values for the parameters p and q that define the order and the number of lags of the time series. In some embodiments, PV power predictor 1912 finds values for p and q by checking the partial autocorrelation function (PACF) and selecting a number where the PACF approaches zero (e.g., p=q). For some time series data, PV power predictor 1912 may determine that a $4^{th}$ or $5^{th}$ order model is appropriate. However, it is contemplated that PV power predictor 1912 may select a different model order to represent different time series processes.

PV power predictor 1912 may find values for the autoregressive parameter $\varphi_{1 \ldots p}$ and the moving average parameter $\theta_{1 \ldots q}$. In some embodiments, PV power predictor 1912 uses an optimization algorithm to find values for $\varphi_{1 \ldots p}$ and $\theta_{1 \ldots q}$ given the time series data $\{Y_k\}$. For example, PV power predictor 1912 may generate a discrete-time ARIMA model of the form:

$$A(z)y(k) = \left[\frac{C(z)}{1-z^{-1}}\right]e(t)$$

where A(z) and C(z) are defined as follows:

$$A(z) = 1 + \varphi_1 z^{-1} + \varphi_2 z^{-2} + \varphi_3 z^{-3} + \varphi_4 z^{-4}$$

$$C(z) = 1 + \theta_1 z^{-1} + \theta_2 z^{-2} + \theta_3 z^{-3} + \theta_4 z^{-4}$$

where the values for $\varphi_{1 \ldots p}$ and $\theta_{1 \ldots q}$ are determined by fitting the model to the time series values of $P_{PV}$.

In some embodiments, PV power predictor 1912 uses the ARIMA model as an element of a Kalman filter. The Kalman filter may be used by PV power predictor 1912 to correct the estimated state and provide tighter predictions based on actual values of the PV power output $P_{PV}$. In order to use the ARIMA model with the Kalman filter, PV power predictor

1912 may generate a discrete-time state-space representation of the ARIMA model of the form:

$$x(k+1)=Ax(k)+Ke(k)$$

$$y(k)=Cx(k)+e(k)$$

where y(k) represents the values of the PV power output $P_{PV}$ and e(k) is a disturbance considered to be normal with zero mean and a variance derived from the fitted model. It is contemplated that the state-space model can be represented in a variety of different forms. For example, the ARIMA model can be rewritten as a difference equation and used to generate a different state-space model using state-space modeling techniques. In various embodiments, PV power predictor 1912 may use any of a variety of different forms of the state-space model.

The discrete Kalman filter consists of an iterative process that takes a state-space model and forwards it in time until there are available data to correct the predicted state and obtain a better estimate. The correction may be based on the evolution of the mean and covariance of an assumed white noise system. For example, PV power predictor 1912 may use a state-space model of the following form:

$$x(k+1)=Ax(k)+Bu(k)+w(k) \ w(k) \sim N(0,Q)$$

$$y(k)=Cx(k)+Du(k)+v(k) \ v(k) \sim N(0,R)$$

where N( ) represents a normal distribution, v(k) is the measurement error having zero mean and variance R, and w(k) is the process error having zero mean and variance Q. The values of R and Q are design choices. The variable x(k) is a state of the process and the variable y(k) represents the PV power output $P_{PV}(k)$. This representation is referred to as a stochastic state-space representation.

PV power predictor 1912 may use the Kalman filter to perform an iterative process to predict $\hat{P}_{PV}(k+1)$ based on the current and previous values of $P_{PV}$ (e.g., $P_{PV}(k)$, $P_{PV}(k-1)$, etc.). The iterative process may include a prediction step and an update step. The prediction step moves the state estimate forward in time using the following equations:

$$\hat{x}^-(k+1)=A*\hat{x}(k)$$

$$P^-(k+1)=A*P(k)*A^T+Q$$

where $\hat{x}(k)$ is the mean of the process or estimated state at time step k and P(k) is the covariance of the process at time step k. The super index "−" indicates that the estimated state $\hat{x}^-(k+1)$ is based on the information known prior to time step k+1 (i.e., information up to time step k). In other words, the measurements at time step k+1 have not yet been incorporated to generate the state estimate $\hat{x}^-(k+1)$. This is known as an a priori state estimate.

PV power predictor 1912 may predict the PV power output $\hat{P}_{PV}(k+1)$ by determining the value of the predicted measurement $\hat{y}^-(k+1)$. As previously described, the measurement y(k) and the state x(k) are related by the following equation:

$$y(k)=Cx(k)+e(k)$$

which allows PV power predictor 1912 to predict the measurement $\hat{y}^-(k+1)$ as a function of the predicted state $\hat{x}^-(k+1)$. PV power predictor 1912 may use the measurement estimate $\hat{y}^-(k+1)$ as the value for the predicted PV power output $\hat{P}_{PV}(k+1)$ (i.e., $\hat{P}_{PV}(k+1)=\hat{y}^-(k+1)$).

The update step uses the following equations to correct the a priori state estimate $\hat{x}^-(k+1)$ based on the actual (measured) value of y(k+1):

$$K=P^-(k+1)*C^T*[R+C*P^-(k+1)*C^T]^{-1}$$

$$\hat{x}(k+1)=\hat{x}^-(k+1)+K*[y(k+1)-C*\hat{x}^-(k+1)]$$

$$P(k+1)=P^-(k+1)-K*[R+C*P^-(k+1)*C^T]*K^T$$

where y(k+1) corresponds to the actual measured value of $P_{PV}(k+1)$. The variable $\hat{x}(k+1)$ represents the a posteriori estimate of the state x at time k+1 given the information known up to time step k+1. The update step allows PV power predictor 1912 to prepare the Kalman filter for the next iteration of the prediction step.

Although PV power predictor 1912 is primarily described as using a time series analysis to predict $\hat{P}_{PV}(k+1)$, it is contemplated that PV power predictor 1912 may use any of a variety of techniques to predict the next value of the PV power output $P_{PV}$. For example, PV power predictor 1912 may use a deterministic plus stochastic model trained from historical PV power output values (e.g., linear regression for the deterministic portion and an AR model for the stochastic portion). This technique is described in greater detail in U.S. patent application Ser. No. 14/717,593, titled "Building Management System for Forecasting Time Series Values of Building Variables" and filed May 20, 2015, the entirety of which is incorporated by reference herein.

In other embodiments, PV power predictor 1912 uses input from cloud detectors (e.g., cameras, light intensity sensors, radar, etc.) to predict when an approaching cloud will cast a shadow upon PV field 1502. When an approaching cloud is detected, PV power predictor 1912 may estimate an amount by which the solar intensity will decrease as a result of the shadow and/or increase once the shadow has passed PV field 1502. PV power predictor 1912 may use the predicted change in solar intensity to predict a corresponding change in the PV power output $P_{PV}$. This technique is described in greater detail in U.S. Provisional Patent Application No. 62/239,131 titled "Systems and Methods for Controlling Ramp Rate in a Photovoltaic Energy System" and filed Oct. 8, 2015, the entirety of which is incorporated by reference herein. PV power predictor 1912 may provide the predicted PV power output $\hat{P}_{PV}(k+1)$ to ramp rate controller 1914.

Controlling Ramp Rate

Still referring to FIG. 19, controller 1514 is shown to include a ramp rate controller 1914. Ramp rate controller 1914 may be configured to determine an amount of power to charge or discharge from battery 1506 for ramp rate control (i.e., $u_{RR}$). Advantageously, ramp rate controller 1914 may determine a value for the ramp rate power $u_{RR}$ that simultaneously maintains the ramp rate of the PV power (i.e., $u_{RR}+P_{PV}$) within compliance limits while allowing controller 1514 to regulate the frequency of energy grid 1512 and while maintaining the state-of-charge of battery 1506 within a predetermined desirable range.

In some embodiments, the ramp rate of the PV power is within compliance limits as long as the actual ramp rate evaluated over a one minute interval does not exceed ten percent of the rated capacity of PV field 1502. The actual ramp rate may be evaluated over shorter intervals (e.g., two seconds) and scaled up to a one minute interval. Therefore, a ramp rate may be within compliance limits if the ramp rate satisfies one or more of the following inequalities:

$$|rr| < \frac{0.1 \ P_{cap}}{30}(1+\text{tolerance})$$

$$|RR| < 0.1 \ P_{cap}(1+\text{tolerance})$$

where rr is the ramp rate calculated over a two second interval, RR is the ramp rate calculated over a one minute interval, $P_{cap}$ is the rated capacity of PV field 1502, and tolerance is an amount by which the actual ramp rate can exceed the compliance limit without resulting in a non-compliance violation (e.g., tolerance=10%). In this formulation, the ramp rates rr and RR represent a difference in the PV power (e.g., measured in kW) at the beginning and end of the ramp rate evaluation interval.

Simultaneous implementation of ramp rate control and frequency regulation can be challenging (e.g., can result in non-compliance), especially if the ramp rate is calculated as the difference in the power $P_{POI}$ at POI 1510. In some embodiments, the ramp rate over a two second interval is defined as follows:

$$rr=[P_{POI}(k)-P_{POI}(k-1)]-[u_{FR}(k)-u_{FR}(k-1)]$$

where $P_{POI}(k-1)$ and $P_{POI}(k)$ are the total powers at POI 1510 measured at the beginning and end, respectively, of a two second interval, and $u_{FR}(k-1)$ and $u_{FR}(k)$ are the powers used for frequency regulation measured at the beginning and end, respectively, of the two second interval.

The total power at POI 1510 (i.e., $P_{POI}$) is the sum of the power output of PV field power inverter 1504 (i.e., $u_{PV}$) and the power output of battery power inverter 1508 (i.e., $u_{bat}=u_{FR}+u_{RR}$). Assuming that PV field power inverter 1504 is not limiting the power $P_{PV}$ generated by PV field 1502, the output of PV field power inverter 1504 $u_{PV}$ may be equal to the PV power output $P_{PV}$ (i.e., $P_{PV}=u_{PV}$) and the total power $P_{POI}$ at POI 1510 can be calculated using the following equation:

$$P_{POI}=P_{PV}+u_{FR}+u_{RR}$$

Therefore, the ramp rate rr can be rewritten as:

$$rr=P_{PV}(k)-P_{PV}(k-1)+u_{RR}(k)-u_{RR}(k-1)$$

and the inequality which must be satisfied to comply with the ramp rate limit can be rewritten as:

$$|P_{PV}(k)-P_{PV}(k-1)+u_{RR}(k)-u_{RR}(k-1)| < \frac{0.1\, P_{cap}}{30}(1+\text{tolerance})$$

where $P_{PV}(k-1)$ and $P_{PV}(k)$ are the power outputs of PV field 1502 measured at the beginning and end, respectively, of the two second interval, and $u_{RR}(k-1)$ and $u_{RR}(k)$ are the powers used for ramp rate control measured at the beginning and end, respectively, of the two second interval.

In some embodiments, ramp rate controller 1914 determines the ramp rate compliance of a facility based on the number of scans (i.e., monitored intervals) in violation that occur within a predetermined time period (e.g., one week) and the total number of scans that occur during the predetermined time period. For example, the ramp rate compliance RRC may be defined as a percentage and calculated as follows:

$$RRC = 100\left(1 - \frac{n_{vscan}}{n_{tscan}}\right)$$

where $n_{vscan}$ is the number of scans over the predetermined time period where rr is in violation and $n_{tscan}$ is the total number of scans during which the facility is performing ramp rate control during the predetermined time period.

In some embodiments, the intervals that are monitored or scanned to determine ramp rate compliance are selected arbitrarily or randomly (e.g., by a power utility). Therefore, it may be impossible to predict which intervals will be monitored. Additionally, the start times and end times of the intervals may be unknown. In order to guarantee ramp rate compliance and minimize the number of scans where the ramp rate is in violation, ramp rate controller 1914 may determine the amount of power $u_{RR}$ used for ramp rate control ahead of time. In other words, ramp rate controller 1914 may determine, at each instant, the amount of power $u_{RR}$ to be used for ramp rate control at the next instant. Since the start and end times of the intervals may be unknown, ramp rate controller 1914 may perform ramp rate control at smaller time intervals (e.g., on the order of milliseconds).

Ramp rate controller 1914 may use the predicted PV power $\hat{P}_{PV}(k+1)$ at instant k+1 and the current PV power $P_{PV}(k)$ at instant k to determine the ramp rate control power $\hat{u}_{RR_T}(k)$ at instant k. Advantageously, this allows ramp rate controller 1914 to determine whether the PV power $P_{PV}$ is in an up-ramp, a down-ramp, or no-ramp at instant k. Assuming a T seconds time resolution, ramp rate controller 1914 may determine the value of the power for ramp rate control $\hat{u}_{RR_T}(k)$ at instant k based on the predicted value of the PV power $P_{PV}(k+1)$, the current value of the PV power $P_{PV}(k)$, and the previous power used for ramp rate control $\hat{u}_{RR_T}(k-1)$. Scaling to T seconds and assuming a tolerance of zero, ramp rate compliance is guaranteed if $\hat{u}_{RR_T}(k)$ satisfies the following inequality:

$$lb_{RR_T} \leq \hat{u}_{RR_T} \leq ub_{RR_T}$$

where T is the sampling time in seconds, $lb_{RR_T}$ is the lower bound on $\hat{u}_{RR_T}(k)$, and $ub_{RR_T}$ is the upper bound on $\hat{u}_{RR_T}(k)$.

In some embodiments, the lower bound $lb_{RR_T}$ and the upper bound $ub_{RR_T}$ are defined as follows:

$$lb_{RR_T} = -\left(\hat{P}_{PV}(k+1) - P_{PV}(k)\right) + \hat{u}_{RR_T}(k-1) - \frac{0.1 P_{cap}}{60/T} + \lambda\sigma$$

$$ub_{RR_T} = -\left(\hat{P}_{PV}(k+1) - P_{PV}(k)\right) + \hat{u}_{RR_T}(k-1) + \frac{0.1 P_{cap}}{60/T} - \lambda\sigma$$

where $\sigma$ is the uncertainty on the PV power prediction and $\lambda$ is a scaling factor of the uncertainty in the PV power prediction. Advantageously, the lower bound $lb_{RR_T}$ and the upper bound $ub_{RR_T}$ provide a range of ramp rate power $\hat{u}_{RR_T}(k)$ that guarantees compliance of the rate of change in the PV power.

In some embodiments, ramp rate controller 1914 determines the ramp rate power $\hat{u}_{RR_T}(k)$ based on whether the PV power $P_{PV}$ is in an up-ramp, a down-ramp, or no-ramp (e.g., the PV power is not changing or changing at a compliant rate) at instant k. Ramp rate controller 1914 may also consider the state-of-charge (SOC) of battery 1506 when determining $\hat{u}_{RR_T}(k)$. Exemplary processes which may be performed by ramp rate controller 1914 to generate values for the ramp rate power $\hat{u}_{RR_T}(k)$ are described in detail in U.S. Patent Application No. 62/239,245. Ramp rate controller 1914 may provide the ramp rate power setpoint $\hat{u}_{RR_T}(k)$ to battery power setpoint generator 1918 for use in determining the battery power setpoint $u_{bat}$.

Controlling Frequency Regulation

Referring again to FIG. 19, controller 1514 is shown to include a frequency regulation controller 1916. Frequency regulation controller 1916 may be configured to determine an amount of power to charge or discharge from battery 1506 for frequency regulation (i.e., $u_{FR}$). Frequency regulation controller 1916 is shown receiving a grid frequency signal from energy grid 1512. The grid frequency signal may specify the current grid frequency $f_{grid}$ of energy grid 1512. In some embodiments, the grid frequency signal also includes a scheduled or desired grid frequency $f_s$ to be achieved by performing frequency regulation. Frequency regulation controller 1916 may determine the frequency regulation setpoint $u_{FR}$ based on the difference between the current grid frequency $f_{grid}$ and the scheduled frequency $f_s$.

In some embodiments, the range within which the grid frequency $f_{grid}$ is allowed to fluctuate is determined by an electric utility. Any frequencies falling outside the permissible range may be corrected by performing frequency regulation. Facilities participating in frequency regulation may be required to supply or consume a contracted power for purposes of regulating grid frequency $f_{grid}$ (e.g., up to 10% of the rated capacity of PV field 1502 per frequency regulation event).

In some embodiments, frequency regulation controller 1916 performs frequency regulation using a dead-band control technique with a gain that is dependent upon the difference $f_e$ between the scheduled grid frequency $f_s$ and the actual grid frequency $f_{grid}$ (i.e., $f_e = f_s - f_{grid}$) and an amount of power required for regulating a given deviation amount of frequency error $f_e$. Such a control technique is expressed mathematically by the following equation:

$$u_{FR}(k) = \min(\max(lb_{FR}, \alpha), ub_{FR})$$

where $lb_{FR}$ and $ub_{FR}$ are the contracted amounts of power up to which power is to be consumed or supplied by a facility. $lb_{FR}$ and $ub_{FR}$ may be based on the rated capacity $P_{cap}$ of PV field 1502 as shown in the following equations:

$$lb_{FR} = -0.1 \times P_{cap}$$

$$ub_{FR} = 0.1 \times P_{cap}$$

The variable $\alpha$ represents the required amount of power to be supplied or consumed from energy grid 1512 to offset the frequency error $f_e$. In some embodiments, frequency regulation controller 1916 calculates $\alpha$ using the following equation:

$$\alpha = K_{FR} \times \text{sign}(f_e) \times \max(|f_e| - d_{band}, 0)$$

where $d_{band}$ is the threshold beyond which a deviation in grid frequency must be regulated and $K_{FR}$ is the control gain. In some embodiments, frequency regulation controller 1916 calculates the control gain $K_{FR}$ as follows:

$$K_{FR} = \frac{P_{cap}}{0.01 \times \text{droop} \times f_s}$$

where droop is a parameter specifying a percentage that defines how much power must be supplied or consumed to offset a 1 Hz deviation in the grid frequency. Frequency regulation controller 1916 may calculate the frequency regulation setpoint $u_{FR}$ using these equations and may provide the frequency regulation setpoint to battery power setpoint generator 1918.

Generating Battery Power Setpoints

Still referring to FIG. 19, controller 1514 is shown to include a battery power setpoint generator 1918. Battery power setpoint generator 1918 may be configured to generate the battery power setpoint $u_{bat}$ for battery power inverter 1508. The battery power setpoint $u_{bat}$ is used by battery power inverter 1508 to control an amount of power drawn from battery 1506 or stored in battery 1506. For example, battery power inverter 1508 may draw power from battery 1506 in response to receiving a positive battery power setpoint $u_{bat}$ from battery power setpoint generator 1918 and may store power in battery 1506 in response to receiving a negative battery power setpoint $u_{bat}$ from battery power setpoint generator 1918.

Battery power setpoint generator 1918 is shown receiving the ramp rate power setpoint $u_{RR}$ from ramp rate controller 1914 and the frequency regulation power setpoint $u_{FR}$ from frequency regulation controller 1916. In some embodiments, battery power setpoint generator 1918 calculates a value for the battery power setpoint $u_{bat}$ by adding the ramp rate power setpoint $u_{RR}$ and the frequency response power setpoint $u_{FR}$. For example, battery power setpoint generator 1918 may calculate the battery power setpoint $u_{bat}$ using the following equation:

$$u_{bat} = u_{RR} + u_{FR}$$

In some embodiments, battery power setpoint generator 1918 adjusts the battery power setpoint $u_{bat}$ based on a battery power limit for battery 1506. For example, battery power setpoint generator 1918 may compare the battery power setpoint $u_{bat}$ with the battery power limit battPowerLimit. If the battery power setpoint is greater than the battery power limit (i.e., $u_{bat} > \text{battPowerLimit}$), battery power setpoint generator 1918 may replace the battery power setpoint $u_{bat}$ with the battery power limit. Similarly, if the battery power setpoint is less than the negative of the battery power limit (i.e., $u_{bat} < -\text{battPowerLimit}$), battery power setpoint generator 1918 may replace the battery power setpoint $u_{bat}$ with the negative of the battery power limit.

In some embodiments, battery power setpoint generator 1918 causes frequency regulation controller 1916 to update the frequency regulation setpoint $u_{FR}$ in response to replacing the battery power setpoint $u_{bat}$ with the battery power limit battPowerLimit or the negative of the battery power limit $-\text{battPowerLimit}$. For example, if the battery power setpoint $u_{bat}$ is replaced with the positive battery power limit battPowerLimit, frequency regulation controller 1916 may update the frequency regulation setpoint $u_{FR}$ using the following equation:

$$u_{FR}(k) = \text{battPowerLimit} - \hat{u}_{RR_T}(k)$$

Similarly, if the battery power setpoint $u_{bat}$ is replaced with the negative battery power limit $-\text{battPowerLimit}$, frequency regulation controller 1916 may update the frequency regulation setpoint $u_{FR}$ using the following equation:

$$u_{FR}(k) = -\text{battPowerLimit} - \hat{u}_{RR_T}(k)$$

These updates ensure that the amount of power used for ramp rate control $\hat{u}_{RR_T}(k)$ and the amount of power used for frequency regulation $u_{FR}(k)$ can be added together to calculate the battery power setpoint $u_{bat}$. Battery power setpoint generator 1918 may provide the battery power setpoint $u_{bat}$ to battery power inverter 1508 and to PV power setpoint generator 1920.

Generating PV Power Setpoints

Still referring to FIG. 19, controller 1514 is shown to include a PV power setpoint generator 1920. PV power setpoint generator 1920 may be configured to generate the PV power setpoint $u_{PV}$ for PV field power inverter 1504. The PV power setpoint $u_{PV}$ is used by PV field power inverter 1504 to control an amount of power from PV field 1502 to provide to POI 1510.

In some embodiments, PV power setpoint generator 1920 sets a default PV power setpoint $u_{PV}(k)$ for instant k based on the previous value of the PV power $P_{PV}(k-1)$ at instant k−1. For example, PV power setpoint generator 1920 may increment the previous PV power $P_{PV}(k-1)$ with the compliance limit as shown in the following equation:

$$u_{PV}(k) = P_{PV}(k-1) + \frac{0.1P_{cap}}{60/T} - \lambda\sigma$$

This guarantees compliance with the ramp rate compliance limit and gradual ramping of the PV power output to energy grid 1512. The default PV power setpoint may be useful to guarantee ramp rate compliance when the system is turned on, for example, in the middle of a sunny day or when an up-ramp in the PV power output $P_{PV}$ is to be handled by limiting the PV power at PV power inverter 1504 instead of charging battery 1506.

In some embodiments, PV power setpoint generator 1920 updates the PV power setpoint $u_{PV}(k)$ based on the value of the battery power setpoint $u_{bat}(k)$ so that the total power provided to POI 1510 does not exceed a POI power limit. For example, PV power setpoint generator 1920 may use the PV power setpoint $up_{PV}(k)$ and the battery power setpoint $u_{bat}(k)$ to calculate the total power $P_{POI}(k)$ at point of intersection 1510 using the following equation:

$$P_{POI}(k) = u_{bat}(k) + u_{PV}(k)$$

PV power setpoint generator 1920 may compare the calculated power $P_{POI}(k)$ with a power limit for POI 1510 (i.e., POIPowerLimit). If the calculated power $P_{POI}(k)$ exceeds the POI power limit (i.e., $P_{POI}(k)$>POIPowerLimit), PV power setpoint generator 1920 may replace the calculated power $P_{POI}(k)$ with the POI power limit. PV power setpoint generator 1920 may update the PV power setpoint $u_{PV}(k)$ using the following equation:

$$u_{PV}(k) = \text{POIPowerLimit} - u_{bat}(k)$$

This ensures that the total power provided to POI 1510 does not exceed the POI power limit by causing PV field power inverter 1504 to limit the PV power. PV power setpoint generator 1920 may provide the PV power setpoint $u_{PV}$ to PV field power inverter 1504.

Electrical Energy Storage System with Frequency Response Optimization

Figure 20:
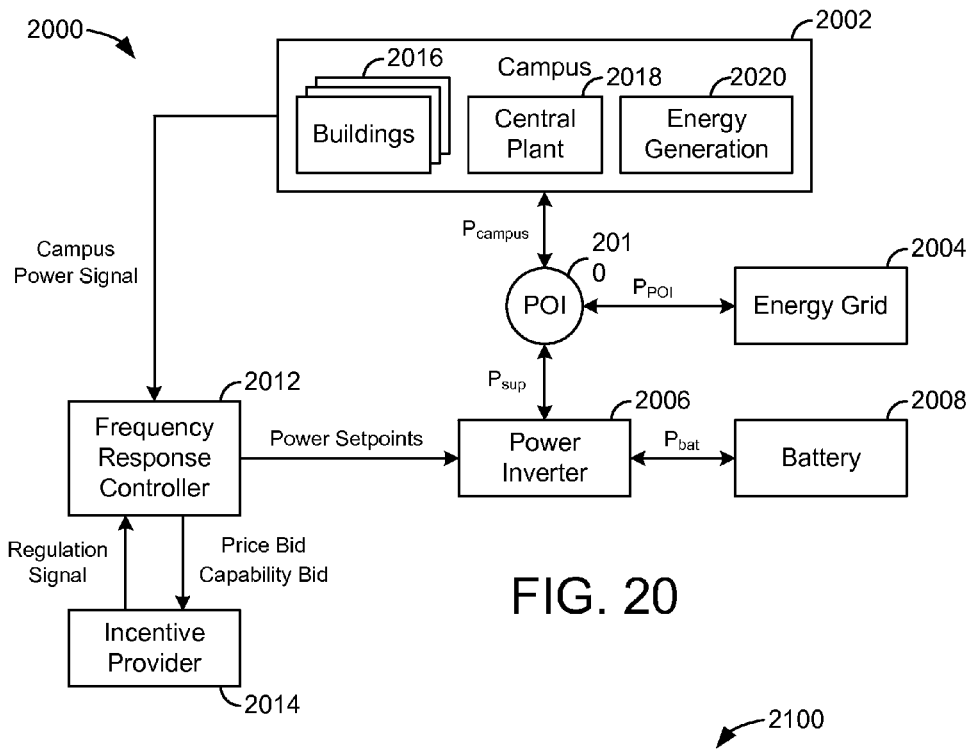
FIG. 20 is a block diagram of a frequency response optimization system, according to an exemplary embodiment.

Referring now to FIG. 20, a frequency response optimization system 2000 is shown, according to an exemplary embodiment. System 2000 is shown to include a campus 2002 and an energy grid 2004. Campus 2002 may include one or more buildings 2016 that receive power from energy grid 2004. Buildings 2016 may include equipment or devices that consume electricity during operation. For example, buildings 2016 may include HVAC equipment, lighting equipment, security equipment, communications equipment, vending machines, computers, electronics, elevators, or other types of building equipment. In some embodiments, buildings 2016 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 2016 is described in U.S. patent application Ser. No. 14/717,593.

In some embodiments, campus 2002 includes a central plant 2018. Central plant 2018 may include one or more subplants that consume resources from utilities (e.g., water, natural gas, electricity, etc.) to satisfy the loads of buildings 2016. For example, central plant 2018 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 2016. The subplants may be configured to convert input resources (e.g., electricity, water, natural gas, etc.) into output resources (e.g., cold water, hot water, chilled air, heated air, etc.) that are provided to buildings 2016. An exemplary central plant which may be used to satisfy the loads of buildings 2016 is described U.S. patent application Ser. No. 14/634,609, titled "High Level Central Plant Optimization" and filed Feb. 27, 2015, the entire disclosure of which is incorporated by reference herein.

In some embodiments, campus 2002 includes energy generation 2020. Energy generation 2020 may be configured to generate energy that can be used by buildings 2016, used by central plant 2018, and/or provided to energy grid 2004. In some embodiments, energy generation 2020 generates electricity. For example, energy generation 2020 may include an electric power plant, a photovoltaic energy field, or other types of systems or devices that generate electricity. The electricity generated by energy generation 2020 can be used internally by campus 2002 (e.g., by buildings 2016 and/or campus 2018) to decrease the amount of electric power that campus 2002 receives from outside sources such as energy grid 2004 or battery 2008. If the amount of electricity generated by energy generation 2020 exceeds the electric power demand of campus 2002, the excess electric power can be provided to energy grid 2004 or stored in battery 2008. The power output of campus 2002 is shown in FIG. 20 as $P_{campus}$. $P_{campus}$ may be positive if campus 2002 is outputting electric power or negative if campus 2002 is receiving electric power.

Still referring to FIG. 20, system 2000 is shown to include a power inverter 2006 and a battery 2008. Power inverter 2006 may be configured to convert electric power between direct current (DC) and alternating current (AC). For example, battery 2008 may be configured to store and output DC power, whereas energy grid 2004 and campus 2002 may be configured to consume and generate AC power. Power inverter 2006 may be used to convert DC power from battery 2008 into a sinusoidal AC output synchronized to the grid frequency of energy grid 2004. Power inverter 2006 may also be used to convert AC power from campus 2002 or energy grid 2004 into DC power that can be stored in battery 2008. The power output of battery 2008 is shown as $P_{bat}$. $P_{bat}$ may be positive if battery 2008 is providing power to power inverter 2006 or negative if battery 2008 is receiving power from power inverter 2006.

In some instances, power inverter 2006 receives a DC power output from battery 2008 and converts the DC power output to an AC power output that can be fed into energy grid 2004. Power inverter 2006 may synchronize the frequency of the AC power output with that of energy grid 2004 (e.g., 50 Hz or 60 Hz) using a local oscillator and may limit the voltage of the AC power output to no higher than the grid voltage. In some embodiments, power inverter 2006 is a resonant inverter that includes or uses LC circuits to remove the harmonics from a simple square wave in order to achieve a sine wave matching the frequency of energy grid 2004. In various embodiments, power inverter 2006 may operate using high-frequency transformers, low-frequency transformers, or without transformers. Low-frequency transformers may convert the DC output from battery 2008 directly to the AC output provided to energy grid 2004. High-frequency transformers may employ a multi-step process that involves converting the DC output to high-frequency AC, then back to DC, and then finally to the AC output provided to energy grid 2004.

System 2000 is shown to include a point of interconnection (POI) 2010. POI 2010 is the point at which campus 2002, energy grid 2004, and power inverter 2006 are electrically connected. The power supplied to POI 2010 from power inverter 2006 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 2006 and/or battery 2008). $P_{sup}$ may be positive is power inverter 2006 is providing power to POI 2010 or negative if power inverter 2006 is receiving power from POI 2010. $P_{campus}$ and $P_{sup}$ combine at POI 2010 to form $P_{POI}$. $P_{POI}$ may be defined as the power provided to energy grid 2004 from POI 2010. $P_{POI}$ may be positive if POI 2010 is providing power to energy grid 2004 or negative if POI 2010 is receiving power from energy grid 2004.

Still referring to FIG. 20, system 2000 is shown to include a frequency response controller 2012. Controller 2012 may be configured to generate and provide power setpoints to power inverter 2006. Power inverter 2006 may use the power setpoints to control the amount of power $P_{sup}$ provided to POI 2010 or drawn from POI 2010. For example, power inverter 2006 may be configured to draw power from POI 2010 and store the power in battery 2008 in response to receiving a negative power setpoint from controller 2012. Conversely, power inverter 2006 may be configured to draw power from battery 2008 and provide the power to POI 2010 in response to receiving a positive power setpoint from controller 2012. The magnitude of the power setpoint may define the amount of power $P_{sup}$ provided to or from power inverter 2006. Controller 2012 may be configured to generate and provide power setpoints that optimize the value of operating system 2000 over a time horizon.

In some embodiments, frequency response controller 2012 uses power inverter 2006 and battery 2008 to perform frequency regulation for energy grid 2004. Frequency regulation is the process of maintaining the stability of the grid frequency (e.g., 60 Hz in the United States). The grid frequency may remain stable and balanced as long as the total electric supply and demand of energy grid 2004 are balanced. Any deviation from that balance may result in a deviation of the grid frequency from its desirable value. For example, an increase in demand may cause the grid frequency to decrease, whereas an increase in supply may cause the grid frequency to increase. Frequency response controller 2012 may be configured to offset a fluctuation in the grid frequency by causing power inverter 2006 to supply energy from battery 2008 to energy grid 2004 (e.g., to offset a decrease in grid frequency) or store energy from energy grid 2004 in battery 2008 (e.g., to offset an increase in grid frequency).

In some embodiments, frequency response controller 2012 uses power inverter 2006 and battery 2008 to perform load shifting for campus 2002. For example, controller 2012 may cause power inverter 2006 to store energy in battery 2008 when energy prices are low and retrieve energy from battery 2008 when energy prices are high in order to reduce the cost of electricity required to power campus 2002. Load shifting may also allow system 2000 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 2000 to smooth momentary spikes in the electric demand of campus 2002 by drawing energy from battery 2008 in order to reduce peak power draw from energy grid 2004, thereby decreasing the demand charge incurred.

Still referring to FIG. 20, system 2000 is shown to include an incentive provider 2014. Incentive provider 2014 may be a utility (e.g., an electric utility), a regional transmission organization (RTO), an independent system operator (ISO), or any other entity that provides incentives for performing frequency regulation. For example, incentive provider 2014 may provide system 2000 with monetary incentives for participating in a frequency response program. In order to participate in the frequency response program, system 2000 may maintain a reserve capacity of stored energy (e.g., in battery 2008) that can be provided to energy grid 2004. System 2000 may also maintain the capacity to draw energy from energy grid 2004 and store the energy in battery 2008. Reserving both of these capacities may be accomplished by managing the state-of-charge of battery 2008.

Frequency response controller 2012 may provide incentive provider 2014 with a price bid and a capability bid. The price bid may include a price per unit power (e.g., $/MW) for reserving or storing power that allows system 2000 to participate in a frequency response program offered by incentive provider 2014. The price per unit power bid by frequency response controller 2012 is referred to herein as the "capability price." The price bid may also include a price for actual performance, referred to herein as the "performance price." The capability bid may define an amount of power (e.g., MW) that system 2000 will reserve or store in battery 2008 to perform frequency response, referred to herein as the "capability bid."

Incentive provider 2014 may provide frequency response controller 2012 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 2012. In other embodiments, $CP_{cap}$, $CP_{perf}$, and $Reg_{award}$ may not be the same as the bids placed by controller 2012. For example, $CP_{cap}$, $CP_{perf}$, and $Reg_{award}$ may be generated by incentive provider 2014 based on bids received from multiple participants in the frequency response program. Controller 2012 may use $CP_{cap}$, $CP_{perf}$, and $Reg_{award}$ to perform frequency regulation.

Frequency response controller 2012 is shown receiving a regulation signal from incentive provider 2014. The regulation signal may specify a portion of the regulation award $Reg_{award}$ that frequency response controller 2012 is to add or remove from energy grid 2004. In some embodiments, the regulation signal is a normalized signal (e.g., between −1 and 1) specifying a proportion of $Reg_{award}$. Positive values of the regulation signal may indicate an amount of power to add to energy grid 2004, whereas negative values of the regulation signal may indicate an amount of power to remove from energy grid 2004.

Frequency response controller 2012 may respond to the regulation signal by generating an optimal power setpoint for power inverter 2006. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 2012 uses a battery life model to quantify and monetize battery degradation as a function of the power setpoints provided to power inverter 2006. Advantageously, the battery life model allows controller 2012 to perform an optimization that weighs the revenue generation potential of participating in the frequency response program against the cost of battery degradation and other costs of participation (e.g., less battery power available for campus 2002, increased electricity costs, etc.). An exemplary regulation signal and power response are described in greater detail with reference to FIG. 21.

Figure 21:
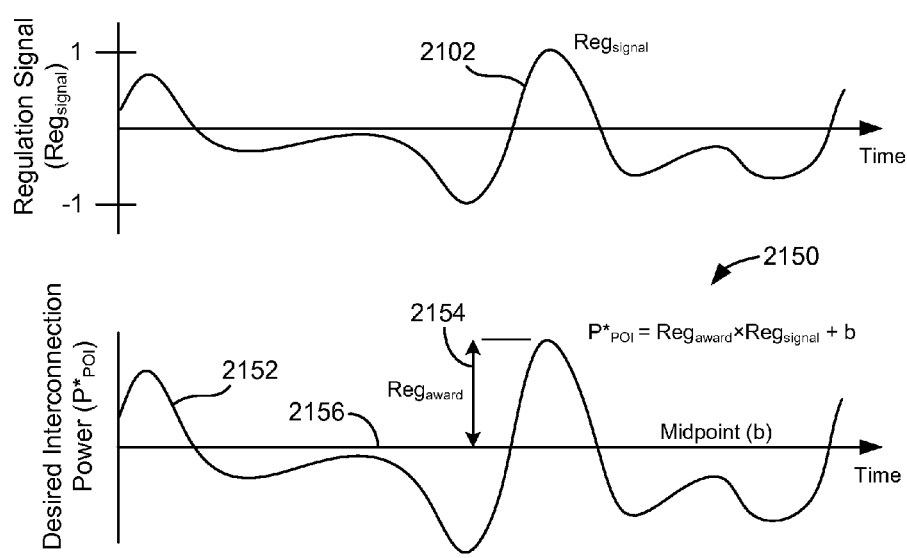
FIG. 21 is a graph of a regulation signal which may be provided to the frequency response optimization system of FIG. 20 and a frequency response signal which may be generated by frequency response optimization system of FIG. 20, according to an exemplary embodiment.

Referring now to FIG. 21, a pair of frequency response graphs 2100 and 2150 are shown, according to an exemplary embodiment. Graph 2100 illustrates a regulation signal $Reg_{signal}$ 2102 as a function of time. $Reg_{signal}$ 2102 is shown as a normalized signal ranging from −1 to 1 (i.e., $-1 \leq Reg_{signal} \leq 1$). $Reg_{signal}$ 2102 may be generated by incentive provider 2014 and provided to frequency response controller 2012. $Reg_{signal}$ 2102 may define a proportion of the regulation award $Reg_{award}$ 2154 that controller 2012 is to add or remove from energy grid 2004, relative to a baseline value referred to as the midpoint b 2156. For example, if the value of $Reg_{award}$ 2154 is 10 MW, a regulation signal value of 0.5 (i.e., $Reg_{signal}=0.5$) may indicate that system 2000 is requested to add 5 MW of power at POI 2010 relative to midpoint b (e.g., $P_{POI}^*=10$ MW×0.5+b), whereas a regulation signal value of −0.3 may indicate that system 2000 is requested to remove 3 MW of power from POI 2010 relative to midpoint b (e.g., $P_{POI}^*=10$ MW×−0.3+b).

Graph 2150 illustrates the desired interconnection power $P_{POI}^*$ 2152 as a function of time. $P_{POI}^*$ 2152 may be calculated by frequency response controller 2012 based on $Reg_{signal}$ 2102, $Reg_{award}$ 2154, and a midpoint b 2156. For example, controller 2012 may calculate $P_{POI}^*$ 2152 using the following equation:

$$P_{POI}^* = Reg_{award} \times Reg_{signal} + b$$

where $P_{POI}^*$ represents the desired power at POI 2010 (e.g., $P_{POI}^*=P_{sup}+P_{campus}$) and b is the midpoint. Midpoint b may be defined (e.g., set or optimized) by controller 2012 and may represent the midpoint of regulation around which the load is modified in response to $Reg_{signal}$ 2102. Optimal adjustment of midpoint b may allow controller 2012 to actively participate in the frequency response market while also taking into account the energy and demand charge that will be incurred.

In order to participate in the frequency response market, controller 2012 may perform several tasks. Controller 2012 may generate a price bid (e.g., $/MW) that includes the capability price and the performance price. In some embodiments, controller 2012 sends the price bid to incentive provider 2014 at approximately 15:30 each day and the price bid remains in effect for the entirety of the next day. Prior to beginning a frequency response period, controller 2012 may generate the capability bid (e.g., MW) and send the capability bid to incentive provider 2014. In some embodiments, controller 2012 generates and sends the capability bid to incentive provider 2014 approximately 1.5 hours before a frequency response period begins. In an exemplary embodiment, each frequency response period has a duration of one hour; however, it is contemplated that frequency response periods may have any duration.

At the start of each frequency response period, controller 2012 may generate the midpoint b around which controller 2012 plans to perform frequency regulation. In some embodiments, controller 2012 generates a midpoint b that will maintain battery 2008 at a constant state-of-charge (SOC) (i.e. a midpoint that will result in battery 2008 having the same SOC at the beginning and end of the frequency response period). In other embodiments, controller 2012 generates midpoint b using an optimization procedure that allows the SOC of battery 2008 to have different values at the beginning and end of the frequency response period. For example, controller 2012 may use the SOC of battery 2008 as a constrained variable that depends on midpoint b in order to optimize a value function that takes into account frequency response revenue, energy costs, and the cost of battery degradation. Exemplary processes for calculating and/or optimizing midpoint b under both the constant SOC scenario and the variable SOC scenario are described in detail in U.S. Provisional Patent Application No. 62/239,233 filed Oct. 8, 2015, the entire disclosure of which is incorporated by reference herein.

During each frequency response period, controller 2012 may periodically generate a power setpoint for power inverter 2006. For example, controller 2012 may generate a power setpoint for each time step in the frequency response period. In some embodiments, controller 2012 generates the power setpoints using the equation:

$$P_{POI}^* = Reg_{award} \times Reg_{signal} + b$$

where $P_{POI}^* = P_{sup} + P_{campus}$. Positive values of $P_{POI}^*$ indicate energy flow from POI 2010 to energy grid 2004. Positive values of $P_{sup}$ and $P_{campus}$ indicate energy flow to POI 2010 from power inverter 2006 and campus 2002, respectively. In other embodiments, controller 2012 generates the power setpoints using the equation:

$$P_{POI}^* = Reg_{award} \times Res_{FR} + b$$

where $Res_{FR}$ is an optimal frequency response generated by optimizing a value function. Controller 2012 may subtract $P_{campus}$ from $P_{POI}^*$ to generate the power setpoint for power inverter 2006 (i.e., $P_{sup} = P_{POI}^* - P_{campus}$). The power setpoint for power inverter 2006 indicates the amount of power that power inverter 2006 is to add to POI 2010 (if the power setpoint is positive) or remove from POI 2010 (if the power setpoint is negative). Exemplary processes for calculating power inverter setpoints are described in detail in U.S. Provisional Patent Application No. 62/239,233.

Frequency Response Controller

Figure 22:
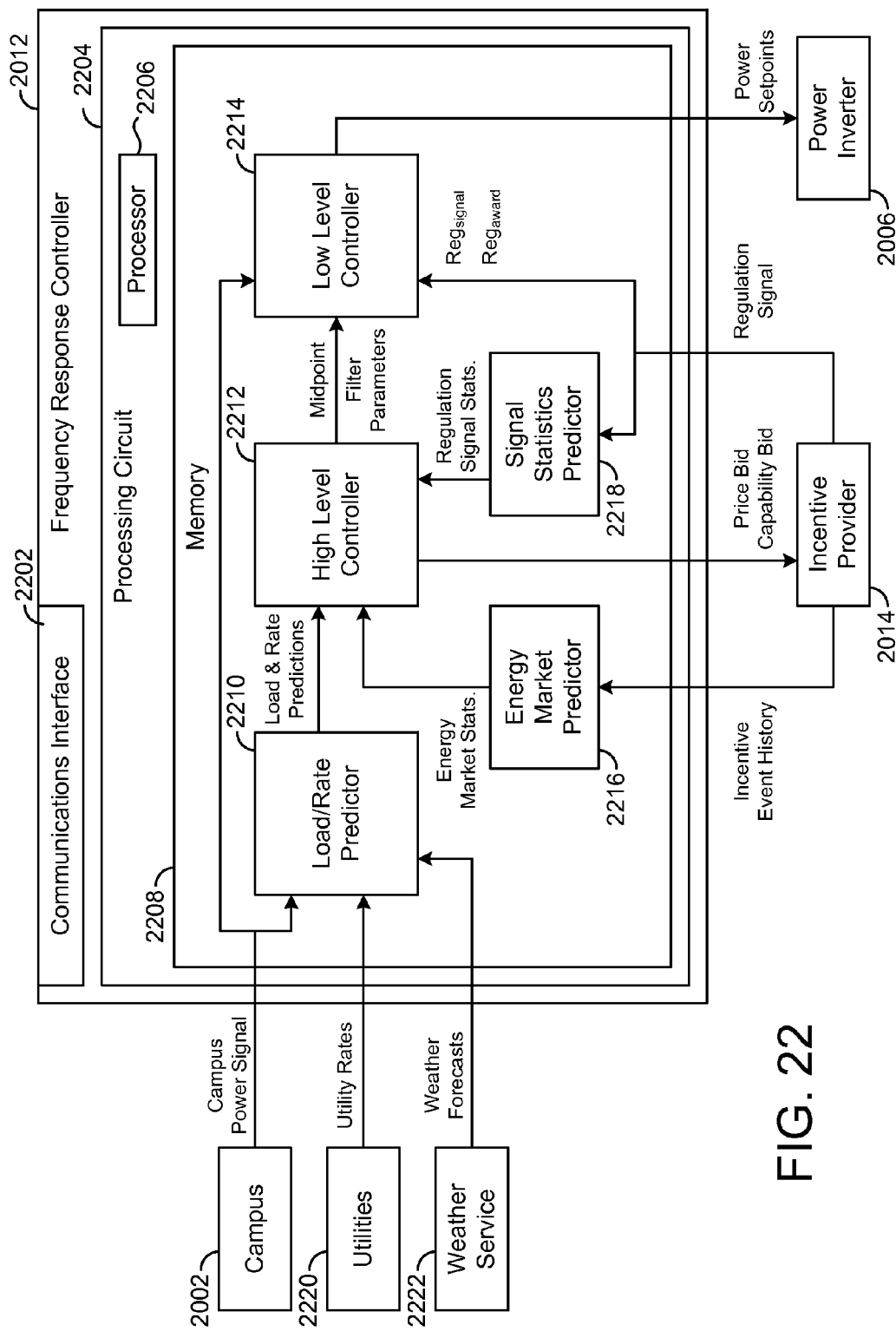
FIG. 22 is a block diagram of a frequency response controller which can be used to monitor and control the frequency response optimization system of FIG. 20, according to an exemplary embodiment.

Referring now to FIG. 22, a block diagram illustrating frequency response controller 2012 in greater detail is shown, according to an exemplary embodiment. Frequency response controller 2012 may be configured to perform an optimization process to generate values for the bid price, the capability bid, and the midpoint b. In some embodiments, frequency response controller 2012 generates values for the bids and the midpoint b periodically using a predictive optimization scheme (e.g., once every half hour, once per frequency response period, etc.). Controller 2012 may also calculate and update power setpoints for power inverter 2006 periodically during each frequency response period (e.g., once every two seconds).

In some embodiments, the interval at which controller 2012 generates power setpoints for power inverter 2006 is significantly shorter than the interval at which controller 2012 generates the bids and the midpoint b. For example, controller 2012 may generate values for the bids and the midpoint b every half hour, whereas controller 2012 may generate a power setpoint for power inverter 2006 every two seconds. The difference in these time scales allows controller 2012 to use a cascaded optimization process to generate optimal bids, midpoints b, and power setpoints.

In the cascaded optimization process, a high level controller 2212 determines optimal values for the bid price, the capability bid, and the midpoint b by performing a high level optimization. High level controller 2212 may select midpoint b to maintain a constant state-of-charge in battery 2008 (i.e., the same state-of-charge at the beginning and end of each frequency response period) or to vary the state-of-charge in order to optimize the overall value of operating system 2000 (e.g., frequency response revenue minus energy costs and battery degradation costs). High level controller 2212 may also determine filter parameters for a signal filter (e.g., a low pass filter) used by a low level controller 2214.

Low level controller 2214 uses the midpoint b and the filter parameters from high level controller 2212 to perform a low level optimization in order to generate the power setpoints for power inverter 2006. Advantageously, low level controller 2214 may determine how closely to track the desired power $P_{POI}^*$ at the point of interconnection 2010. For example, the low level optimization performed by low level controller 2214 may consider not only frequency response revenue but also the costs of the power setpoints in terms of energy costs and battery degradation. In some instances, low level controller 2214 may determine that it is deleterious to battery 2008 to follow the regulation exactly and may sacrifice a portion of the frequency response revenue in order to preserve the life of battery 2008. The cascaded optimization process is described in greater detail below.

Still referring to FIG. 22, frequency response controller 2012 is shown to include a communications interface 2202 and a processing circuit 2204. Communications interface 2202 may include wired or wireless interfaces (e.g., jacks, antennas, transmitters, receivers, transceivers, wire terminals, etc.) for conducting data communications with various systems, devices, or networks. For example, communications interface 2202 may include an Ethernet card and port for sending and receiving data via an Ethernet-based communications network and/or a WiFi transceiver for communicating via a wireless communications network. Communications interface 2202 may be configured to communicate via local area networks or wide area networks (e.g., the Internet, a building WAN, etc.) and may use a variety of communications protocols (e.g., BACnet, IP, LON, etc.).

Communications interface 2202 may be a network interface configured to facilitate electronic data communications between frequency response controller 2012 and various external systems or devices (e.g., campus 2002, energy grid 2004, power inverter 2006, incentive provider 2014, utilities 2220, weather service 2222, etc.). For example, frequency response controller 2012 may receive inputs from incentive provider 2014 indicating an incentive event history (e.g., past clearing prices, mileage ratios, participation requirements, etc.) and a regulation signal. Controller 2012 may receive a campus power signal from campus 2002, utility rates from utilities 2220, and weather forecasts from weather service 2222 via communications interface 2202. Controller 2012 may provide a price bid and a capability bid to incentive provider 2014 and may provide power setpoints to power inverter 2006 via communications interface 2202.

Still referring to FIG. 22, processing circuit 2204 is shown to include a processor 2206 and memory 2208. Processor 2206 may be a general purpose or specific purpose processor, an application specific integrated circuit (ASIC), one or more field programmable gate arrays (FPGAs), a group of processing components, or other suitable processing components. Processor 2206 may be configured to execute computer code or instructions stored in memory 2208 or received from other computer readable media (e.g., CDROM, network storage, a remote server, etc.).

Memory 2208 may include one or more devices (e.g., memory units, memory devices, storage devices, etc.) for storing data and/or computer code for completing and/or facilitating the various processes described in the present disclosure. Memory 2208 may include random access memory (RAM), read-only memory (ROM), hard drive storage, temporary storage, non-volatile memory, flash memory, optical memory, or any other suitable memory for storing software objects and/or computer instructions. Memory 2208 may include database components, object code components, script components, or any other type of information structure for supporting the various activities and information structures described in the present disclosure. Memory 2208 may be communicably connected to processor 2206 via processing circuit 2204 and may include computer code for executing (e.g., by processor 2206) one or more processes described herein.

Still referring to FIG. 22, frequency response controller 2012 is shown to include a load/rate predictor 2210. Load/rate predictor 2210 may be configured to predict the electric load of campus 2002 (i.e., $\hat{P}_{campus}$) for each time step k (e.g., k=1 . . . n) within an optimization window. Load/rate predictor 2210 is shown receiving weather forecasts from a weather service 2222. In some embodiments, load/rate predictor 2210 predicts $\hat{P}_{campus}$ as a function of the weather forecasts. In some embodiments, load/rate predictor 2210 uses feedback from campus 2002 to predict $\hat{P}_{campus}$. Feedback from campus 2002 may include various types of sensory inputs (e.g., temperature, flow, humidity, enthalpy, etc.) or other data relating to buildings 2016, central plant 2018, and/or energy generation 2020 (e.g., inputs from a HVAC system, a lighting control system, a security system, a water system, a PV energy system, etc.). Load/rate predictor 2210 may predict one or more different types of loads for campus 2002. For example, load/rate predictor 2210 may predict a hot water load, a cold water load, and/or an electric load for each time step k within the optimization window.

In some embodiments, load/rate predictor 2210 receives a measured electric load and/or previous measured load data from campus 2002. For example, load/rate predictor 2210 is shown receiving a campus power signal from campus 2002. The campus power signal may indicate the measured electric load of campus 2002. Load/rate predictor 2210 may predict one or more statistics of the campus power signal including, for example, a mean campus power $\mu_{campus}$ and a standard deviation of the campus power $\sigma_{campus}$. Load/rate predictor 2210 may predict $\hat{P}_{campus}$ as a function of a given weather forecast ($\hat{\phi}_w$), a day type (clay), the time of day (t), and previous measured load data ($Y_{k-1}$). Such a relationship is expressed in the following equation:

$$\hat{P}_{campus} = f(\hat{\phi}_w, \text{day}, t | Y_{k-1})$$

In some embodiments, load/rate predictor 2210 uses a deterministic plus stochastic model trained from historical load data to predict $\hat{P}_{campus}$. Load/rate predictor 2210 may use any of a variety of prediction methods to predict $\hat{P}_{campus}$ (e.g., linear regression for the deterministic portion and an AR model for the stochastic portion). In some embodiments, load/rate predictor 2210 makes load/rate predictions using the techniques described in U.S. patent application Ser. No. 14/717,593.

Load/rate predictor 2210 is shown receiving utility rates from utilities 2220. Utility rates may indicate a cost or price per unit of a resource (e.g., electricity, natural gas, water, etc.) provided by utilities 2220 at each time step k in the optimization window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 2220 or predicted utility rates estimated by load/rate predictor 2210.

In some embodiments, the utility rates include demand charges for one or more resources provided by utilities 2220. A demand charge may define a separate cost imposed by utilities 2220 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, frequency response controller 2012 may be configured to account for demand charges in the high level optimization process performed by high level controller 2212. Utilities 2220 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 2210 may store the predicted campus power $\hat{P}_{campus}$ and the utility rates in memory 2208 and/or provide the predicted campus power $\hat{P}_{campus}$ and the utility rates to high level controller 2212.

Still referring to FIG. 22, frequency response controller 2012 is shown to include an energy market predictor 2216 and a signal statistics predictor 2218. Energy market predictor 2216 may be configured to predict energy market statistics relating to the frequency response program. For example, energy market predictor 2216 may predict the values of one or more variables that can be used to estimate frequency response revenue. In some embodiments, the frequency response revenue is defined by the following equation:

$$Rev=PS(CP_{cap}+MR \cdot CP_{perf})Reg_{award}$$

where Rev is the frequency response revenue, $CP_{cap}$ is the capability clearing price, MR is the mileage ratio, and $CP_{perf}$ is the performance clearing price. PS is a performance score based on how closely the frequency response provided by controller 2012 tracks the regulation signal. Energy market predictor 2216 may be configured to predict the capability clearing price $CP_{cap}$, the performance clearing price $CP_{perf}$, the mileage ratio MR, and/or other energy market statistics that can be used to estimate frequency response revenue. Energy market predictor 2216 may store the energy market statistics in memory 2208 and/or provide the energy market statistics to high level controller 2212.

Signal statistics predictor 2218 may be configured to predict one or more statistics of the regulation signal provided by incentive provider 2014. For example, signal statistics predictor 2218 may be configured to predict the mean $\mu_{FR}$, standard deviation $\sigma_{FR}$, and/or other statistics of the regulation signal. The regulation signal statistics may be based on previous values of the regulation signal (e.g., a historical mean, a historical standard deviation, etc.) or predicted values of the regulation signal (e.g., a predicted mean, a predicted standard deviation, etc.).

In some embodiments, signal statistics predictor 2218 uses a deterministic plus stochastic model trained from historical regulation signal data to predict future values of the regulation signal. For example, signal statistics predictor 2218 may use linear regression to predict a deterministic portion of the regulation signal and an AR model to predict a stochastic portion of the regulation signal. In some embodiments, signal statistics predictor 2218 predicts the regulation signal using the techniques described in U.S. patent application Ser. No. 14/717,593. Signal statistics predictor 2218 may use the predicted values of the regulation signal to calculate the regulation signal statistics. Signal statistics predictor 2218 may store the regulation signal statistics in memory 2208 and/or provide the regulation signal statistics to high level controller 2212.

Still referring to FIG. 22, frequency response controller 2012 is shown to include a high level controller 2212. High level controller 2212 may be configured to generate values for the midpoint b and the capability bid $Reg_{award}$. In some embodiments, high level controller 2212 determines a midpoint b that will cause battery 2008 to have the same state-of-charge (SOC) at the beginning and end of each frequency response period. In other embodiments, high level controller 2212 performs an optimization process to generate midpoint b and $Reg_{award}$. For example, high level controller 2212 may generate midpoint b using an optimization procedure that allows the SOC of battery 2008 to vary and/or have different values at the beginning and end of the frequency response period. High level controller 2212 may use the SOC of battery 2008 as a constrained variable that depends on midpoint b in order to optimize a value function that takes into account frequency response revenue, energy costs, and the cost of battery degradation. Both of these embodiments are described in greater detail with reference to FIG. 23.

High level controller 2212 may determine midpoint b by equating the desired power $P_{POI}^*$ at POI 2010 with the actual power at POI 2010 as shown in the following equation:

$$(Reg_{signal})(Reg_{award})+b=P_{bat}+P_{loss}+P_{campus}$$

where the left side of the equation $(Rea_{signal})(Reg_{award})+b$ is the desired power $P_{POI}^*$ at POI 2010 and the right side of the equation is the actual power at POI 2010. Integrating over the frequency response period results in the following equation:

$$\int_{period} ((Reg_{signal})(Reg_{award}) + b)dt = \int_{period} (P_{bat} + P_{loss} + P_{campus})dt$$

For embodiments in which the SOC of battery 2008 is maintained at the same value at the beginning and end of the frequency response period, the integral of the battery power $P_{bat}$ over the frequency response period is zero (i.e., $\int P_{bat} dt=0$). Accordingly, the previous equation can be rewritten as follows:

$$b = \int_{period} P_{loss} dt + \int_{period} P_{campus} dt - Reg_{award} \int_{period} Reg_{signal} dt$$

where the term $\int P_{bat} dt$ has been omitted because $\int P_{bat} dt=0$. This is ideal behavior if the only goal is to maximize frequency response revenue. Keeping the SOC of battery 2008 at a constant value (and near 50%) will allow system 2000 to participate in the frequency market during all hours of the day.

High level controller 2212 may use the estimated values of the campus power signal received from campus 2002 to predict the value of $\int P_{campus} dt$ over the frequency response period. Similarly, high level controller 2212 may use the estimated values of the regulation signal from incentive provider 2014 to predict the value of $\int Reg_{signal} dt$ over the frequency response period. High level controller 2212 may estimate the value of $\int P_{loss} dt$ using a Thevinin equivalent circuit model of battery 2008 (described in greater detail with reference to FIG. 23). This allows high level controller 2212 to estimate the integral $\int P_{loss} dt$ as a function of other variables such as $Reg_{award}$, $Reg_{signal}$, $P_{campus}$, and midpoint b.

After substituting known and estimated values, the preceding equation can be rewritten as follows:

$$\frac{1}{4P_{max}}[E\{P_{campus}^2\} +$$
$$Reg_{award}^2 E\{Reg_{signal}^2\} - 2Reg_{award} E\{Reg_{signal}\} E\{P_{campus}\}]$$
$$\Delta t + [Reg_{award} E\{Reg_{signal}\} - E\{P_{campus}\}]\Delta t +$$
$$\frac{b}{2P_{max}}[Reg_{award} E\{Reg_{signal}\} - E\{P_{campus}\}]\Delta t + b\Delta t + \frac{b^2}{4P_{max}}\Delta t = 0$$

where the notation E{ } indicates that the variable within the brackets { } is ergodic and can be approximated by the estimated mean of the variable. For example, the term $E\{Reg_{signal}\}$ can be approximated by the estimated mean of the regulation signal $\mu_{FR}$ and the term $E\{P_{campus}\}$ can be approximated by the estimated mean of the campus power signal $\mu_{campus}$. High level controller 2212 may solve the equation for midpoint b to determine the midpoint b that maintains battery 2008 at a constant state-of-charge.

For embodiments in which the SOC of battery 2008 is treated as a variable, the SOC of battery 2008 may be allowed to have different values at the beginning and end of the frequency response period. Accordingly, the integral of the battery power $P_{bat}$ over the frequency response period can be expressed as $-\Delta SOC \cdot C_{des}$ as shown in the following equation:

$$\int_{period} P_{bat} dt = -\Delta SOC \cdot C_{des}$$

where $\Delta SOC$ is the change in the SOC of battery 2008 over the frequency response period and $C_{des}$ is the design capacity of battery 2008. The SOC of battery 2008 may be a normalized variable (i.e., $0 \leq SOC \leq 1$) such that the term $SOC \cdot C_{des}$ represents the amount of energy stored in battery 2008 for a given state-of-charge. The SOC is shown as a negative value because drawing energy from battery 2008 (i.e., a positive $P_{bat}$) decreases the SOC of battery 2008. The equation for midpoint b becomes:

$$b = \int_{period} P_{loss} dt + \int_{period} P_{campus} dt +$$
$$\int_{period} P_{bat} dt - Reg_{award} \int_{period} Reg_{signal} dt$$

After substituting known and estimated values, the preceding equation can be rewritten as follows:

$$\frac{1}{4P_{max}}[E\{P_{campus}^2\} + Reg_{award}^2 +$$
$$E\{Reg_{signal}^2\} - 2Reg_{award} E\{Reg_{signal}\} E\{P_{campus}\}]\Delta t +$$
$$[Reg_{award} E\{Reg_{signal}\} + E\{P_{campus}\}]\Delta t + \Delta SOC \cdot C_{des} +$$
$$\frac{b}{2P_{max}}[Reg_{award} E\{Reg_{signal}\} - E\{P_{campus}\}]\Delta t + b\Delta t + \frac{b^2}{4P_{max}}\Delta t = 0$$

High level controller 2212 may solve the equation for midpoint b in terms of $\Delta SOC$.

High level controller 2212 may perform an optimization to find optimal midpoints b for each frequency response period within an optimization window (e.g., each hour for the next day) given the electrical costs over the optimization window. Optimal midpoints b may be the midpoints that maximize an objective function that includes both frequency response revenue and costs of electricity and battery degradation. For example, an objective function J can be written as:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where $Rev(Reg_{award,k})$ is the frequency response revenue at time step k, $c_k b_k$ is the cost of electricity purchased at time step k, the min( ) term is the demand charge based on the maximum rate of electricity consumption during the applicable demand charge period, and $\lambda_{bat,k}$ is the monetized cost battery degradation at time step k. The electricity cost is expressed as a positive value because drawing power from energy grid 2004 is represented as a negative power and therefore will result in negative value (i.e., a cost) in the objective function. The demand charge is expressed as a minimum for the same reason (i.e., the most negative power value represents maximum power draw from energy grid 2004).

High level controller 2212 may estimate the frequency response revenue $Rev(Reg_{award,k})$ as a function of the midpoints b. In some embodiments, high level controller 2212 estimates frequency response revenue using the following equation:

$$Rev(Reg_{award}) = Reg_{award}(CP_{cap} + MR \cdot CP_{perf})$$

where $CP_{cap}$, MR, and $CP_{perf}$ are the energy market statistics received from energy market predictor 2216 and $Reg_{award}$ is a function of the midpoint b. For example, high level controller 2212 may place a bid that is as large as possible for a given midpoint, as shown in the following equation:

$$Reg_{award} = P_{limit} - |b|$$

where $P_{limit}$ is the power rating of power inverter 2006. Advantageously, selecting $\text{Reg}_{award}$ as a function of midpoint b allows high level controller 2212 to predict the frequency response revenue that will result from a given midpoint b.

High level controller 2212 may estimate the cost of battery degradation $\lambda_{bat}$ as a function of the midpoints b. For example, high level controller 2212 may use a battery life model to predict a loss in battery capacity that will result from a set of midpoints b, power outputs, and/or other variables that can be manipulated by controller 2012. In some embodiments, the battery life model expresses the loss in battery capacity $C_{loss,add}$ as a sum of multiple piecewise linear functions, as shown in the following equation:

$$C_{loss,add} = f_1(T_{cell}) + f_2(SOC) + f_3(DOD) + f_4(PR) + f_5(ER) - C_{loss,nom}$$

where $T_{cell}$ is the cell temperature, SOC is the state-of-charge, DOD is the depth of discharge, PR is the average power ratio $$\left(\text{e.g.,}\quad PR = avg\left(\frac{P}{P_{des}}\right)\right),$$

and ER is the average effort ratio $$\left(\text{e.g.,}\quad ER = avg\left(\frac{\Delta P}{P_{des}}\right)\right)$$

of battery 2008. Each of these terms is described in greater detail with reference to FIG. 23. Advantageously, several of the terms in the battery life model depend on the midpoints b and power setpoints selected by controller 2012. This allows high level controller 2212 to predict a loss in battery capacity that will result from a given set of control outputs. High level controller 2212 may monetize the loss in battery capacity and include the monetized cost of battery degradation $\lambda_{bat}$ in the objective function J.

In some embodiments, high level controller 2212 generates a set of filter parameters for low level controller 2214. The filter parameters may be used by low level controller 2214 as part of a low-pass filter that removes high frequency components from the regulation signal. In some embodiments, high level controller 2212 generates a set of filter parameters that transform the regulation signal into an optimal frequency response signal $\text{Res}_{FR}$. For example, high level controller 2212 may perform a second optimization process to determine an optimal frequency response $\text{Res}_{FR}$ based on the optimized values for $\text{Reg}_{award}$ and midpoint b.

In some embodiments, high level controller 2212 determines the optimal frequency response $\text{Res}_{FR}$ by optimizing value function J with the frequency response revenue Rev($\text{Reg}_{award}$) defined as follows:

$$\text{Rev}(\text{Reg}_{award}) = PS \cdot \text{Reg}_{award}(CP_{cap} + MR \cdot CP_{perf})$$

and with the frequency response $\text{Res}_{FR}$ substituted for the regulation signal in the battery life model. The performance score PS may be based on several factors that indicate how well the optimal frequency response $\text{Res}_{FR}$ tracks the regulation signal. Closely tracking the regulation signal may result in higher performance scores, thereby increasing the frequency response revenue. However, closely tracking the regulation signal may also increase the cost of battery degradation $\lambda_{bat}$. The optimized frequency response $\text{Res}_{FR}$ represents an optimal tradeoff between decreased frequency response revenue and increased battery life. High level controller 2212 may use the optimized frequency response $\text{Res}_{FR}$ to generate a set of filter parameters for low level controller 2214. These and other features of high level controller 2212 are described in greater detail with reference to FIG. 23.

Still referring to FIG. 22, frequency response controller 2012 is shown to include a low level controller 2214. Low level controller 2214 is shown receiving the midpoints b and the filter parameters from high level controller 2212. Low level controller 2214 may also receive the campus power signal from campus 2002 and the regulation signal from incentive provider 2014. Low level controller 2214 may use the regulation signal to predict future values of the regulation signal and may filter the predicted regulation signal using the filter parameters provided by high level controller 2212.

Low level controller 2214 may use the filtered regulation signal to determine optimal power setpoints for power inverter 2006. For example, low level controller 2214 may use the filtered regulation signal to calculate the desired interconnection power $P_{POI}^*$ using the following equation:

$$P_{POI}^* = \text{Reg}_{award} \cdot \text{Reg}_{filter} + b$$

where $\text{Reg}_{filter}$ is the filtered regulation signal. Low level controller 2214 may subtract the campus power $P_{campus}$ from the desired interconnection power $P_{POI}^*$ to calculate the optimal power setpoints $P_{SP}$ for power inverter 2006, as shown in the following equation:

$$P_{SP} = P_{POI}^* - P_{campus}$$

In some embodiments, low level controller 2214 performs an optimization to determine how closely to track $P_{POI}^*$. For example, low level controller 2214 may determine an optimal frequency response $\text{Res}_{FR}$ by optimizing value function J with the frequency response revenue Rev($\text{Reg}_{award}$) defined as follows:

$$\text{Rev}(\text{Reg}_{award}) = PS \cdot \text{Reg}_{award}(CP_{cap} + MR \cdot CP_{perf})$$

and with the frequency response $\text{Res}_{FR}$ substituted for the regulation signal in the battery life model. Low level controller 2214 may use the optimal frequency response $\text{Res}_{FR}$ in place of the filtered frequency response $\text{Reg}_{filter}$ to calculate the desired interconnection power $P_{POI}^*$ and power setpoints $P_{SP}$ as previously described. These and other features of low level controller 2214 are described in greater detail with reference to FIG. 24.

High Level Controller

Figure 23:
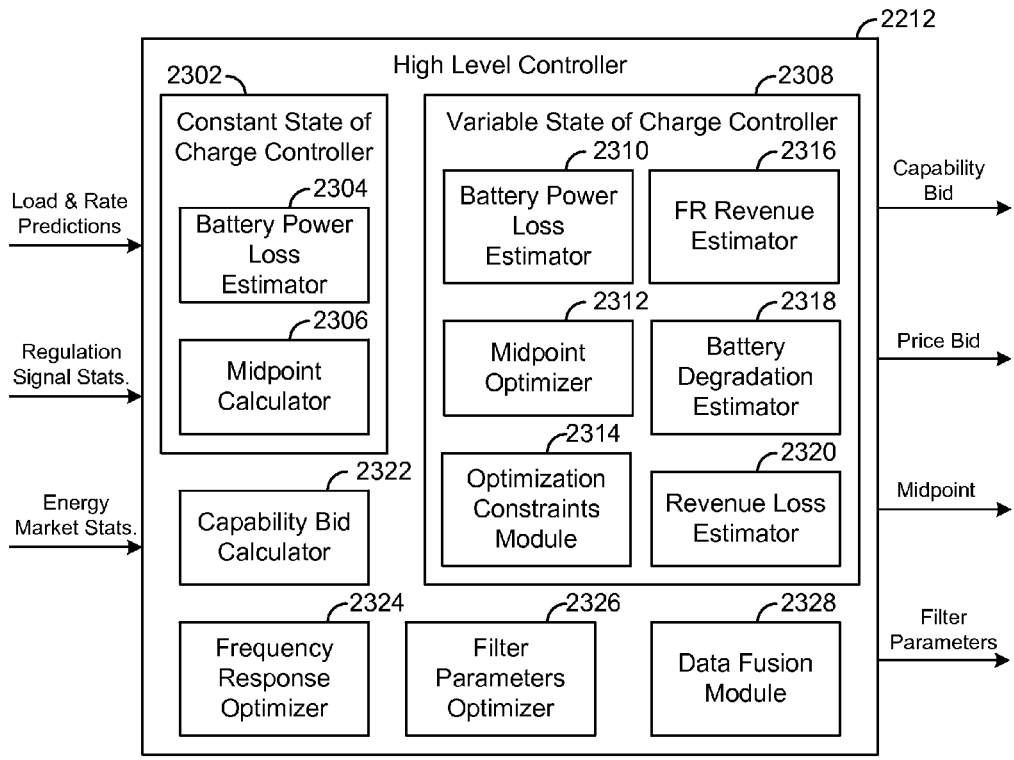
FIG. 23 is a block diagram of a high level controller which can be used in the frequency response optimization system of FIG. 20, according to an exemplary embodiment.

Referring now to FIG. 23, a block diagram illustrating high level controller 2212 in greater detail is shown, according to an exemplary embodiment. High level controller 2212 is shown to include a constant state-of-charge (SOC) controller 2302 and a variable SOC controller 2308. Constant SOC controller 2302 may be configured to generate a midpoint b that results in battery 2008 having the same SOC at the beginning and the end of each frequency response period. In other words, constant SOC controller 2308 may determine a midpoint b that maintains battery 2008 at a predetermined SOC at the beginning of each frequency response period. Variable SOC controller 2308 may generate midpoint b using an optimization procedure that allows the SOC of battery 2008 to have different values at the beginning and end of the frequency response period. In other words, variable SOC controller 2308 may determine a midpoint b that results in a net change in the SOC of battery 2008 over the duration of the frequency response period.

Constant State-of-Charge Controller

Constant SOC controller 2302 may determine midpoint b by equating the desired power $P_{POI}^*$ at POI 2010 with the actual power at POI 2010 as shown in the following equation:

$$(Reg_{signal})(Reg_{award})+b=P_{bat}+P_{loss}+P_{campus}$$

where the left side of the equation $(Reg_{signal})(Reg_{award})+b$ is the desired power $P_{POI}^*$ at POI 2010 and the right side of the equation is the actual power at POI 2010. Integrating over the frequency response period results in the following equation:

$$\int_{period}((Reg_{signal})(Reg_{award})+b)\,dt = \int_{period}(P_{bat}+P_{loss}+P_{campus})\,dt$$

Since the SOC of battery 2008 is maintained at the same value at the beginning and end of the frequency response period, the integral of the battery power $P_{bat}$ over the frequency response period is zero (i.e., $\int P_{bat}dt=0$). Accordingly, the previous equation can be rewritten as follows:

$$b = \int_{period} P_{loss}\,dt + \int_{period} P_{campus}\,dt - Reg_{award}\int_{period} Reg_{signal}\,dt$$

where the term $\int P_{bat}dt$ has been omitted because $\int P_{bat}dt=0$. This is ideal behavior if the only goal is to maximize frequency response revenue. Keeping the SOC of battery 2008 at a constant value (and near 50%) will allow system 2000 to participate in the frequency market during all hours of the day.

Constant SOC controller 2302 may use the estimated values of the campus power signal received from campus 2002 to predict the value of $\int P_{campus}dt$ over the frequency response period. Similarly, constant SOC controller 2302 may use the estimated values of the regulation signal from incentive provider 2014 to predict the value of $\int Reg_{signal}dt$ over the frequency response period. $Reg_{award}$ can be expressed as a function of midpoint b as previously described (e.g., $Reg_{award}=P_{limit}-|b|$). Therefore, the only remaining term in the equation for midpoint b is the expected battery power loss $\int P_{loss}$.

Constant SOC controller 2302 is shown to include a battery power loss estimator 2304. Battery power loss estimator 2304 may estimate the value of $\int P_{loss}dt$ using a Thevinin equivalent circuit model of battery 2008. For example, battery power loss estimator 2304 may model battery 2008 as a voltage source in series with a resistor. The voltage source has an open circuit voltage of $V_{OC}$ and the resistor has a resistance of $R_{TH}$. An electric current I flows from the voltage source through the resistor.

To find the battery power loss in terms of the supplied power $P_{sup}$, battery power loss estimator 2304 may identify the supplied power $P_{sup}$ as a function of the current I, the open circuit voltage $V_{OC}$, and the resistance $R_{TH}$ as shown in the following equation:

$$P_{sup}=V_{OC}I-I^2R_{TH}$$

which can be rewritten as:

$$\frac{I^2}{I_{SC}} - I + \frac{P'}{4} = 0$$

with the following substitutions:

$$I_{SC} = \frac{V_{OC}}{R_{TH}}, \quad P' = \frac{P}{P_{max}}, \quad P_{max} = \frac{V_{OC}^2}{4R_{TH}}$$

where P is the supplied power and $P_{max}$ is the maximum possible power transfer.

Battery power loss estimator 2304 may solve for the current I as follows:

$$I = \frac{I_{SC}}{2}\left(1 - \sqrt{1-P'}\right)$$

which can be converted into an expression for power loss $P_{loss}$ in terms of the supplied power P and the maximum possible power transfer $P_{max}$ as shown in the following equation:

$$P_{loss} = P_{max}(1-\sqrt{1-P'})^2$$

Battery power loss estimator 2304 may simplify the previous equation by approximating the expression $(1-\sqrt{1-P'})$ as a linear function about P'=0. This results in the following approximation for $P_{loss}$:

$$P_{loss} \approx P_{max}\left(\frac{P'}{2}\right)^2$$

which is a good approximation for powers up to one-fifth of the maximum power.

Battery power loss estimator 2304 may calculate the expected value of $\int P_{loss}dt$ over the frequency response period as follows:

$$\int_{period} P_{loss}\,dt = \int_{period} -P_{max}\left(\frac{Reg_{award}Reg_{signal}+b-P_{campus}}{2P_{max}}\right)^2 dt =$$

$$\frac{1}{4P_{max}}\left[2Reg_{award}\int_{period} P_{campus}Reg_{signal}\,dt - \int_{period} P_{campus}^2\,dt - Reg_{award}^2\int_{period} Reg_{signal}^2\,dt\right] +$$

$$\frac{b}{2P_{max}}\left[\int_{period} P_{campus}^2\,dt - Reg_{award}\int_{period} Reg_{signal}\,dt\right] - \frac{b^2}{4P_{max}}\Delta t =$$

$$\frac{1}{4P_{max}}[E\{P_{campus}^2\} + Reg_{award}^2 E\{Reg_{signal}^2\} -$$

$$2Reg_{award}E\{Reg_{signal}\}E\{P_{campus}\}]\Delta t -$$

$$\frac{b}{2P_{max}}[Reg_{award}E\{Reg_{signal}\} - E\{P_{campus}\}]\Delta t - \frac{b^2}{4P_{max}}\Delta t$$

where the notation E{ } indicates that the variable within the brackets { } is ergodic and can be approximated by the estimated mean of the variable. This formulation allows battery power loss estimator 2304 to estimate $\int P_{loss}dt$ as a function of other variables such as $Reg_{award}$, $Reg_{signal}$, $P_{campus}$, midpoint b, and $P_{max}$.

Constant SOC controller 2302 is shown to include a midpoint calculator 2306. Midpoint calculator 2306 may be configured to calculate midpoint b by substituting the previous expression for $\int P_{loss}dt$ into the equation for midpoint b. After substituting known and estimated values, the equation for midpoint b can be rewritten as follows:

$$\frac{1}{4P_{max}}[E\{P_{campus}^2\} + Reg_{award}^2 E\{Reg_{signal}^2\} -$$
$$2Reg_{award}E\{Reg_{signal}\}E\{P_{campus}\}]\Delta t +$$
$$[Reg_{award}E\{Reg_{signal}\} - E\{P_{campus}\}]\Delta t +$$
$$\frac{b}{2P_{max}}[Reg_{award}E\{Reg_{signal}\} - E\{P_{campus}\}]\Delta t + b\Delta t + \frac{b^2}{4P_{max}}\Delta t = 0$$

Midpoint calculator 2306 may solve the equation for midpoint b to determine the midpoint b that maintains battery 2008 at a constant state-of-charge.

Variable State-of-Charge Controller

Variable SOC controller 2308 may determine optimal midpoints b by allowing the SOC of battery 2008 to have different values at the beginning and end of a frequency response period. For embodiments in which the SOC of battery 2008 is allowed to vary, the integral of the battery power $P_{bat}$ over the frequency response period can be expressed as $-\Delta SOC \cdot C_{des}$ as shown in the following equation:

$$\int_{period} P_{bat} dt = -\Delta SOC \cdot C_{des}$$

where $\Delta SOC$ is the change in the SOC of battery 2008 over the frequency response period and $C_{des}$ is the design capacity of battery 2008. The SOC of battery 2008 may be a normalized variable (i.e., 0≤SOC≤1) such that the term $SOC \cdot C_{des}$ represents the amount of energy stored in battery 2008 for a given state-of-charge. The SOC is shown as a negative value because drawing energy from battery 2008 (i.e., a positive $P_{bat}$) decreases the SOC of battery 2008. The equation for midpoint b becomes:

$$b = \int_{period} P_{loss} dt + \int_{period} P_{campus} dt +$$
$$\int_{period} P_{bat} dt - Reg_{award}\int_{period} Reg_{signal} dt$$

Variable SOC controller 2308 is shown to include a battery power loss estimator 2310 and a midpoint optimizer 2312. Battery power loss estimator 2310 may be the same or similar to battery power loss estimator 2304. Midpoint optimizer 2312 may be configured to establish a relationship between the midpoint b and the SOC of battery 2008. For example, after substituting known and estimated values, the equation for midpoint b can be written as follows:

$$\frac{1}{4P_{max}}[E\{P_{campus}^2\} + Reg_{award}^2 +$$
$$E\{Reg_{signal}^2\} - 2Reg_{award}E\{Reg_{signal}\}E\{P_{campus}\}]\Delta t +$$
$$[Reg_{award}E\{Reg_{signal}\} + E\{P_{campus}\}]\Delta t + \Delta SOC \cdot C_{des} +$$
$$\frac{b}{2P_{max}}[Reg_{award}E\{Reg_{signal}\} - E\{P_{campus}\}]\Delta t + b\Delta t + \frac{b^2}{4P_{max}}\Delta t = 0$$

Advantageously, the previous equation defines a relationship between midpoint b and the change in SOC of battery 2008. Midpoint optimizer 2312 may use this equation to determine the impact that different values of midpoint b have on the SOC in order to determine optimal midpoints b. This equation can also be used by midpoint optimizer 2312 during optimization to translate constraints on the SOC in terms of midpoint b. For example, the SOC of battery 2008 may be constrained between zero and 1 (e.g., 0≤SOC≤1) since battery 2008 cannot be charged in excess of its maximum capacity or depleted below zero. Midpoint optimizer 2312 may use the relationship between $\Delta SOC$ and midpoint b to constrain the optimization of midpoint b to midpoint values that satisfy the capacity constraint.

Midpoint optimizer 2312 may perform an optimization to find optimal midpoints b for each frequency response period within the optimization window (e.g., each hour for the next day) given the electrical costs over the optimization window. Optimal midpoints b may be the midpoints that maximize an objective function that includes both frequency response revenue and costs of electricity and battery degradation. For example, an objective function J can be written as:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where $Rev(Reg_{award,k})$ is the frequency response revenue at time step k, $c_k b_k$ is the cost of electricity purchased at time step k, the min( ) term is the demand charge based on the maximum rate of electricity consumption during the applicable demand charge period, and $\lambda_{bat,k}$ is the monetized cost battery degradation at time step k. Midpoint optimizer 2312 may use input from frequency response revenue estimator 2316 (e.g., a revenue model) to determine a relationship between midpoint b and $Rev(Reg_{award,k})$. Similarly, midpoint optimizer 2312 may use input from battery degradation estimator 2318 and/or revenue loss estimator 2320 to determine a relationship between midpoint b and the monetized cost of battery degradation $\lambda_{bat,k}$.

Still referring to FIG. 23, variable SOC controller 2308 is shown to include an optimization constraints module 2314. Optimization constraints module 2314 may provide one or more constraints on the optimization performed by midpoint optimizer 2312. The optimization constraints may be specified in terms of midpoint b or other variables that are related to midpoint b. For example, optimization constraints module 2314 may implement an optimization constraint specifying that the expected SOC of battery 2008 at the end of each frequency response period is between zero and one, as shown in the following equation:

$$0 \leq SOC_0 + \sum_{i=1}^{j} \Delta SOC_i \leq 1 \forall j = 1 \ldots h$$

where $SOC_0$ is the SOC of battery 2008 at the beginning of the optimization window, $\Delta SOC_i$ is the change in SOC during frequency response period i, and h is the total number of frequency response periods within the optimization window.

In some embodiments, optimization constraints module 2314 implements an optimization constraint on midpoint b so that the power at POI 2010 does not exceed the power rating of power inverter 2006. Such a constraint is shown in the following equation:

$$-P_{limit} \leq b_k + P_{campus,max}^{(p)} \leq P_{limit}$$

where $P_{limit}$ is the power rating of power inverter 2006 and $P_{campus,max}^{(p)}$ is the maximum value of $P_{campus}$ at confidence level p. This constraint could also be implemented by identifying the probability that the sum of $b_k$ and $P_{campus,max}$ exceeds the power inverter power rating (e.g., using a probability density function for $P_{campus,max}$) and limiting that probability to less than or equal to 1-p.

In some embodiments, optimization constraints module 2314 implements an optimization constraint to ensure (with a given probability) that the actual SOC of battery 2008 remains between zero and one at each time step during the applicable frequency response period. This constraint is different from the first optimization constraint which placed bounds on the expected SOC of battery 2008 at the end of each optimization period. The expected SOC of battery 2008 can be determined deterministically, whereas the actual SOC of battery 2008 is dependent on the campus power $P_{campus}$ and the actual value of the regulation signal $Reg_{signal}$ at each time step during the optimization period. In other words, for any value of $Reg_{award} > 0$, there is a chance that battery 2008 becomes fully depleted or fully charged while maintaining the desired power $P_{POI}^*$ at POI 2010.

Optimization constraints module 2314 may implement the constraint on the actual SOC of battery 2008 by approximating the battery power $P_{bat}$ (a random process) as a wide-sense stationary, correlated normally distributed process. Thus, the SOC of battery 2008 can be considered as a random walk. Determining if the SOC would violate the constraint is an example of a gambler's ruin problem. For example, consider a random walk described by the following equation:

$$y_{k+1} = y_k + x_k, \quad P(x_k=1)=p, \quad P(x_k=-1)=1-p$$

The probability P that $y_k$ (starting at state z) will reach zero in less than n moves is given by the following equation:

$$P = 2a^{-1}(2p)^{\frac{n-z}{2}}[2(1-p)]^{\frac{n+z}{2}} \sum_{v=1}^{\frac{a}{2}} \cos^{n-1}\left(\frac{\pi v}{a}\right) \sin\left(\frac{\pi v}{a}\right) \sin\left(\frac{\pi z v}{a}\right)$$

In some embodiments, each frequency response period includes approximately n=1800 time steps (e.g., one time step every two seconds for an hour). Therefore, the central limit theorem applies and it is possible to convert the autocorrelated random process for $P_{bat}$ and the limits on the SOC of battery 2008 into an uncorrelated random process of 1 or −1 with a limit of zero.

In some embodiments, optimization constraints module 2314 converts the battery power $P_{bat}$ into an uncorrelated normal process driven by the regulation signal $Reg_{signal}$. For example, consider the original battery power described by the following equation:

$$x_{k+1} = \alpha x_k + e_k, \quad x_k \sim N(\mu, \sigma), \quad e_k \sim N(\mu_e, \sigma_e)$$

where the signal x represents the battery power $P_{bat}$, $\alpha$ is an autocorrelation parameter, and e is a driving signal. In some embodiments, e represents the regulation signal $Reg_{signal}$. If the power of the signal x is known, then the power of signal e is also known, as shown in the following equations:

$$\mu(1-\alpha) = \mu_e$$

$$E\{x_k^2\}(1-\alpha)^2 - 2\alpha\mu\mu_e = E\{e_k^2\}$$

$$E\{x_k^2\}(1-\alpha^2) - 2\mu^2\alpha(1-\alpha) = E\{e_k^2\},$$

Additionally, the impulse response of the difference equation for $x_{k+1}$ is:

$$h_k = \alpha^k \quad k \geq 0$$

Using convolution, $x_k$ can be expressed as follows:

$$x_k = \sum_{i=1}^{k} \alpha^{k-i} e_{i-1}$$

$$x_3 = \alpha^2 e_0 + \alpha^1 e_1 + e_2$$

$$x_q = \alpha^{q-1} e_0 + \alpha^{q-2} e_1 + \ldots + \alpha e_{q-2} + e_{q-1}$$

A random walk driven by signal $x_k$ can be defined as follows:

$$y_k = \sum_{j=1}^{k} x_j = \sum_{j=1}^{k} \sum_{i=1}^{j} \alpha^{j-i} e_{i-1}$$

which for large values of j can be approximated using the infinite sum of a geometric series in terms of the uncorrelated signal e rather than x:

$$y_k = \sum_{j=1}^{k} x_j \approx \sum_{j=1}^{k} \frac{1}{1-\alpha} e_j = \sum_{j=1}^{k} x_j' \quad k \gg 1$$

Thus, the autocorrelated driving signal $x_k$ of the random walk can be converted into an uncorrelated driving signal $x_k'$ with mean and power given by:

$$E\{x_k'\} = \mu, \quad E\{(x_k' - \mu)^2\} = \frac{1+\alpha}{1-\alpha}\sigma^2,$$

$$E\{x_k'^2\} = \frac{1+\alpha}{1-\alpha}\sigma^2 + \mu^2, \quad \sigma_{x'}^2 = \frac{1+\alpha}{1-\alpha}\sigma^2$$

where $x_k'$ represents the regulation signal $Reg_{signal}$. Advantageously, this allows optimization constraints module 2314 to define the probability of ruin in terms of the regulation signal $Reg_{signal}$.

In some embodiments, optimization constraints module 2314 determines a probability p that the random walk driven by the sequence of −1 and 1 will take the value of 1. In order to ensure that the random walk driven by the sequence of −1 and 1 will behave the same as the random walk driven by $x_k'$, optimization constraints module 2314 may select p such that the ratio of the mean to the standard deviation is the same for both driving functions, as shown in the following equations:

$$\frac{\text{mean}}{\text{stdev}} = \frac{\mu}{\sqrt{\frac{1+\alpha}{1-\alpha}}\sigma} = \tilde{\mu} = \frac{2p-1}{\sqrt{4p(1-p)}}$$

$$p = \frac{1}{2} \pm \frac{1}{2}\sqrt{1 - \left(\frac{1}{\tilde{\mu}^2 + 1}\right)}$$

where $\tilde{\mu}$ is the ratio of the mean to the standard deviation of the driving signal (e.g., $\text{Reg}_{signal}$) and $\mu$ is the change in state-of-charge over the frequency response period divided by the number of time steps within the frequency response period $$\left(\text{i.e., } \mu = \frac{\Delta SOC}{n}\right).$$

For embodiments in which each frequency response period has a duration of one hour (i.e., 3600 seconds) and the interval between time steps is two seconds, the number of time steps per frequency response period is 1800 (i.e., n=1800). In the equation for p, the plus is used when $\tilde{\mu}$ is greater than zero, whereas the minus is used when $\tilde{\mu}$ is less than zero. Optimization constraints module 2314 may also ensure that both driving functions have the same number of standard deviations away from zero (or ruin) to ensure that both random walks have the same behavior, as shown in the following equation:

$$z = \frac{SOC \cdot C_{des}\sqrt{4p(1-p)}}{\sqrt{\frac{1+\alpha}{1-\alpha}\sigma}}$$

Advantageously, the equations for p and z allow optimization constraints module 2314 to define the probability of ruin P (i.e., the probability of battery 2008 fully depleting or reaching a fully charged state) within N time steps (n=1 . . . N) as a function of variables that are known to high level controller 2212 and/or manipulated by high level controller 2212. For example, the equation for p defines p as a function of the mean and standard deviation of the regulation signal $\text{Reg}_{signal}$, which may be estimated by signal statistics predictor 2218. The equation for z defines z as a function of the SOC of battery 2008 and the parameters of the regulation signal $\text{Reg}_{signal}$.

Optimization constraints module 2314 may use one or more of the previous equations to place constraints on $\Delta SOC \cdot C_{des}$ and $\text{Reg}_{award}$ given the current SOC of battery 2008. For example, optimization constraints module 2314 may use the mean and standard deviation of the regulation signal $\text{Reg}_{signal}$ to calculate p. Optimization constraints module 2314 may then use p in combination with the SOC of battery 2008 to calculate z. Optimization constraints module 2314 may use p and z as inputs to the equation for the probability of ruin P. This allows optimization constraints module 2314 to define the probability or ruin P as a function of the SOC of battery 2008 and the estimated statistics of the regulation signal $\text{Reg}_{signal}$. Optimization constraints module 2314 may impose constraints on the SOC of battery 2008 to ensure that the probability of ruin P within N time steps does not exceed a threshold value. These constraints may be expressed as limitations on the variables $\Delta SOC \cdot C_{des}$ and/or $\text{Reg}_{award}$, which are related to midpoint b as previously described.

In some embodiments, optimization constraints module 2314 uses the equation for the probability of ruin P to define boundaries on the combination of variables p and z. The boundaries represent thresholds when the probability of ruin P in less than N steps is greater than a critical value $P_{cr}$ (e.g., $P_{cr}$=0.001). For example, optimization constraints module 2314 may generate boundaries that correspond to a threshold probability of battery 2008 fully depleting or reaching a fully charged state during a frequency response period (e.g., in N=1800 steps).

In some embodiments, optimization constraints module 2314 constrains the probability of ruin P to less than the threshold value, which imposes limits on potential combinations of the variables p and z. Since the variables p and z are related to the SOC of battery 2008 and the statistics of the regulation signal, the constraints may impose limitations on $\Delta SOC \cdot C_{des}$ and $\text{Reg}_{award}$ given the current SOC of battery 2008. These constraints may also impose limitations on midpoint b since the variables $\Delta SOC \cdot C_{des}$ and $\text{Reg}_{award}$ are related to midpoint b. For example, optimization constraints module 2314 may set constraints on the maximum bid $\text{Reg}_{award}$ given a desired change in the SOC for battery 2008. In other embodiments, optimization constraints module 2314 penalizes the objective function J given the bid $\text{Reg}_{award}$ and the change in SOC.

Still referring to FIG. 23, variable SOC controller 2308 is shown to include a frequency response (FR) revenue estimator 2316. FR revenue estimator 2316 may be configured to estimate the frequency response revenue that will result from a given midpoint b (e.g., a midpoint provided by midpoint optimizer 2312). The estimated frequency response revenue may be used as the term $\text{Rev}(\text{Reg}_{award,k})$ in the objective function J. Midpoint optimizer 2312 may use the estimated frequency response revenue along with other terms in the objective function J to determine an optimal midpoint b.

In some embodiments, FR revenue estimator 2316 uses a revenue model to predict frequency response revenue. An exemplary revenue model which may be used by FR revenue estimator 2316 is shown in the following equation:

$$\text{Rev}(\text{Reg}_{award}) = \text{Reg}_{award}(CP_{cap} + MR \cdot CP_{perf})$$

where $CP_{cap}$, MR, and $CP_{perf}$ are the energy market statistics received from energy market predictor 2216 and $\text{Reg}_{award}$ is a function of the midpoint b. For example, capability bid calculator 2322 may calculate $\text{Reg}_{award}$ using the following equation:

$$\text{Reg}_{award} = P_{limit} - |b|$$

where $P_{limit}$ is the power rating of power inverter 2006.

As shown above, the equation for frequency response revenue used by FR revenue estimator 2316 does not include a performance score (or assumes a performance score of 1.0). This results in FR revenue estimator 2316 estimating a maximum possible frequency response revenue that can be achieved for a given midpoint b (i.e., if the actual frequency response of controller 2012 were to follow the regulation signal exactly). However, it is contemplated that the actual frequency response may be adjusted by low level controller 2214 in order to preserve the life of battery 2008. When the actual frequency response differs from the regulation signal, the equation for frequency response revenue can be adjusted to include a performance score. The resulting value function J may then be optimized by low level controller 2214 to determine an optimal frequency response output which considers both frequency response revenue and the costs of battery degradation, as described with reference to FIG. 24.

Still referring to FIG. 23, variable SOC controller 2308 is shown to include a battery degradation estimator 2318.

Battery degradation estimator 2318 may estimate the cost of battery degradation that will result from a given midpoint b (e.g., a midpoint provided by midpoint optimizer 2312). The estimated battery degradation may be used as the term $\lambda_{bat}$ in the objective function J. Midpoint optimizer 2312 may use the estimated battery degradation along with other terms in the objective function J to determine an optimal midpoint b.

In some embodiments, battery degradation estimator 2318 uses a battery life model to predict a loss in battery capacity that will result from a set of midpoints b, power outputs, and/or other variables that can be manipulated by controller 2012. The battery life model may define the loss in battery capacity $C_{loss,add}$ as a sum of multiple piecewise linear functions, as shown in the following equation:

$$C_{loss,add} = f_1(T_{cell}) + f_2(SOC) + f_3(DOD) + f_4(PR) + f_5(ER) - C_{loss,nom}$$

where $T_{cell}$ is the cell temperature, SOC is the state-of-charge, DOD is the depth of discharge, PR is the average power ratio $$\left(\text{e.g., } PR = avg\left(\frac{P_{avg}}{P_{des}}\right)\right),$$

and ER is the average effort ratio $$\left(\text{e.g., } ER = avg\left(\frac{\Delta P_{bat}}{P_{des}}\right)\right)$$

of battery 2008. $C_{loss,nom}$ is the nominal loss in battery capacity that is expected to occur over time. Therefore, $C_{loss,add}$ represents the additional loss in battery capacity degradation in excess of the nominal value $C_{loss,nom}$.

Battery degradation estimator 2318 may define the terms in the battery life model as functions of one or more variables that have known values (e.g., estimated or measured values) and/or variables that can be manipulated by high level controller 2212. For example, battery degradation estimator 2318 may define the terms in the battery life model as functions of the regulation signal statistics (e.g., the mean and standard deviation of $Reg_{signal}$), the campus power signal statistics (e.g., the mean and standard deviation of $P_{campus}$), $Reg_{award}$, midpoint b, the SOC of battery 2008, and/or other variables that have known or controlled values.

In some embodiments, battery degradation estimator 2318 measures the cell temperature $T_{cell}$ using a temperature sensor configured to measure the temperature of battery 2008. In other embodiments, battery degradation estimator 2318 estimates or predicts the cell temperature $T_{cell}$ based on a history of measured temperature values. For example, battery degradation estimator 2318 may use a predictive model to estimate the cell temperature $T_{cell}$ as a function of the battery power $P_{bat}$, the ambient temperature, and/or other variables that can be measured, estimated, or controlled by high level controller 2212.

Battery degradation estimator 2318 may define the variable SOC in the battery life model as the SOC of battery 2008 at the end of the frequency response period. The SOC of battery 2008 may be measured or estimated based on the control decisions made by controller 2012. For example, battery degradation estimator 2318 may use a predictive model to estimate or predict the SOC of battery 2008 at the end of the frequency response period as a function of the battery power $P_{bat}$, the midpoint b, and/or other variables that can be measured, estimated, or controlled by high level controller 2212.

Battery degradation estimator 2318 may define the average power ratio PR as the ratio of the average power output of battery 2008 (i.e., $P_{avg}$) to the design power $P_{des}$ $$\left(\text{e.g., } PR = \frac{P_{avg}}{P_{des}}\right).$$

The average power output of battery 2008 can be defined using the following equation:

$$P_{avg} = E\{|Reg_{award}Reg_{signal} + b - P_{loss} - P_{campus}|\}$$

where the expression $(Reg_{award}Reg_{signal} + b - P_{loss} - P_{campus})$ represents the battery power $P_{bat}$. The expected value of $P_{avg}$ is given by:

$$P_{avg} = \sigma_{bat}\sqrt{\frac{2}{\pi}}\exp\left(\frac{-\mu_{bat}^2}{2\sigma_{bat}^2}\right) + \text{erf}\left(\frac{-\mu_{bat}}{\sqrt{2\sigma_{bat}^2}}\right)$$

where $\mu_{bat}$ and $\sigma_{bat}^2$ are the mean and variance of the battery power $P_{bat}$. The variables $\mu_{bat}$ and $\sigma_{bat}^2$ may be defined as follows:

$$\mu_{bat} = Reg_{award}E\{Reg_{signal}\} + b - E\{P_{loss}\} - E\{P_{campus}\}$$

$$\sigma_{bat}^2 = Reg_{award}^2 \sigma_{FR}^2 \sigma_{campus}^2$$

where $\sigma_{FR}^2$ is the variance of $Reg_{signal}$ and the contribution of the battery power loss to the variance $\sigma_{bat}^2$ is neglected.

Battery degradation estimator 2318 may define the average effort ratio ER as the ratio of the average change in battery power $\Delta P_{avg}$ to the design power $P_{des}$ $$\left(\text{i.e., } ER = \frac{\Delta P_{avg}}{P_{des}}\right).$$

The average change in battery power can be defined using the following equation:

$$\Delta P_{avg} = E\{P_{bat,k} - P_{bat,k-1}\}$$

$$\Delta P_{avg} = E\{|Reg_{award}(Reg_{signal,k} - Reg_{signal,k-1}) - (P_{loss,k} - P_{loss,k-1}) - (P_{campus,k} - P_{campus,k-1})|\}$$

To make this calculation more tractable, the contribution due to the battery power loss can be neglected. Additionally, the campus power $P_{campus}$ and the regulation signal $Reg_{signal}$ can be assumed to be uncorrelated, but autocorrelated with first order autocorrelation parameters of $\alpha_{campus}$ and $\alpha$, respectively. The argument inside the absolute value in the equation for $\Delta P_{avg}$ has a mean of zero and a variance given by:

$$\sigma_{diff}^2 = E\{[Reg_{award}(Reg_{signal,k} - Reg_{signal,k-1}) - (P_{campus,k} - P_{campus,k-1})]^2\}$$

$$= E\{Reg_{award}^2(Reg_{signal,k} - Reg_{signal,k-1})^2 - (P_{campus,k} - P_{campus,k-1})^2\}$$

$$= 2Reg_{award}^2(1-\alpha)\sigma_{FR}^2 + 2(1-\alpha_{campus})\sigma_{campus}^2$$

Battery degradation estimator 2318 may define the depth of discharge DOD as the maximum state-of-charge minus the minimum state-of-charge of battery 2008 over the frequency response period, as shown in the following equation:

$$DOD = SOC_{max} - SOC_{min}$$

The SOC of battery 2008 can be viewed as a constant slope with a zero mean random walk added to it, as previously described. An uncorrelated normal random walk with a driving signal that has zero mean has an expected range given by:

$$E\{max - min\} = 2\sigma \sqrt{\frac{2N}{\pi}}$$

where E{max−min} represent the depth of discharge DOD and can be adjusted for the autocorrelation of the driving signal as follows:

$$E\{max - min\} = 2\sigma_{bat} \sqrt{\frac{1+\alpha_{bat}}{1-\alpha_{bat}}} \sqrt{\frac{2N}{\pi}}$$

$$\sigma_{bat}^2 = Reg_{award}^2 \sigma_{FR}^2 + \sigma_{campus}^2$$

$$\alpha_{bat} = \frac{Reg_{award}^2 \alpha \sigma_{FR}^2 + \alpha_{campus} \sigma_{campus}^2}{Reg_{award}^2 \sigma_{FR}^2 + \sigma_{campus}^2}$$

If the SOC of battery 2008 is expected to change (i.e., is not zero mean), the following equation may be used to define the depth of discharge:

$$E\{max - min\} = \begin{cases} R_0 + c \cdot \Delta SOC \cdot \exp\left\{-\alpha \frac{R_0 - \Delta SOC}{\sigma_{bat}}\right\} & \Delta SOC < R_0 \\ \Delta SOC + c \cdot R_0 \cdot \exp\left\{-\alpha \frac{\Delta SOC - R_0}{\sigma_{bat}}\right\} & \Delta SOC > R_0 \end{cases}$$

where $R_0$ is the expected range with zero expected change in the state-of-charge. Battery degradation estimator 2318 may use the previous equations to establish a relationship between the capacity loss $C_{loss,add}$ and the control outputs provided by controller 2012.

Still referring to FIG. 23, variable SOC controller 2308 is shown to include a revenue loss estimator 2320. Revenue loss estimator 2320 may be configured to estimate an amount of potential revenue that will be lost as a result of the battery capacity loss $C_{loss,add}$. In some embodiments, revenue loss estimator 2320 converts battery capacity loss $C_{loss,add}$ into lost revenue using the following equation:

$$R_{loss} = (CP_{cap} + MR \cdot CP_{perf}) C_{loss,add} P_{des}$$

where $R_{loss}$ is the lost revenue over the duration of the frequency response period.

Revenue loss estimator 2320 may determine a present value of the revenue loss $R_{loss}$ using the following equation:

$$\lambda_{bat} = \left[\frac{1-\left(1+\frac{i}{n}\right)^{-n}}{\frac{i}{n}}\right] R_{loss}$$

where n is the total number of frequency response periods (e.g., hours) during which the revenue loss occurs and $\lambda_{bat}$ is the present value of the revenue loss during the ith frequency response period. In some embodiments, the revenue loss occurs over ten years (e.g., n=87,600 hours). Revenue loss estimator 2320 may provide the present value of the revenue loss $\lambda_{bat}$ to midpoint optimizer 2312 for use in the objective function J.

Midpoint optimizer 2312 may use the inputs from optimization constraints module 2314, FR revenue estimator 2316, battery degradation estimator 2318, and revenue loss estimator 2320 to define the terms in objective function J. Midpoint optimizer 2312 may determine values for midpoint b that optimize objective function J. In various embodiments, midpoint optimizer 2312 may use sequential quadratic programming, dynamic programming, or any other optimization technique.

Still referring to FIG. 23, high level controller 2212 is shown to include a capability bid calculator 2322. Capability bid calculator 2322 may be configured to generate a capability bid $Reg_{award}$ based on the midpoint b generated by constant SOC controller 2302 and/or variable SOC controller 2308. In some embodiments, capability bid calculator 2322 generates a capability bid that is as large as possible for a given midpoint, as shown in the following equation:

$$Reg_{award} = P_{limit} - |b|$$

where $P_{limit}$ is the power rating of power inverter 2006. Capability bid calculator 2322 may provide the capability bid to incentive provider 2014 and to frequency response optimizer 2324 for use in generating an optimal frequency response.

Filter Parameters Optimization

Still referring to FIG. 23, high level controller 2212 is shown to include a frequency response optimizer 2324 and a filter parameters optimizer 2326. Filter parameters optimizer 2326 may be configured to generate a set of filter parameters for low level controller 2214. The filter parameters may be used by low level controller 2214 as part of a low-pass filter that removes high frequency components from the regulation signal $Reg_{signal}$. In some embodiments, filter parameters optimizer 2326 generates a set of filter parameters that transform the regulation signal $Reg_{signal}$ into an optimal frequency response signal $Res_{FR}$. Frequency response optimizer 2324 may perform a second optimization process to determine the optimal frequency response $Res_{FR}$ based on the values for $Reg_{award}$ and midpoint b. In the second optimization, the values for $Reg_{award}$ and midpoint b may be fixed at the values previously determined during the first optimization.

In some embodiments, frequency response optimizer 2324 determines the optimal frequency response $Res_{FR}$ by optimizing value function J shown in the following equation:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where the frequency response revenue $Rev(Reg_{award})$ is defined as follows:

$$Rev(Reg_{award}) = PS \cdot Reg_{award}(CP_{cap} + MR \cdot CP_{perf})$$

and the frequency response $Res_{FR}$ is substituted for the regulation signal $Reg_{signal}$ in the battery life model used to calculate $\lambda_{bat,k}$. The performance score PS may be based on several factors that indicate how well the optimal frequency response $Res_{FR}$ tracks the regulation signal $Reg_{signal}$.

The frequency response $Res_{FR}$ may affect both $Rev(Reg_{award})$ and the monetized cost of battery degradation $\lambda_{bat}$. Closely tracking the regulation signal may result in higher performance scores, thereby increasing the frequency response revenue. However, closely tracking the regulation signal may also increase the cost of battery degradation $\lambda_{bat}$. The optimized frequency response $Res_{FR}$ represents an optimal tradeoff between decreased frequency response revenue and increased battery life (i.e., the frequency response that maximizes value J).

In some embodiments, the performance score PS is a composite weighting of an accuracy score, a delay score, and a precision score. Frequency response optimizer 2324 may calculate the performance score PS using the performance score model shown in the following equation:

$$PS = \tfrac{1}{3}PS_{acc} + \tfrac{1}{3}PS_{delay} + \tfrac{1}{3}PS_{prec}$$

where $PS_{acc}$ is the accuracy score, $PS_{delay}$ is the delay score, and $PS_{prec}$ is the precision score. In some embodiments, each term in the precision score is assigned an equal weighting (e.g., 1/3). In other embodiments, some terms may be weighted higher than others.

The accuracy score $PS_{acc}$ may be the maximum correlation between the regulation signal $Reg_{signal}$ and the optimal frequency response $Res_{FR}$. Frequency response optimizer 2324 may calculate the accuracy score $PS_{acc}$ using the following equation:

$$PS_{acc} = \max_{\delta} r_{Reg, Res(\delta)}$$

where δ is a time delay between zero and $\delta_{max}$ (e.g., between zero and five minutes).

The delay score $PS_{delay}$ may be based on the time delay δ between the regulation signal $Reg_{signal}$ and the optimal frequency response $Res_{FR}$. Frequency response optimizer 2324 may calculate the delay score $PS_{delay}$ using the following equation:

$$PS_{delay} = \left| \frac{\delta[s] - \delta_{max}}{\delta_{max}} \right|$$

where δ[s] is the time delay of the frequency response $Res_{FR}$ relative to the regulation signal $Reg_{signal}$ and $\delta_{max}$ is the maximum allowable delay (e.g., 5 minutes or 300 seconds).

The precision score $PS_{prec}$ may be based on a difference between the frequency response $Res_{FR}$ and the regulation signal $Reg_{signal}$. Frequency response optimizer 2324 may calculate the precision score $PS_{prec}$ using the following equation:

$$PS_{prec} = 1 - \frac{\Sigma |Res_{FR} - Reg_{signal}|}{\Sigma |Reg_{signal}|}$$

Frequency response optimizer 2324 may use the estimated performance score and the estimated battery degradation to define the terms in objective function J. Frequency response optimizer 2324 may determine values for frequency response $Res_{FR}$ that optimize objective function J. In various embodiments, frequency response optimizer 2324 may use sequential quadratic programming, dynamic programming, or any other optimization technique.

Filter parameters optimizer 2326 may use the optimized frequency response $Res_{FR}$ to generate a set of filter parameters for low level controller 2214. In some embodiments, the filter parameters are used by low level controller 2214 to translate an incoming regulation signal into a frequency response signal. Low level controller 2214 is described in greater detail with reference to FIG. 24.

Figure 26:
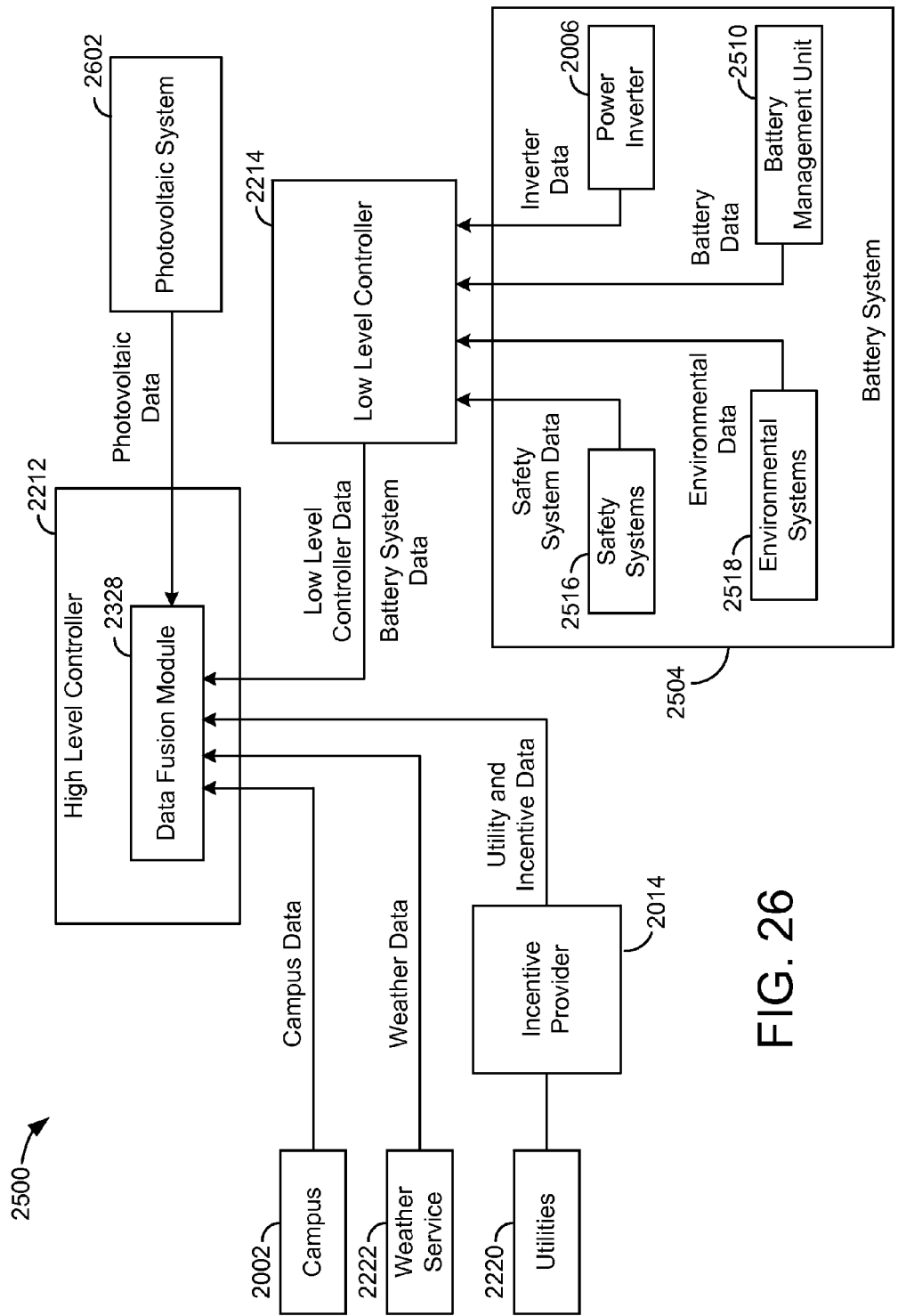
FIG. 26 is a block diagram illustrating data flow into a data fusion module of the frequency response control system of FIG. 25, according to an exemplary embodiment.

Still referring to FIG. 23, high level controller 2212 is shown to include a data fusion module 2328. Data fusion module 2328 is configured to aggregate data received from external systems and devices for processing by high level controller 2212. For example, data fusion module 2328 may store and aggregate external data such as the campus power signal, utility rates, incentive event history and/or weather forecasts as shown in FIG. 26. Further, data fusion module 2328 may store and aggregate data from low level controller 2214. For example, data fusion module 2328 may receive data such as battery SOC, battery temperature, battery system temperature data, security device status data, battery voltage data, battery current data and/or any other data provided by battery system 2504. Data fusion module 2328 is described in greater detail with reference to FIG. 26.

Low Level Controller

Figure 24:
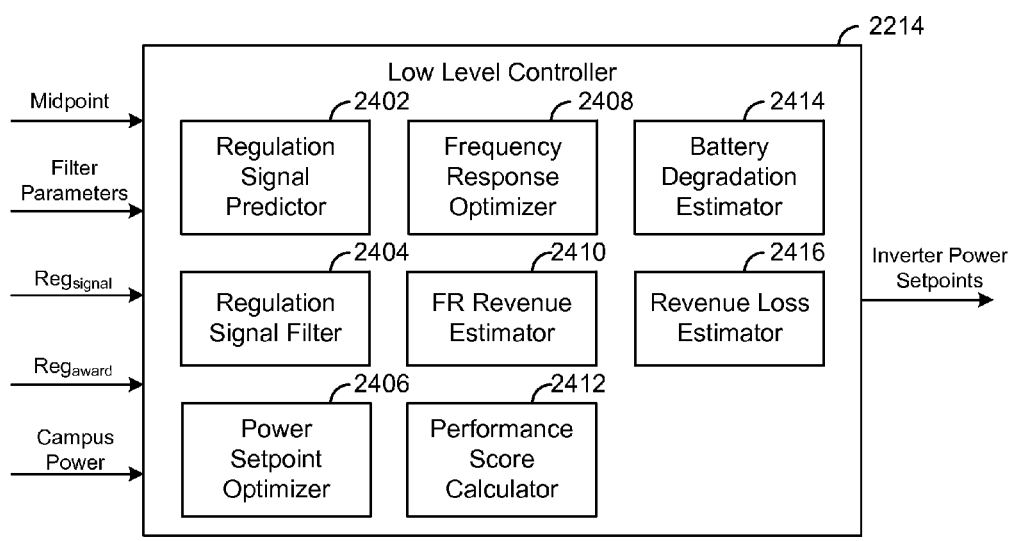
FIG. 24 is a block diagram of a low level controller which can be used in the frequency response optimization system of FIG. 20, according to an exemplary embodiment.

Referring now to FIG. 24, a block diagram illustrating low level controller 2214 in greater detail is shown, according to an exemplary embodiment. Low level controller 2214 may receive the midpoints b and the filter parameters from high level controller 2212. Low level controller 2214 may also receive the campus power signal from campus 2002 and the regulation signal $Reg_{signal}$ and the regulation award $Reg_{award}$ from incentive provider 2014.

Predicting and Filtering the Regulation Signal

Low level controller 2214 is shown to include a regulation signal predictor 2402. Regulation signal predictor 2402 may use a history of past and current values for the regulation signal $Reg_{signal}$ to predict future values of the regulation signal. In some embodiments, regulation signal predictor 2402 uses a deterministic plus stochastic model trained from historical regulation signal data to predict future values of the regulation signal $Reg_{signal}$. For example, regulation signal predictor 2402 may use linear regression to predict a deterministic portion of the regulation signal $Reg_{signal}$ and an AR model to predict a stochastic portion of the regulation signal $Reg_{signal}$. In some embodiments, regulation signal predictor 2402 predicts the regulation signal $Reg_{signal}$ using the techniques described in U.S. patent application Ser. No. 14/717,593.

Low level controller 2214 is shown to include a regulation signal filter 2404. Regulation signal filter 2404 may filter the incoming regulation signal $Reg_{signal}$ and/or the predicted regulation signal using the filter parameters provided by high level controller 2212. In some embodiments, regulation signal filter 2404 is a low pass filter configured to remove high frequency components from the regulation signal $Reg_{signal}$. Regulation signal filter 2404 may provide the filtered regulation signal to power setpoint optimizer 2406.

Determining Optimal Power Setpoints

Power setpoint optimizer 2406 may be configured to determine optimal power setpoints for power inverter 2006 based on the filtered regulation signal. In some embodiments, power setpoint optimizer 2406 uses the filtered regulation signal as the optimal frequency response. For example, low level controller 2214 may use the filtered regulation signal to calculate the desired interconnection power $P_{POI}^{*}$ using the following equation:

$$P_{POI}^{*} = Reg_{award} \cdot Reg_{filter} + b$$

where $\text{Reg}_{filter}$ is the filtered regulation signal. Power setpoint optimizer 2406 may subtract the campus power $P_{campus}$ from the desired interconnection power $P_{POI}^*$ to calculate the optimal power setpoints $P_{SP}$ for power inverter 2006, as shown in the following equation:

$$P_{SP} = P_{POI}^* - P_{campus}$$

In other embodiments, low level controller 2214 performs an optimization to determine how closely to track $P_{POI}^*$. For example, low level controller 2214 is shown to include a frequency response optimizer 2408. Frequency response optimizer 2408 may determine an optimal frequency response $\text{Res}_{FR}$ by optimizing value function J shown in the following equation:

$$J = \sum_{k=1}^{h} \text{Rev}(\text{Reg}_{award,k}) + \sum_{k=1}^{h} c_k b_k + \min_{period}(P_{campus,k} + b_k) - \sum_{k=1}^{h} \lambda_{bat,k}$$

where the frequency response $\text{Res}_{FR}$ affects both $\text{Rev}(\text{Reg}_{award})$ and the monetized cost of battery degradation $\lambda_{bat}$. The frequency response $\text{Res}_{FR}$ may affect both $\text{Rev}(\text{Reg}_{award})$ and the monetized cost of battery degradation $\lambda_{bat}$. The optimized frequency response $\text{Res}_{FR}$ represents an optimal tradeoff between decreased frequency response revenue and increased battery life (i.e., the frequency response that maximizes value J). The values of $\text{Rev}(\text{Reg}_{award})$ and $\lambda_{bat,k}$ may be calculated by FR revenue estimator 2410, performance score calculator 2412, battery degradation estimator 2414, and revenue loss estimator 2416.

Estimating Frequency Response Revenue

Still referring to FIG. 24, low level controller 2214 is shown to include a FR revenue estimator 2410. FR revenue estimator 2410 may estimate a frequency response revenue that will result from the frequency response $\text{Res}_{FR}$. In some embodiments, FR revenue estimator 2410 estimates the frequency response revenue using the following equation:

$$\text{Rev}(\text{Reg}_{award}) = \text{PS} \cdot \text{Reg}_{award}(\text{CP}_{cap} + \text{MR} \cdot \text{CP}_{perf})$$

where $\text{Reg}_{award}$, $\text{CP}_{cap}$, MR, and $\text{CP}_{perf}$ are provided as known inputs and PS is the performance score.

Low level controller 2214 is shown to include a performance score calculator 2412. Performance score calculator 2412 may calculate the performance score PS used in the revenue function. The performance score PS may be based on several factors that indicate how well the optimal frequency response $\text{Res}_{FR}$ tracks the regulation signal $\text{Reg}_{signal}$. In some embodiments, the performance score PS is a composite weighting of an accuracy score, a delay score, and a precision score. Performance score calculator 2412 may calculate the performance score PS using the performance score model shown in the following equation:

$$\text{PS} = \tfrac{1}{3}\text{PS}_{acc} + \tfrac{1}{3}\text{PS}_{delay} + \tfrac{1}{3}\text{PS}_{prec}$$

where $\text{PS}_{acc}$ is the accuracy score, $\text{PS}_{delay}$ is the delay score, and $\text{PS}_{prec}$ is the precision score. In some embodiments, each term in the precision score is assigned an equal weighting (e.g., ⅓). In other embodiments, some terms may be weighted higher than others. Each of the terms in the performance score model may be calculated as previously described with reference to FIG. 23.

Estimating Battery Degradation

Still referring to FIG. 24, low level controller 2214 is shown to include a battery degradation estimator 2414. Battery degradation estimator 2414 may be the same or similar to battery degradation estimator 2318, with the exception that battery degradation estimator 2414 predicts the battery degradation that will result from the frequency response $\text{Res}_{FR}$ rather than the original regulation signal $\text{Reg}_{signal}$. The estimated battery degradation may be used as the term $\lambda_{bat}$ in the objective function J. Frequency response optimizer 2408 may use the estimated battery degradation along with other terms in the objective function J to determine an optimal frequency response $\text{Res}_{FR}$.

In some embodiments, battery degradation estimator 2414 uses a battery life model to predict a loss in battery capacity that will result from the frequency response $\text{Res}_{FR}$. The battery life model may define the loss in battery capacity $C_{loss,add}$ as a sum of multiple piecewise linear functions, as shown in the following equation:

$$C_{loss,add} = f_1(T_{cell}) + f_2(\text{SOC}) + f_3(\text{DOD}) + f_4(\text{PR}) + f_5(\text{ER}) - C_{loss,nom}$$

where $T_{cell}$ is the cell temperature, SOC is the state-of-charge, DOD is the depth of discharge, PR is the average power ratio $$\left(\text{e.g., } PR = avg\left(\frac{P_{avg}}{P_{des}}\right)\right),$$

and ER is the average effort ratio $$\left(\text{e.g., } ER = avg\left(\frac{\Delta P_{bat}}{P_{des}}\right)\right)$$

of battery 2008. $C_{loss,nom}$ is the nominal loss in battery capacity that is expected to occur over time. Therefore, $C_{loss,add}$ represents the additional loss in battery capacity degradation in excess of the nominal value $C_{loss,nom}$. The terms in the battery life model may be calculated as described with reference to FIG. 23, with the exception that the frequency response $\text{Res}_{FR}$ is used in place of the regulation signal $\text{Reg}_{signal}$.

Still referring to FIG. 24, low level controller 2214 is shown to include a revenue loss estimator 2416. Revenue loss estimator 2416 may be the same or similar to revenue loss estimator 2320, as described with reference to FIG. 23. For example, revenue loss estimator 2416 may be configured to estimate an amount of potential revenue that will be lost as a result of the battery capacity loss $C_{loss,add}$. In some embodiments, revenue loss estimator 2416 converts battery capacity loss $C_{loss,add}$ into lost revenue using the following equation:

$$R_{loss}(\text{CP}_{cap} + \text{MR} \cdot \text{CP}_{perf}) C_{loss,add} P_{des}$$

where $R_{loss}$ is the lost revenue over the duration of the frequency response period.

Revenue loss estimator 2320 may determine a present value of the revenue loss $R_{loss}$ using the following equation:

$$\lambda_{bat} = \left[\frac{1 - \left(1 + \frac{i}{n}\right)^{-n}}{\frac{i}{n}}\right] R_{loss}$$

where n is the total number of frequency response periods (e.g., hours) during which the revenue loss occurs and $\lambda_{bat}$ is the present value of the revenue loss during the ith frequency response period. In some embodiments, the revenue loss occurs over ten years (e.g., n=87,600 hours). Revenue loss estimator 2320 may provide the present value of the revenue loss $\lambda_{bat}$ to frequency response optimizer 2408 for use in the objective function J.

Frequency response optimizer 2408 may use the estimated performance score and the estimated battery degradation to define the terms in objective function J. Frequency response optimizer 2408 may determine values for frequency response $\text{Res}_{FR}$ that optimize objective function J. In various embodiments, frequency response optimizer 2408 may use sequential quadratic programming, dynamic programming, or any other optimization technique.

Frequency Response Control System

Figure 25:
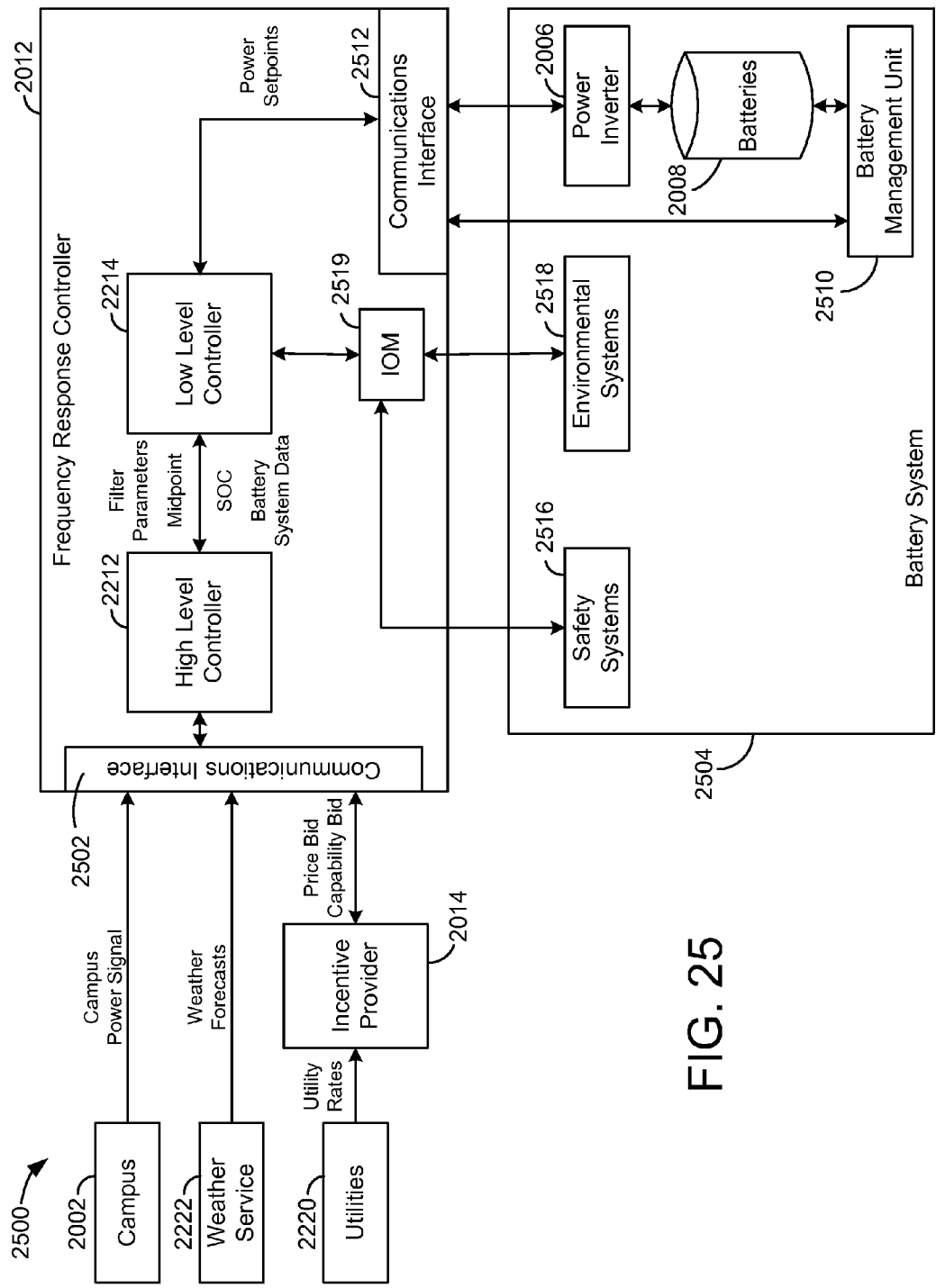
FIG. 25 is a block diagram of a frequency response control system, according to an exemplary embodiment.

Referring now to FIG. 25, a block diagram of a frequency response control system 2500 is shown, according to exemplary embodiment. Control system 2500 is shown to include frequency response controller 2012, which may be the same or similar as previously described. For example, frequency response controller 2012 may be configured to perform an optimization process to generate values for the bid price, the capability bid, and the midpoint b. In some embodiments, frequency response controller 2012 generates values for the bids and the midpoint b periodically using a predictive optimization scheme (e.g., once every half hour, once per frequency response period, etc.). Frequency response controller 2012 may also calculate and update power setpoints for power inverter 2006 periodically during each frequency response period (e.g., once every two seconds). As shown in FIG. 25, frequency response controller 2012 is in communication with one or more external systems via communication interface 2502. Additionally, frequency response controller 2012 is also shown as being in communication with a battery system 2504.

In some embodiments, the interval at which frequency response controller 2012 generates power setpoints for power inverter 2006 is significantly shorter than the interval at which frequency response controller 2012 generates the bids and the midpoint b. For example, frequency response controller 2012 may generate values for the bids and the midpoint b every half hour, whereas frequency response controller 2012 may generate a power setpoint for power inverter 2006 every two seconds. The difference in these time scales allows frequency response controller 2012 to use a cascaded optimization process to generate optimal bids, midpoints b, and power setpoints.

In the cascaded optimization process, high level controller 2212 determines optimal values for the bid price, the capability bid, and the midpoint b by performing a high level optimization. The high level controller 2212 may be a centralized server within the frequency response controller 2012. The high level controller 2212 may be configured to execute optimization control algorithms, such as those described herein. In one embodiment, the high level controller 2212 may be configured to run an optimization engine, such as a MATLAB optimization engine.

Further, the cascaded optimization process allows for multiple controllers to process different portions of the optimization process. As will be described below, the high level controller 2212 may be used to perform optimization functions based on received data, while a low level controller 2214 may receive optimization data from the high level controller 2212 and control the battery system 2504 accordingly. By allowing independent platforms to perform separation portions of the optimization, the individual platforms may be scaled and tuned independently. For example, the controller 2012 may be able to be scaled up to accommodate a larger battery system 2504 by adding additional low level controllers to control the battery system 2504. Further, the high level controller 2212 may be modified to provide additional computing power for optimizing battery system 2504 in more complex systems. Further, modifications to either the high level controller 2212 or the low level controller 2214 will not affect the other, thereby increasing overall system stability and availability.

In system 2500, high level controller 2212 may be configured to perform some or all of the functions previously described with reference to FIGS. 22-24. For example, high level controller 2212 may select midpoint b to maintain a constant state-of-charge in battery 2008 (i.e., the same state-of-charge at the beginning and end of each frequency response period) or to vary the state-of-charge in order to optimize the overall value of operating system 2500 (e.g., frequency response revenue minus energy costs and battery degradation costs), as described below. High level controller 2212 may also determine filter parameters for a signal filter (e.g., a low pass filter) used by a low level controller 2214.

The low level controller 2214 may be a standalone controller. In one embodiment, the low level controller 2214 is a Network Automation Engine (NAE) controller from Johnson Controls. However, other controllers having the required capabilities are also contemplated. The required capabilities for the low level controller 2214 may include having sufficient memory and computing power to run the applications, described below, at the required frequencies. For example, certain optimization control loops (described below) may require control loops running at 200 ms intervals. However, intervals of more than 200 ms and less than 200 ms may also be required. These control loops may require reading and writing data to and from the battery inverter. The low level controller 2214 may also be required to support Ethernet connectivity (or other network connectivity) to connect to a network for receiving both operational data, as well as configuration data. The low level controller 2214 may be configured to perform some or all of the functions previously described with reference to FIGS. 22-24.

The low level controller 2214 may be capable of quickly controlling one or more devices around one or more setpoints. For example, low level controller 2214 uses the midpoint b and the filter parameters from high level controller 2212 to perform a low level optimization in order to generate the power setpoints for power inverter 2006. Advantageously, low level controller 2214 may determine how closely to track the desired power $P_{POI}*$ at the point of interconnection 2010. For example, the low level optimization performed by low level controller 2214 may consider not only frequency response revenue but also the costs of the power setpoints in terms of energy costs and battery degradation. In some instances, low level controller 2214 may determine that it is deleterious to battery 2008 to follow the regulation exactly and may sacrifice a portion of the frequency response revenue in order to preserve the life of battery 2008.

Low level controller 2214 may also be configured to interface with one or more other devises or systems. For example, the low level controller 2214 may communicate with the power inverter 2006 and/or the battery management unit 2510 via a low level controller communication interface 2512. Communications interface 2512 may include wired or wireless interfaces (e.g., jacks, antennas, transmitters, receivers, transceivers, wire terminals, etc.) for conducting data communications with various systems, devices, or networks. For example, communications interface 2512 may include an Ethernet card and port for sending and receiving data via an Ethernet-based communications network and/or a WiFi transceiver for communicating via a wireless communications network. Communications interface 2512 may be configured to communicate via local area networks or wide area networks (e.g., the Internet, a building WAN, etc.) and may use a variety of communications protocols (e.g., BACnet, MODBUS, CAN, IP, LON, etc.).

As described above, the low level controller 2214 may communicate setpoints to the power inverter 2006. Furthermore, the low level controller 2214 may receive data from the battery management unit 2510 via the communication interface 2512. The battery management unit 2510 may provide data relating to a state of charge (SOC) of the batteries 2008. The battery management unit 2510 may further provide data relating to other parameters of the batteries 2008, such as temperature, real time or historical voltage level values, real time or historical current values, etc. The low level controller 2214 may be configured to perform time critical functions of the frequency response controller 2012. For example, the low level controller 2214 may be able to perform fast loop (PID, PD, PI, etc.) controls in real time.

The low level controller 2214 may further control a number of other systems or devices associated with the battery system 2504. For example, the low level controller may control safety systems 2516 and/or environmental systems 2518. In one embodiment, the low level controller 2214 may communicate with and control the safety systems 2516 and/or the environmental systems 2518 through an input/output module (TOM) 2519. In one example, the IOM may be an TOM controller from Johnson Controls. The IOM may be configured to receive data from the low level controller and then output discrete control signals to the safety systems 2516 and/or environmental systems 2518. Further, the IOM 2519 may receive discrete outputs from the safety systems 2516 and/or environmental systems 2220, and report those values to the low level controller 2214. For example, the TOM 2519 may provide binary outputs to the environmental system 2518, such as a temperature setpoint; and in return may receive one or more analog inputs corresponding to temperatures or other parameters associated with the environmental systems 2518. Similarly, the safety systems 2516 may provide binary inputs to the TOM 2519 indicating the status of one or more safety systems or devices within the battery system 2504. The IOM 2519 may be able to process multiple data points from devices within the battery system 2504. Further, the TOM may be configured to receive and output a variety of analog signals (4-20 mA, 0-5V, etc.) as well as binary signals.

The environmental systems 2518 may include HVAC devices such as roof-top units (RTUs), air handling units (AHUs), etc. The environmental systems 2518 may be coupled to the battery system 2504 to provide environmental regulation of the battery system 2504. For example, the environmental systems 2518 may provide cooling for the battery system 2504. In one example, the battery system 2504 may be contained within an environmentally sealed container. The environmental systems 2518 may then be used to not only provide airflow through the battery system 2504, but also to condition the air to provide additional cooling to the batteries 2008 and/or the power inverter 2006. The environmental systems 2518 may also provide environmental services such as air filtration, liquid cooling, heating, etc. The safety systems 2516 may provide various safety controls and interlocks associated with the battery system 2504. For example, the safety systems 2516 may monitor one or more contacts associated with access points on the battery system. Where a contact indicates that an access point is being accessed, the safety systems 2516 may communicate the associated data to the low level controller 2214 via the IOM 2519. The low level controller may then generate and alarm and/or shut down the battery system 2504 to prevent any injury to a person accessing the battery system 2504 during operation. Further examples of safety systems can include air quality monitors, smoke detectors, fire suppression systems, etc.

Still referring to FIG. 25, the frequency response controller 2012 is shown to include the high level controller communications interface 2502. Communications interface 2502 may include wired or wireless interfaces (e.g., jacks, antennas, transmitters, receivers, transceivers, wire terminals, etc.) for conducting data communications with various systems, devices, or networks. For example, communications interface 2502 may include an Ethernet card and port for sending and receiving data via an Ethernet-based communications network and/or a WiFi transceiver for communicating via a wireless communications network. Communications interface 2502 may be configured to communicate via local area networks or wide area networks (e.g., the Internet, a building WAN, etc.) and may use a variety of communications protocols (e.g., BACnet, IP, LON, etc.).

Communications interface 2502 may be a network interface configured to facilitate electronic data communications between frequency response controller 2012 and various external systems or devices (e.g., campus 2002, energy grid 2004, incentive provider 2014, utilities 2220, weather service 2222, etc.). For example, frequency response controller 2012 may receive inputs from incentive provider 2014 indicating an incentive event history (e.g., past clearing prices, mileage ratios, participation requirements, etc.) and a regulation signal. Further, the incentive provider 2014 may communicate utility rates provided by utilities 2220. Frequency response controller 2012 may receive a campus power signal from campus 2002, and weather forecasts from weather service 2222 via communications interface 2502. Frequency response controller 2012 may provide a price bid and a capability bid to incentive provider 2014 and may provide power setpoints to power inverter 2006 via communications interface 2502.

Data Fusion

Turning now to FIG. 26, a block diagram illustrating data flow into the data fusion module 2328 is shown, according to some embodiments. As shown in FIG. 26, the data fusion module 2328 may receive data from multiple devices and/or systems. In one embodiment, the data fusion module 2328 may receive all data received by the high level controller 2212. For example, the data fusion module 2328 may receive campus data from the campus 2002. Campus data may include campus power requirements, campus power requests, occupancy planning, historical use data, lighting schedules, HVAC schedules, etc. In a further embodiment, the data fusion module 2328 may receive weather data from the weather service 2222. The weather service 2222 may include current weather data (temperature, humidity, barometric pressure, etc.), weather forecasts, historical weather data, etc. In a still further embodiment, the data fusion module 2328 may receive utility data from the utilities 2220. In some examples, the data fusion module 2328 may receive some or all of the utility data via the incentive provider 2014. Examples of utility data may include utility rates, future pricing schedules, anticipated loading, historical data, etc. Further, the incentive provider 2014 may further add data such as capability bid requests, price bid requests, incentive data, etc.

The data fusion module 2328 may further receive data from the low level controller 2214. In some embodiments, the low level controller may receive data from multiple sources, which may be referred to collectively as battery system data. For example, the low level controller 2214 may receive inverter data from power inverter 2006. Example inverter data may include inverter status, feedback points, inverter voltage and current, power consumption, etc. The low level controller 2214 may further receive battery data from the battery management unit 2510. Example battery data may include battery SOC, depth of discharge data, battery temperature, battery cell temperatures, battery voltage, historical battery use data, battery health data, etc. In other embodiment, the low level controller 2214 may receive environmental data from the environmental systems 2518. Examples of environmental data may include battery system temperature, battery system humidity, current HVAC settings, setpoint temperatures, historical HVAC data, etc. Further, the low level controller 2214 may receive safety system data from the safety systems 2516. Safety system data may include access contact information (e.g. open or closed indications), access data (e.g. who has accessed the battery system 2504 over time), alarm data, etc. In some embodiments, some or all of the data provided to the low level controller 2214 is via an input/output module, such as TOM 2519. For example, the safety system data and the environmental system data may be provided to the low level controller 2214 via an input/output module, as described in detail in regards to FIG. 25.

The low level controller 2214 may then communicate the battery system data to the data fusion module 2328 within the high level controller 2212. Additionally, the low level controller 2214 may provide additional data to the data fusion module 2328, such as setpoint data, control parameters, etc.

The data fusion module 2328 may further receive data from other stationary power systems, such as a photovoltaic system 2602. For example, the photovoltaic system 2602 may include one or more photovoltaic arrays and one or more photovoltaic array power inverters. The photovoltaic system 2602 may provide data to the data fusion module 2328 such as photovoltaic array efficiency, photovoltaic array voltage, photovoltaic array inverter output voltage, photovoltaic array inverter output current, photovoltaic array inverter temperature, etc. In some embodiments, the photovoltaic system 2602 may provide data directly to the data fusion module 2328 within the high level controller 2212. In other embodiments, the photovoltaic system 2602 may transmit the data to the low level controller 2214, which may then provide the data to the data fusion module 2328 within the high level controller 2212.

The data fusion module 2328 may receive some or all of the data described above, and aggregate the data for use by the high level controller 2212. In one embodiment, the data fusion module 2328 is configured to receive and aggregate all data received by the high level controller 2212, and to subsequently parse and distribute the data to one or more modules of the high level controller 2212, as described above. Further, the data fusion module 2328 may be configured to combine disparate heterogeneous data from the multiple sources described above, into a homogeneous data collection for use by the high level controller 2212. As described above, data from multiple inputs is required to optimize the battery system 2504, and the data fusion module 2328 can gather and process the data such that it can be provided to the modules of the high level controller 2212 efficiently and accurately. For example, extending battery lifespan is critical for ensuring proper utilization of the battery system 2504. By combining battery data such as temperature and voltage, along with external data such as weather forecasts, remaining battery life may be more accurately determined by the battery degradation estimator 2318, described above. Similarly, multiple data points from both external sources and the battery system 2504 may allow for more accurate midpoint estimations, revenue loss estimations, battery power loss estimation, or other optimization determination, as described above.

Figure 27:
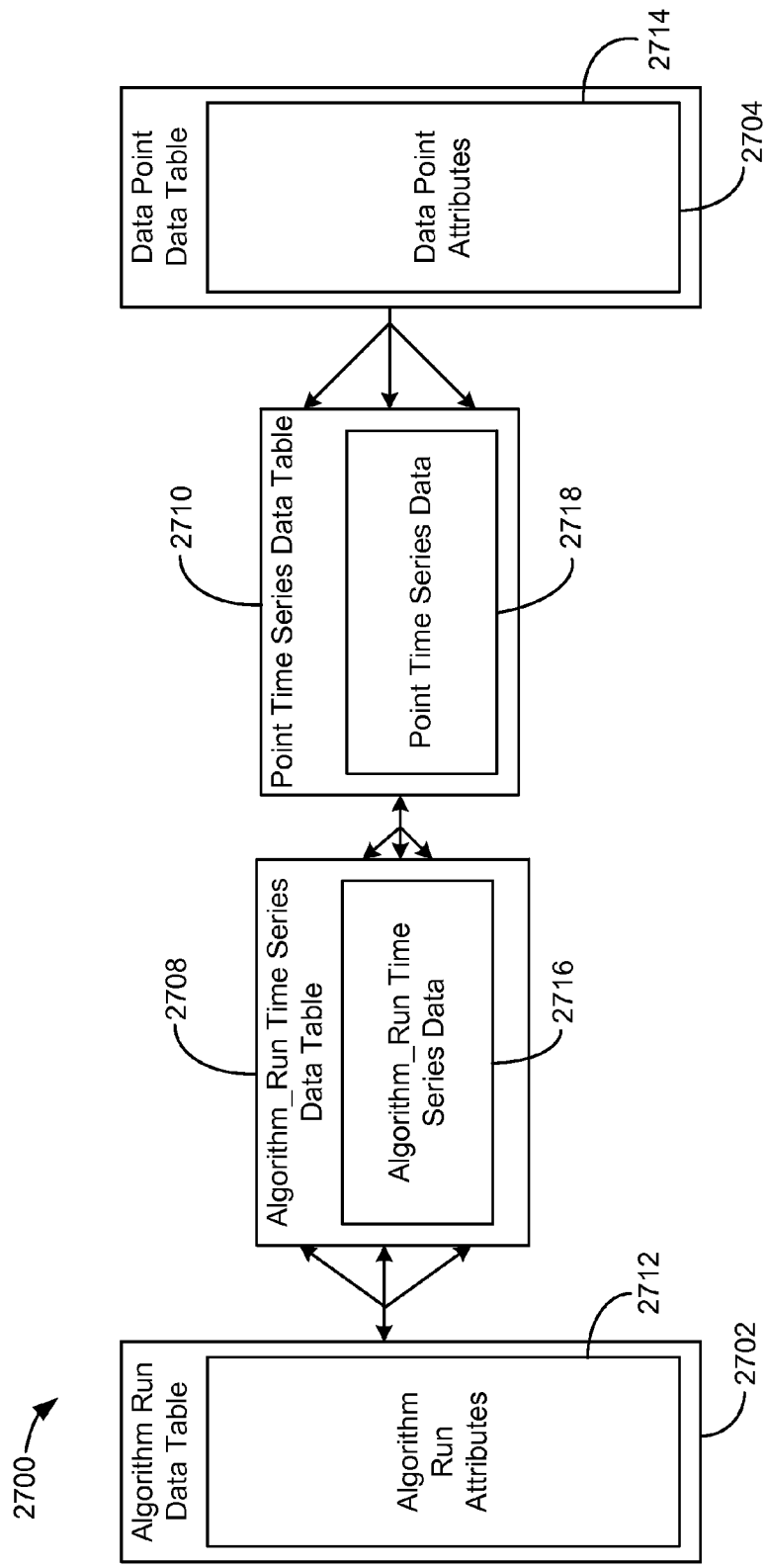
FIG. 27 is a block diagram illustrating a database schema which can be used in the frequency response control system of FIG. 25, according to an exemplary embodiment.

Turning now to FIG. 27, a block diagram showing a database schema 2700 of the system 2500 is shown, according to some embodiments. The schema 2700 is shown to include an algorithm run data table 2702, a data point data table 2704, an algorithm_run time series data table 2708 and a point time series data table 2710. The data tables 2702, 2704, 2708, 2710 may be stored on the memory of the high level controller 2212. In other embodiments, the data tables 2702, 2704, 2708, 2710 may be stored on an external storage device and accessed by the high level controller as required.

As described above, the high level controller performs calculation to generate optimization data for the battery optimization system 2500. These calculation operations (e.g. executed algorithms) may be referred to as "runs." As described above, one such run is the generation of a midpoint b which can subsequently be provided to the low level controller 2214 to control the battery system 2504. However, other types of runs are contemplated. Thus, for the above described run, the midpoint b is the output of the run. The detailed operation of a run, and specifically a run to generate midpoint b is described in detail above.

The algorithm run data table 2702 may include a number of algorithm run attributes 2712. Algorithm run attributes 2712 are those attributes associated with the high level controller 2212 executing an algorithm, or "run", to produce an output. The runs can be performed at selected intervals of time. For example, the run may be performed once every hour. However, in other examples, the run may be performed more than once every hour, or less than once every hour. The run is then performed and by the high level controller 2212 and a data point is output, for example a midpoint b, as described above. The midpoint b may be provided to the low level controller 2214 to control the battery system 2504, described above in the description of the high level controller 2504 calculating the midpoint b.

In one embodiment, the algorithm run attributes contain all the information necessary to perform the algorithm or run. In a further embodiment, the algorithm run attributes 2712 are associated with the high level controller executing an algorithm to generate a midpoint, such as midpoint b described in detail above. Example algorithm run attributes may include an algorithm run key, an algorithm run ID (e.g. "midpoint," "endpoint," "temperature_setpoint," etc.), Associated Run ID (e.g. name of the run), run start time, run stop time, target run time (e.g. when is the next run desired to start), run status, run reason, fail reason, plant object ID (e.g. name of system), customer ID, run creator ID, run creation date, run update ID, and run update date. However, this list is for example only, as it is contemplated that the algorithm run attributes may contain multiple other attributes associated with a given run.

As stated above, the algorithm run data table 2702 contains attributes associated with a run to be performed by the high level controller 2212. In some embodiments, the output of a run, is one or more "points," such as a midpoint. The data point data table 2704 contains data point attributes 2714 associated with various points that may be generated by a run. These data point attributes 2714 are used to describe the characteristics of the data points. For example, the data point attributes may contain information associated with a midpoint data point. However, other data point types are contemplated. Example attributes may include point name, default precision (e.g. number of significant digits), default unit (e.g. cm, degrees Celsius, voltage, etc.), unit type, category, fully qualified reference (yes or no), attribute reference ID, etc. However, other attributes are further considered.

The algorithm_run time series data table 2708 may contain time series data 2716 associated with a run. In one embodiment, the algorithm_run time series data 2716 includes time series data associated with a particular algorithm run ID. For example, a run associated with determining the midpoint b described above, may have an algorithm run ID of Midpoint_Run. The algorithm_run time series data table 2708 may therefore include algorithm_run time series data 2716 for all runs performed under the algorithm ID Midpoint_Run. Additionally, the algorithm_run time series data table 2708 may also contain run time series data associated with other algorithm IDs as well. The run time series data 2716 may include past data associated with a run, as well as expected future information. Example run time series data 2716 may include final values of previous runs, the unit of measure in the previous runs, previous final value reliability values, etc. As an example, a "midpoint" run may be run every hour, as described above. The algorithm_run time series data 2716 may include data related to the previously performed runs, such as energy prices over time, system data, etc. Additionally, the algorithm_run time series data 2716 may include point time series data associated with a given point, as described below.

The point time series data table 2710 may include the point time series data 2718. The point time series data 2718 may include time series data associated with a given data "point." For example, the above described midpoint b may have a point ID of "Midpoint." The point time series data table 2710 may contain point time series data 2718 associated with the "midpoint" ID, generated over time. For example, previous midpoint values may be stored in the point time series data table 2718 for each performed run. The point time series data table 2710 may identify the previous midpoint values by time (e.g. when the midpoint was used by the low level controller 2214), and may include information such as the midpoint value, reliability information associated with the midpoint, etc. In one embodiment, the point time series data table 2718 may be updated with new values each time a new "midpoint" is generated via a run. Further, the point time series data 2716 for a given point may include information independent of a given run. For example, the high level controller 2212 may monitor other data associated with the midpoint, such as regulation information from the low level controller, optimization data, etc., which may further be stored in the point time series data table 2710 as point time series data 2718.

The above described data tables may be configured to have an association or relational connection between them. For example, as shown in FIG. 27, the algorithm_run data table 2702 may have a one-to-many association or relational relationship with the algorithm_run time series association table 2708, as there may be many algorithm_run time series data points 2716 for each individual algorithm run ID. Further, the data point data table 2704 may have a one-to-many relationship with the point time series data table 2710, as there may be many point time series data points 2718 associated with an individual point. Further, the point time series data table 2710 may have a one to many relationship with the algorithm_run time series data table 2708, as there may be multiple different point time series data 2718 associated with a run. Accordingly, the algorithm_run data table 2702 has a many-to-many relationship with the data point data table 2704, as there may be many points, and/or point time series data 2718, associated with may run types; and, there may be multiple run types associated with many points By using the above mentioned association data tables 2702, 2704, 2708, 2710, optimization of storage space required for storing time series data may be achieved. With the addition of additional data used in a battery optimization system, such as battery optimization system 2500 described above, vast amounts of time series data related to data provided by external sources (weather data, utility data, campus data, building automation systems (BAS) or building management systems (BMS)), and internal sources (battery systems, photovoltaic systems, etc.) is generated. By utilizing association data tables, such as those described above, the data may be optimally stored and accessed.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   building equipment configured to consume electrical energy and generate thermal energy for use in satisfying a thermal energy load of a building;
   thermal energy storage configured to store at least a portion of the thermal energy generated by the building equipment and to discharge the stored thermal energy;
   electrical energy storage configured to store electrical energy purchased from a utility and to discharge the stored electrical energy; and
   a controller configured to determine, for each time step within a time horizon, an optimal amount of electrical energy to allocate to an incentive-based demand response (IBDR) program by optimizing a value function that accounts for revenue predicted to result from participating in the IBDR program based on statistical estimates of IBDR event probabilities;
   wherein the controller is configured to estimate the IBDR event probabilities based on a history of past IBDR events, each of the past IBDR events comprising an invitation to participate in the IBDR program in exchange for a monetary incentive.

2. The building management system of claim 1, wherein the controller uses at least one of past clearing prices and past mileage ratios of the past IBDR events to generate the statistical estimates of the IBDR event probabilities.

3. The building management system of claim 1, wherein the controller determines an expected revenue from participating in the IBDR program and determines the optimal amount of electrical energy to allocate to the IBDR program based on the expected revenue.

4. The building management system of claim 3, wherein the controller is further configured to:
   calculate values for a plurality of revenue variables based on the statistical estimates of the IBDR event probabilities each of the plurality of revenue variables representing an expected amount of revenue at one of the time steps within the time horizon; and
   determine the expected revenue of participating in the IBDR program based on the plurality of revenue variables.

5. The building management system of claim 1, wherein the controller is configured to:
   operate the electrical energy storage to discharge the optimal amount of electrical energy allocated to the IBDR program; and
   provide the discharged electrical energy to an energy grid.

6. The building management system of claim 1, wherein the controller is configured to determine an optimal amount of electrical energy to allocate to the building equipment for use in satisfying the thermal energy load of the building.

7. The building management system of claim 1, wherein the controller is further configured to determine one or more attributes of the past IBDR events comprising at least one of:
   a time at which the past IBDR events occur;
   a clearing price of the past IBDR events;
   a mileage ratio of the past IBDR events; and
   participation requirements of the past IBDR events.

8. A method for optimizing revenue from participating in an incentive-based demand response (IBDR) program, the method comprising:
   storing electrical energy in electrical energy storage, wherein the electrical energy is purchased from a utility;
   determining statistical estimates of IBDR event probabilities based on a history of past IBDR events, each of the past IBDR events comprising an invitation to participate in the IBDR program in exchange for a monetary incentive;
   determining, for each time step within a time horizon, an optimal amount of the stored electrical energy to allocate to the IBDR program by providing a value function that accounts for revenue predicted to result from participating in the IBDR program based on the statistical estimates of the IBDR event probabilities;
   discharging electrical energy from the electrical energy storage based on the optimal amount of the stored electrical energy to allocate to the IBDR program; and
   using the discharged electrical energy to participate in the IBDR program.

9. The method of claim 8, wherein the statistical estimates of the IBDR event probabilities are determined from at least one of past clearing prices and past mileage ratios of past IBDR events.

10. The method of claim 8, further comprising:
    determining an expected revenue from participating in the IBDR program; and
    determining the optimal amount of electrical energy to allocate to the IBDR program based on the expected revenue.

11. The method of claim 10, further comprising:
    calculating values for a plurality of revenue variables based on the statistical estimates of the IBDR event probabilities each of the plurality of revenue variables representing an expected amount of revenue at one of the time steps within the time horizon; and
    determining the expected revenue of participating in the IBDR program based on the plurality of revenue variables.

12. The method of claim 8, wherein using the discharged electrical energy to participate in the IBDR program comprises providing the discharged electrical energy to an energy grid.

13. The method of claim 8, further comprising determining an optimal amount of electrical energy to allocate to building equipment for use in satisfying a thermal energy load of a building.

14. The method of claim 8, further comprising determining one or more attributes of the past IBDR events comprising at least one of:
    a time at which the past IBDR events occur;
    a clearing price of the past IBDR events;
    a mileage ratio of the past IBDR events; and
    participation requirements of the past IBDR events.

15. A controller for allocating an amount of electrical energy to an incentive-based demand response (IBDR) program, the controller comprising:
    a processing circuit configured to:
      generate statistical estimates of IBDR event probabilities based on a history of past IBDR events, each of the past IBDR events comprising an invitation to participate in the IBDR program in exchange for a monetary incentive;

predict an expected revenue from participating in the IBDR program from the statistical estimates of the IBDR event probabilities;

determine, for each time step within a time horizon, the amount of electrical energy to allocate to the IBDR program by performing an optimization of a value function that accounts for the expected revenue predicted to result from participating in the IBDR program; and cause electrical energy storage to discharge electrical energy based on the amount of electrical energy to allocate to the IBDR program.

16. The controller of claim 15, wherein determining the amount of electrical energy to allocate to the IBDR program comprises determining the expected revenue from participating in the IBDR program.

17. The controller of claim 15, wherein the statistical estimates of the IBDR event probabilities are determined from at least one of past clearing prices and past mileage ratios of the past IBDR events.

18. The controller of claim 15, wherein the processing circuit is configured to determine one or more attributes of the past IBDR events comprising at least one of:

a time at which the past IBDR events occur;

a clearing price of the past IBDR events;

a mileage ratio of the past IBDR events; and participation requirements of the past IBDR events.

19. The controller of claim 15, wherein the processing circuit is configured to determine an amount of electrical energy to allocate to building equipment for use in satisfying a thermal energy load of a building.

20. The controller of claim 15, wherein the processing circuit is configured to:

calculate values for a plurality of revenue variables based on the statistical estimates of the IBDR event probabilities, each of the plurality of revenue variables representing an expected amount of revenue at one of the time steps within the time horizon; and determine the expected revenue of participating in the IBDR program based on the plurality of revenue variables.

* * * * *